(12) United States Patent
Shavit

(10) Patent No.: US 11,738,237 B2
(45) Date of Patent: Aug. 29, 2023

(54) OUTDOORS TRAINING SYSTEMS AND METHODS FOR DESIGNING, MONITORING AND PROVIDING FEEDBACK OF TRAINING

(71) Applicant: Zvi Shavit, Rishon-le-Zion (IL)

(72) Inventor: Zvi Shavit, Rishon-le-Zion (IL)

(73) Assignee: Zvi Shavit, Rishon-le-Zion (IL)

( * ) Notice: Subject to any disclaimer, the term of this patent is extended or adjusted under 35 U.S.C. 154(b) by 0 days.

(21) Appl. No.: 16/562,435

(22) Filed: Sep. 5, 2019

(65) Prior Publication Data

US 2021/0205660 A1 Jul. 8, 2021

(51) Int. Cl.
- *A63B 24/00* (2006.01)
- *A63B 71/02* (2006.01)
- *G06N 20/00* (2019.01)

(52) U.S. Cl.
CPC ...... *A63B 24/0062* (2013.01); *A63B 24/0075* (2013.01); *A63B 24/0087* (2013.01); *A63B 71/02* (2013.01); *G06N 20/00* (2019.01); *A63B 2024/0093* (2013.01); *A63B 2220/803* (2013.01); *A63B 2230/75* (2013.01)

(58) Field of Classification Search
CPC ............ A63B 24/0062; A63B 24/0075; A63B 2024/0071
See application file for complete search history.

(56) References Cited

U.S. PATENT DOCUMENTS

| | | | | |
|---|---|---|---|---|
| 5,931,763 A | * | 8/1999 | Alessandri | A63B 24/0075 482/4 |
| 6,702,719 B1 | * | 3/2004 | Brown | G16H 10/60 482/8 |
| 6,790,178 B1 | * | 9/2004 | Mault | A61B 5/4872 600/300 |
| 7,166,062 B1 | * | 1/2007 | Watterson | A63B 24/0087 482/8 |
| RE44,650 E | * | 12/2013 | Anderson | A63B 24/0075 482/1 |
| 9,011,293 B2 | * | 4/2015 | Shavit | A63B 71/0622 482/8 |
| 10,543,398 B2 | * | 1/2020 | Yang | G06F 17/11 |
| 10,960,266 B2 | * | 3/2021 | Messinger | G06N 5/04 |
| 2006/0136173 A1 | * | 6/2006 | Case | A63B 24/0062 702/182 |
| 2007/0033069 A1 | * | 2/2007 | Rao | G16H 40/40 705/2 |
| 2007/0219059 A1 | * | 9/2007 | Schwartz | A61B 7/003 482/8 |

(Continued)

*Primary Examiner* — Joshua T Kennedy

(57) ABSTRACT

Outdoors training system and methods for designing monitoring and providing feedback of training. The system comprising a computing device, I/O subsystem for permitting a user to enter at least one attribute of the training or of the trainee, a plurality of sensors for generating sensory information, an outdoors training environment in which a training activity takes place, a database containing training related information. The outdoors training system configured for at least one of the following: design a training program for a plurality of users, monitor training program performance, monitor training performance, instruct a user about the training, determine and/or set difficulty level in training apparatus.

18 Claims, 20 Drawing Sheets

(56) References Cited

U.S. PATENT DOCUMENTS

| | | | |
|---|---|---|---|
| 2008/0220941 A1* | 9/2008 | Shaw | A61B 5/16 482/9 |
| 2017/0263147 A1* | 9/2017 | King | G11B 27/026 |
| 2017/0266501 A1* | 9/2017 | Sanders | A43B 5/00 |
| 2017/0368413 A1* | 12/2017 | Shavit | G06K 9/00342 |
| 2018/0272190 A1* | 9/2018 | Miura | G16H 50/30 |
| 2020/0376337 A1* | 12/2020 | Lee | G06F 3/011 |
| 2021/0162261 A1* | 6/2021 | Neumann | G16H 40/67 |

* cited by examiner

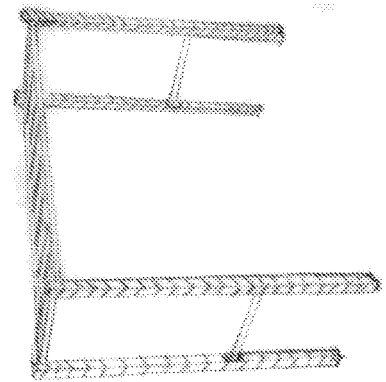
FIG. 2A
FIG. 2B 120
FIG. 2C 230
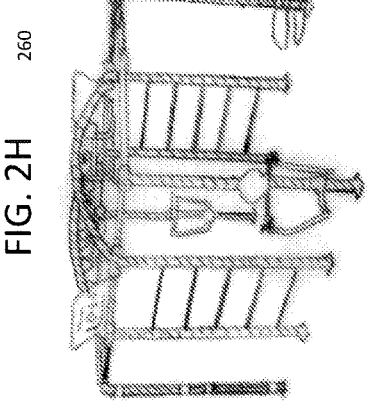
FIG. 2E 250
FIG. 2F 255
FIG. 2H 260
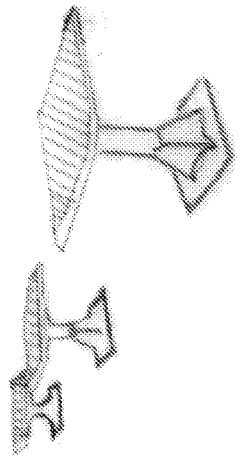
FIG. 2K 290
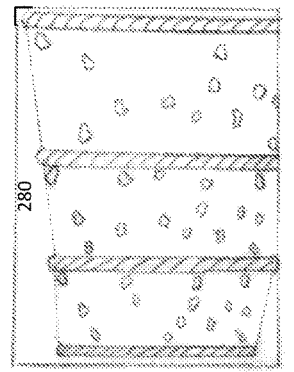
FIG. 2G 180
FIG. 2J 280
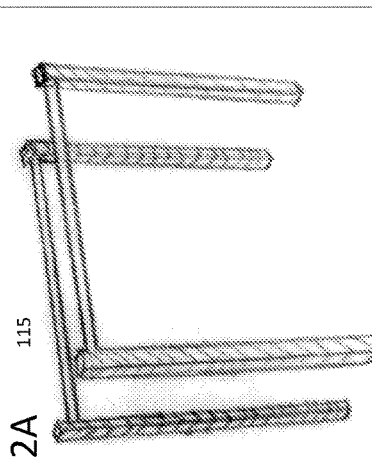
FIG. 2D 240
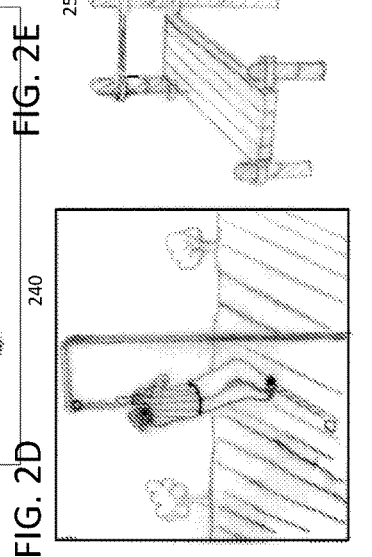
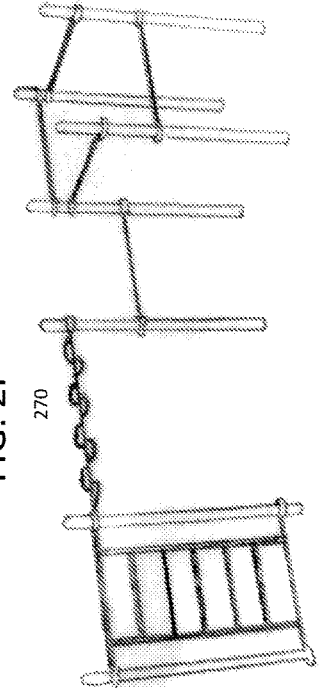
FIG. 2I 270

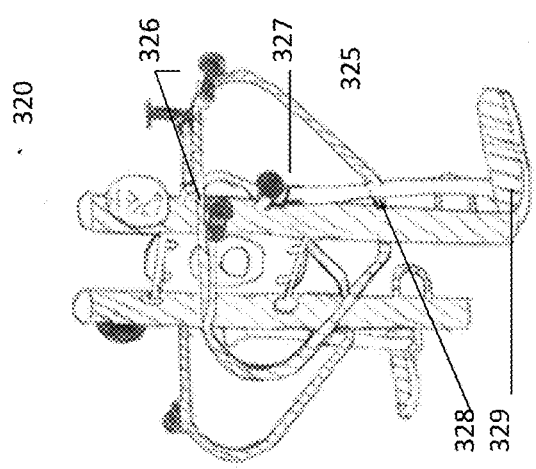
FIG. 3A  FIG. 3B  FIG. 3C  FIG. 3D
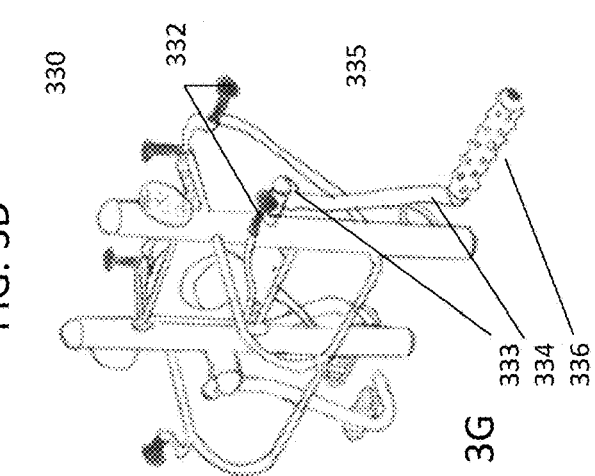
FIG. 3G
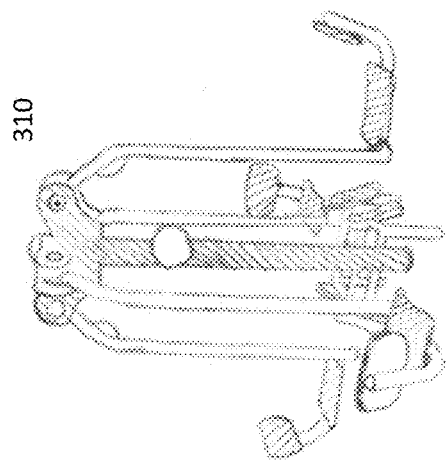
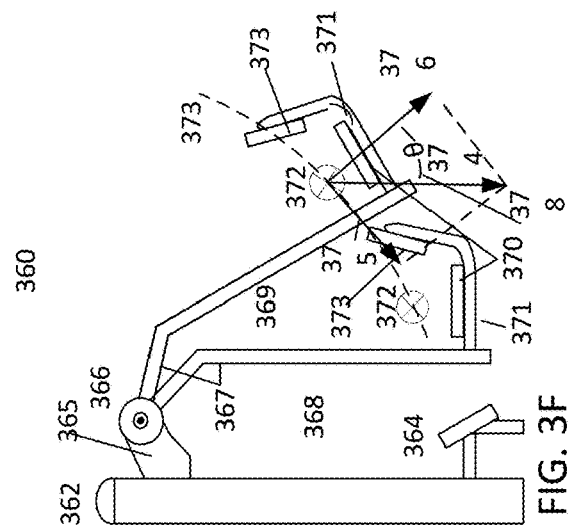
FIG. 3F
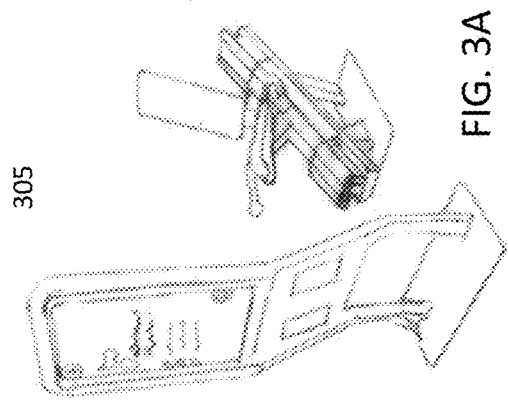
FIG. 3E

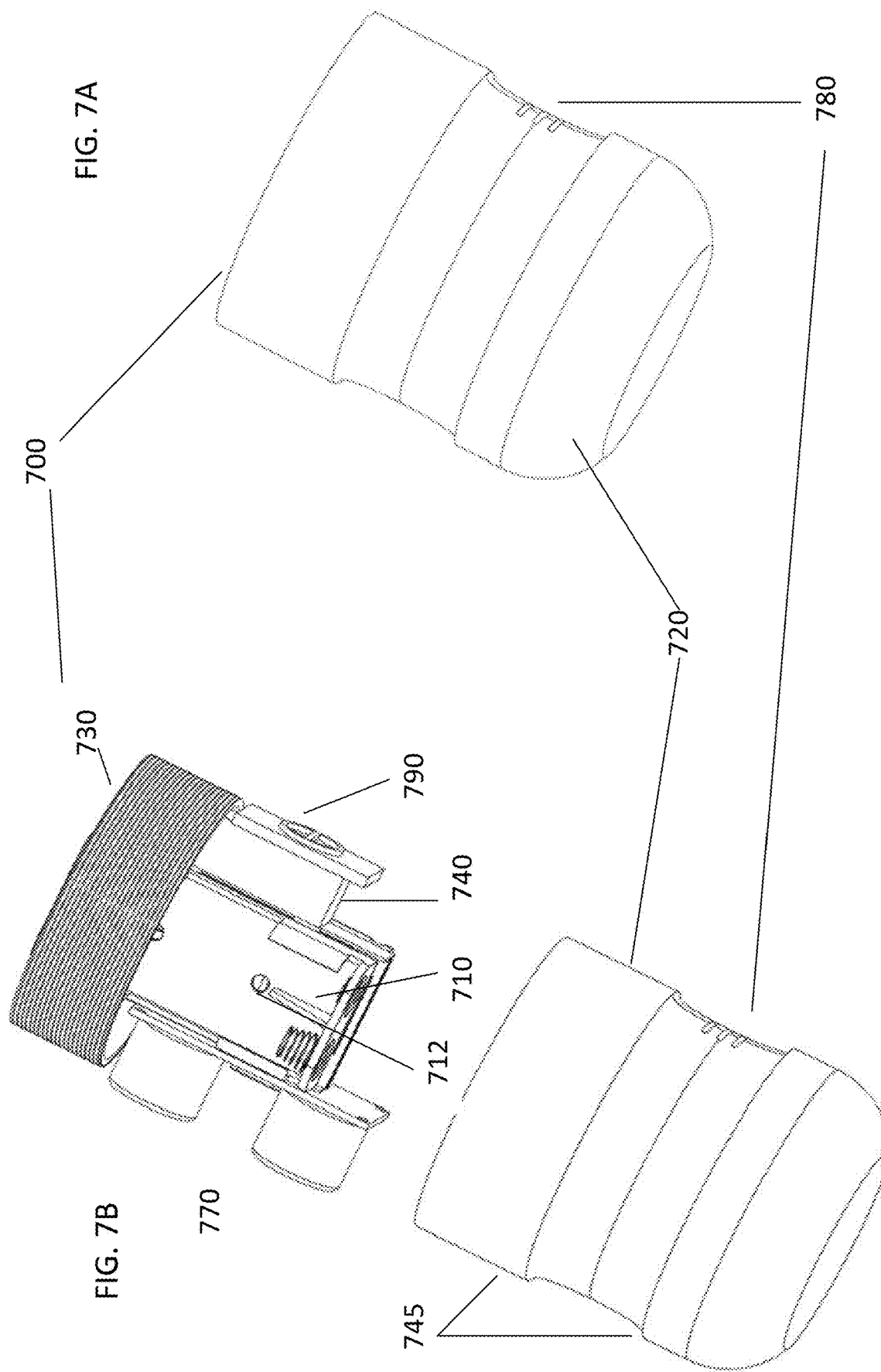

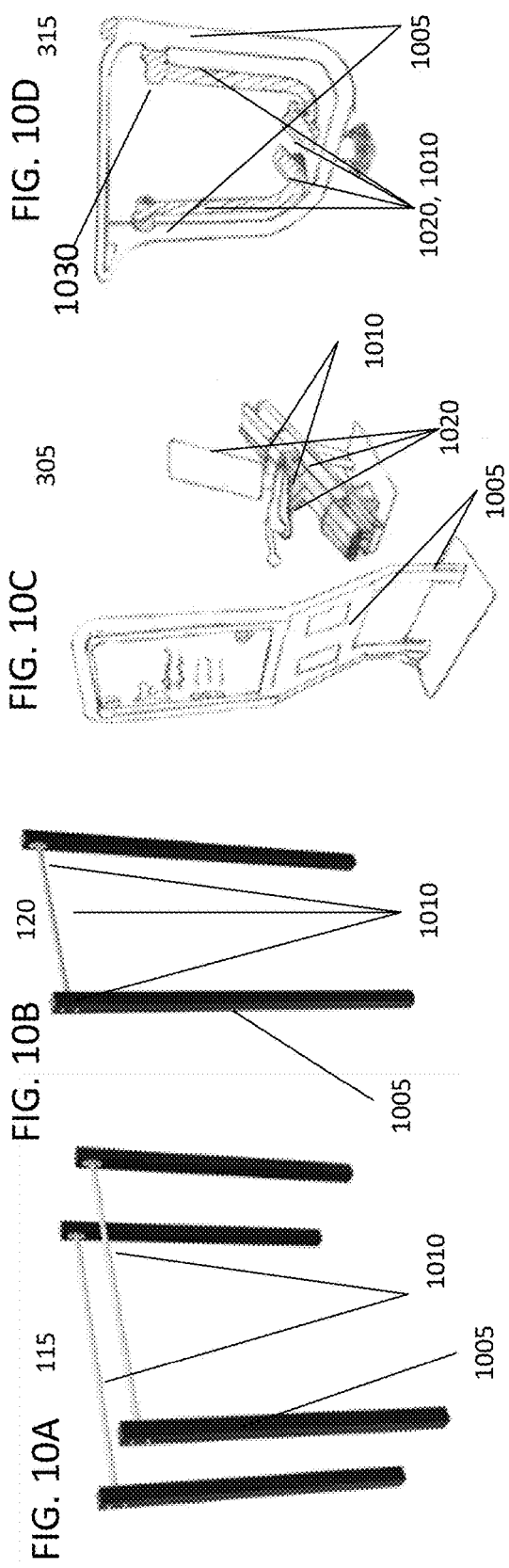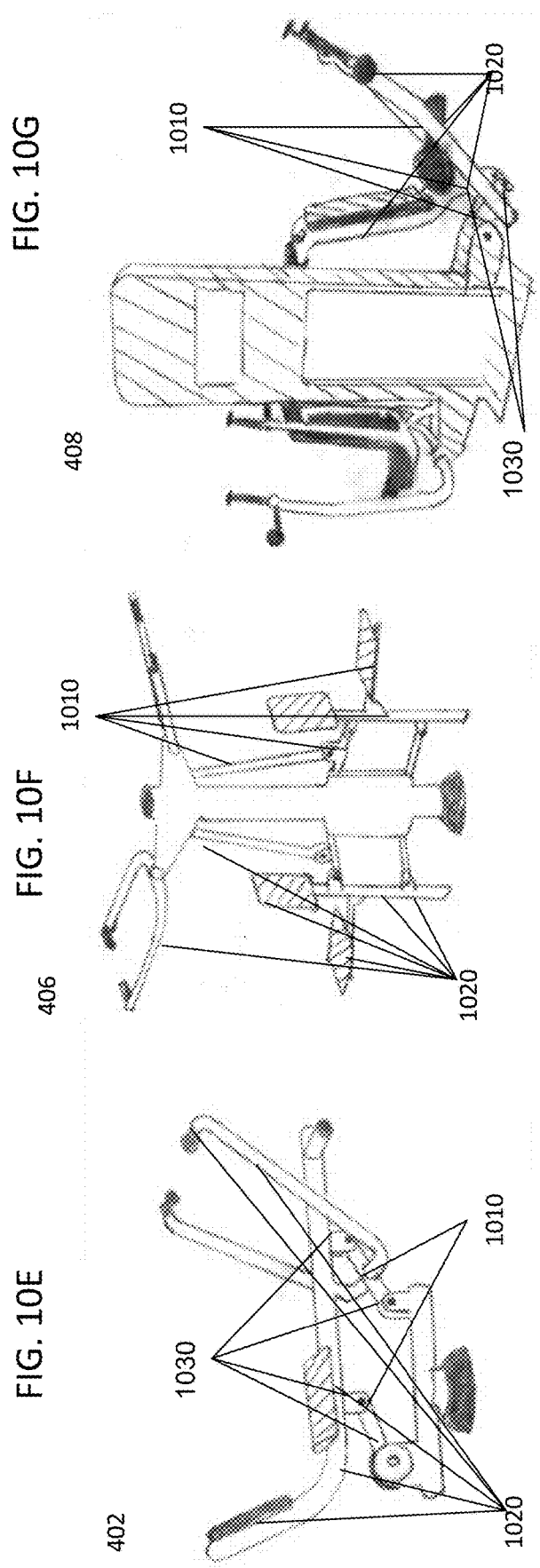

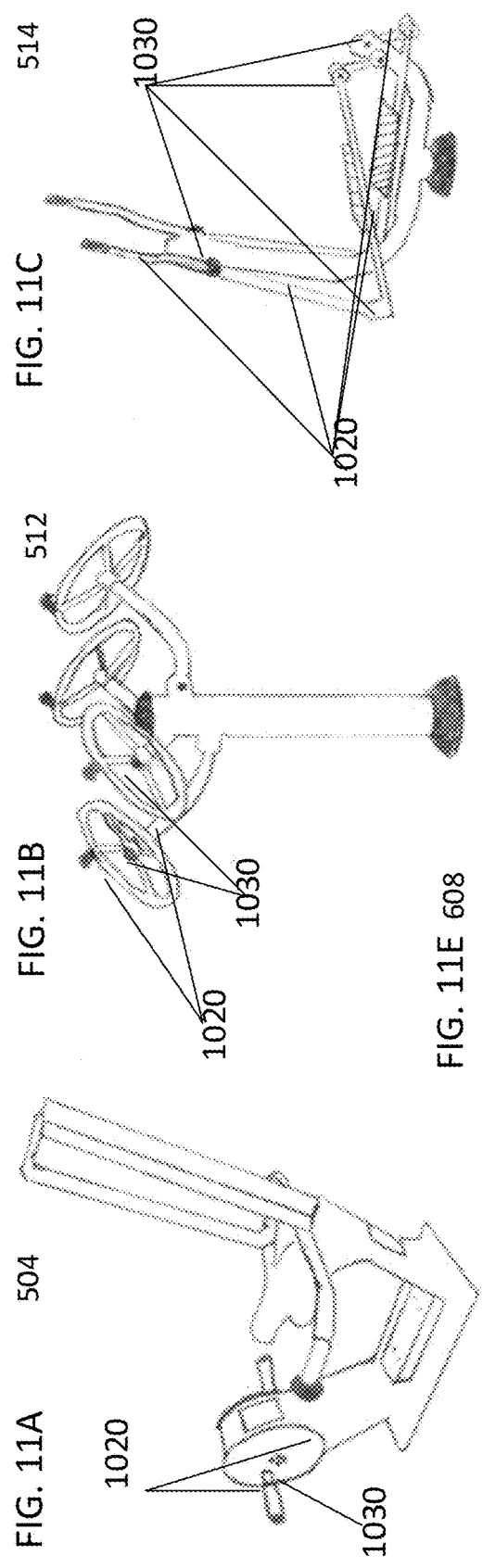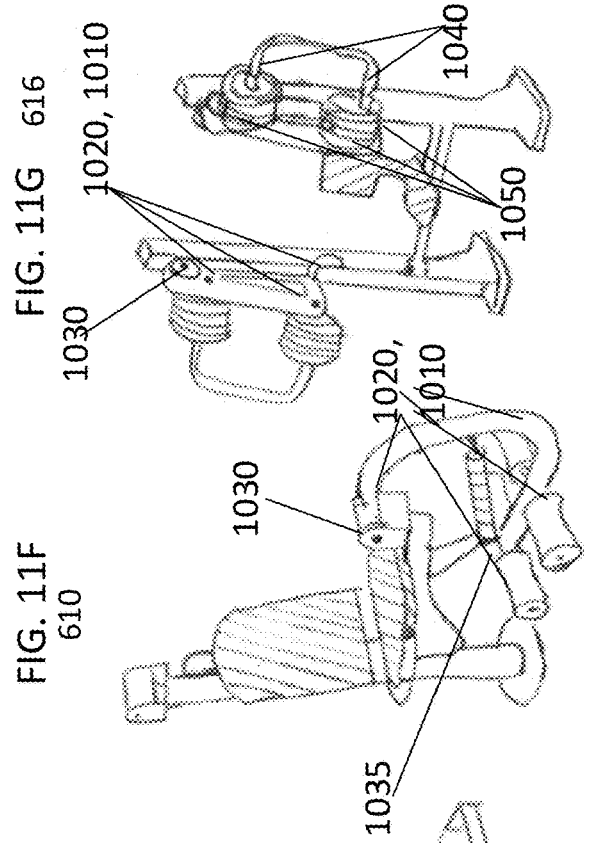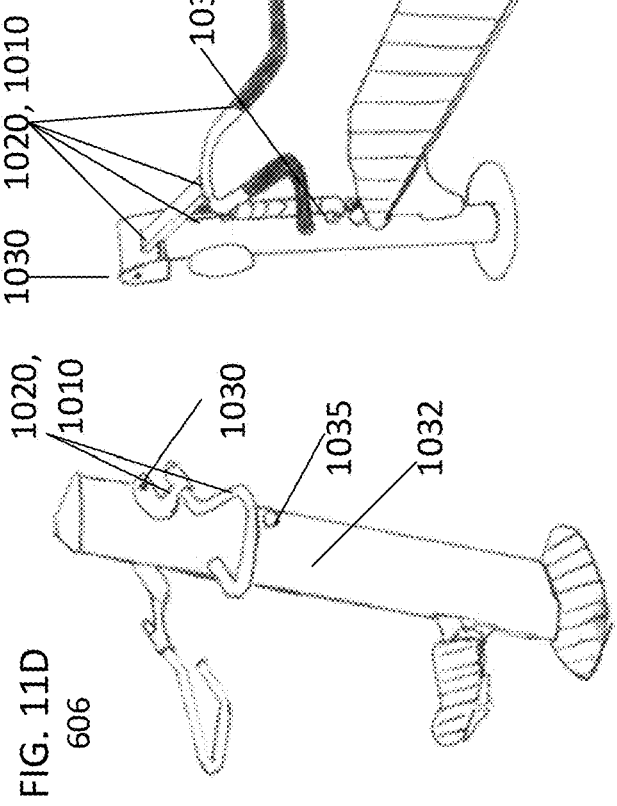

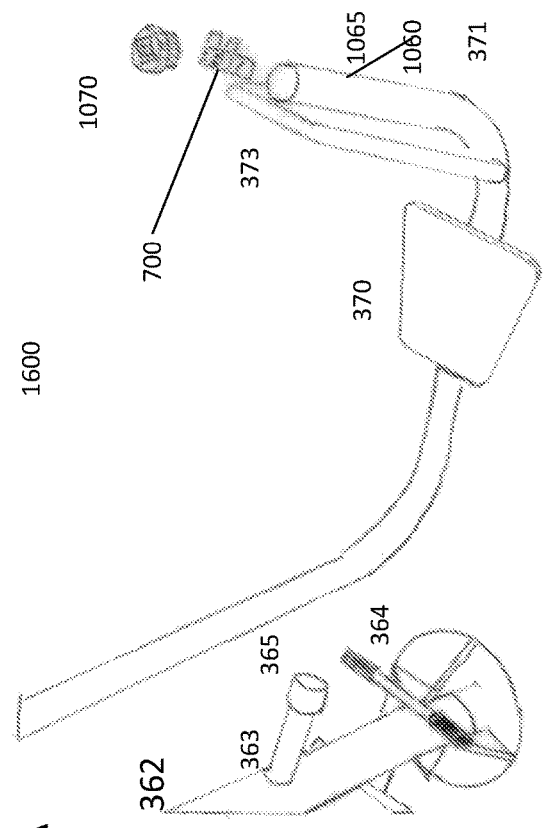
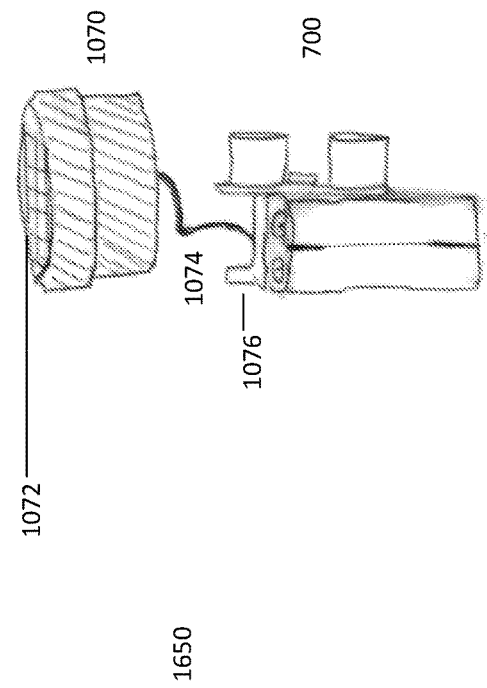
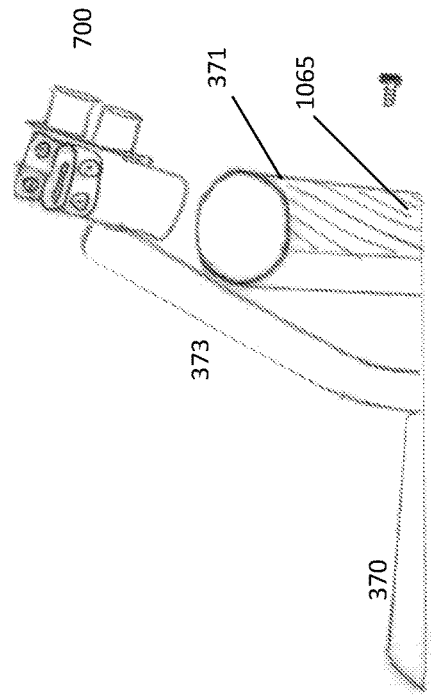
FIG. 16A
FIG. 16B
FIG. 16C

OUTDOORS TRAINING SYSTEMS AND METHODS FOR DESIGNING, MONITORING AND PROVIDING FEEDBACK OF TRAINING

CROSS REFERENCE TO RELATED APPLICATIONS

This application claims the benefit of U.S. provisional application No. 62/680,644 filed on Jun. 5, 2018, the contents of which are herein incorporated by reference.

TECHNICAL FIELD

The present disclosure relates generally to systems and techniques for planning, presenting, monitoring, feed-backing and improving training in various disciplines. One example of such discipline is physical exercise procedures performed in an Outdoor Gym.

BACKGROUND

Computerization of exercise machines and other activities in the field of sports and training in general, is becoming popular in recent times. Recently developed computerization applications include sensors for tracking a sports trainee or player during a game or exercise session. The sensors, track the player's motion in space and other measures. One example is "miCoach Elite®" provided by Adidas® Corporation. Another example is Gymwatch® a smart watch like gadget to monitor and computerize gym training. Further examples include numerous Smartphone applications for tracking fitness sports such as "RunKeeper®" and "Adomondo®".

In the field of resistance based exercise machinery applications related to computerization are beginning to immerge. An example is the "Isocontrol®" system by TechnoGym® Corporation. This system interfaces Resistance based exercise equipment—mainly gym machines, and allows: Displaying the applied workload, the sets and repetitions to be performed. Displays equipment setting, helps users keep the correct range of motion and more. The "Isocontrol®" system is limited to TechnoGym® products only and to the high-end series of products. It is apparent that this solution requires mechanical and electronical integration with the exercise machine.

Wearable computer devices (WCDs) are becoming a practical solution for machine-person interaction. The WCD may be, for example, a bracelet, glasses, pendant, headgear, etc. that is capable of collecting signals related to the user's activity and worn by the user in order to ease or supplement daily life. WCDs are already employed in the field of monitoring and feed backing exercises, but they are mostly limited to fitness exercises.

Recently developed game consoles include sensors for tracking a game player playing an electronic game. The sensors, in part, identify the player's body position and motion in space. One example is "Kinect®" which is integrated in a XBOX One® gaming console provided by Microsoft® Corporation.

The motion and position sensors identify and track the position and movements of a player and are provided as inputs to the console system. The game console, based on such inputs, executes the game scenes (e.g., performs actions by the game's characters) or allows a player to change the game's setting by browsing through menus. Thus, such motion and position sensors enhance the overall gaming experience or provide a unique experience altogether. Some of these experiences include training programs.

Recent developments in Machine Learning (which may be abbreviated "ML" in this document and some of the references), and in Computer Technology, enable many new advantageous applications. Systems employing ML can identify objects, whether moving or stationary, respond autonomously to developments and changes in their environment and even invent and create new products. An example is IBM® Watson® Super Computer, which is capable of producing for example novel scientific research papers based on ML of other scientific papers and other materials. IBM® Watson® is further capable of giving medical prognosis based on autonomous Machine Learning of medical literature, medical information and receiving symptoms related with a medical condition. The Machine Learning in this case and other example can be based on analysis of natural language. The machine can "read" a book intended for humans or be involved in a conversation with a human and analyze the input in a manner that allows it to draw conclusions and learn the subject at hand. It is thus able to interact with humans using natural language.

Recent developments in Networking and Cloud Computing allow having the power and advantages of powerful computing machines such as IBM® Watson® at hand. A user of such technology as IBM® Watson® may suffice with a mobile device or a weak computing machine communicating via Cloud Computing or similar networking techniques with a remote powerful machine such as IBM® Watson®. The user may be able to benefit from all the remote machine most powerful features as if it is "in his hands" or his close vicinity.

It would therefore be advantageous to provide an efficient and elegant solution for planning, presenting, monitoring, feed-backing and improving training in various disciplines. It would be further advantageous if such a solution would utilize WCDs and sensors such as 3D cameras to identify and monitor training routines performed by a user. It could be further advantageous to if such solution utilizes computerized training devices and apparatuses or sensors attached to training devices to analyze the user's performance, and provide a feedback as to how the user should improve the performance. It could be even further advantageous if the solution utilizes Machine Learning to design training programs, Learn how to improve training programs, monitor the training and give feedback.

In recent years the popularity of outdoor gym facilities has seen a fast-rising increase. The outdoor gym is a gym built outside in a public park, with the all-weather construction of its exercise machines somewhat modeled on playground equipment. It is similar to the 1960s-1970s proliferation of fitness trails, which continue to be created particularly in the USA and Europe. In some instances, trails used for fitness are referred to as outdoor gyms.

Outdoor gyms have been used in China as a national fitness campaign prior to the 2008 Summer Olympics.[2] The government has rolled out over 20,000,000 square metres (220,000,000 sq ft) of outdoor gymnasiums across China currently a third of the sports lottery is dedicated to funding this concept. In China they have a similar survey to the Active People Survey. The participation levels in physical activity have been steadily on the increase since the outdoor gym concept has been introduced to China. Outdoor gyms are also starting to trend in New Delhi, India where traditional gyms have had low popularity. In 2012 the New Delhi Municipal Council (NDMC) installed 40 sets around the area, surrounding municipalities have followed suit. Nowadays outdoor gyms can be found all over the world, with new facilities being open in developed countries in nearly every large municipality.

Contemporary Outdoor gyms have at least a few drawbacks however Usually no coach is available and the instructions on and around the training facilities offer only basic instructions. Most users do not know how to perform even the basic exercises correctly, let alone how to design training programs track them etc. Motivation to start exercising or to continue on going exercise program or session my need encouragement. There is no good solution for this problem in the current art.

Moreover, the lack of professional attention, guidance and guard may lead to wrong exercise performance. The effect of wrong exercise performance can range from ineffective exercise to serious injury. It would therefore be advantageous to provide the above-mentioned solutions to outdoor gyms.

REFERENCE TO PRIOR ART

This disclosure incorporates by reference several Patents, Patent applications and other documents. U.S. patent application Ser. No. 15/594,562 by Arie(Arik) Shavit is hereby incorporated by reference including all the reference documents disclosed in application Ser. No. 15/594,562 Information Disclosure Statement (IDS). U.S. Pat. Nos. 8,585, 554 B2 and 9,011,293 B2 both by Shavit et al. are hereby incorporated by reference including all their reference document which were disclosed by either the inventors or the Examiner. U.S. patent application Ser. Nos. 14/079,197 and 14/671,216 by Shavit et al. are hereby incorporated by reference including all their reference document which were disclosed by either the inventors or the Examiner. Also, U.S. Pat. No. 9,079,069B1 by Sam Mandelson, and U.S. Pat. No. 8,523,744B2 by Hongo et all are hereby incorporated by reference including all its reference document which were disclosed by either the inventors or the Examiner. Also U.S. Pat. No. 5,762,587A by Dalebout et al. U.S. Pat. No. 7,569,003B1 by Huffman et al and UK Patent Application GB-2483117-A all Incorporated here by reference. Throughout the specifications many more patents and applications are mentioned at least by number and are incorporated by reference.

This disclosure specifically adopts all the definitions is U.S. patent application Ser. No. 15/594,562 by Arie(Arik) Shavit. Every time this disclosure is discussing a Gym or an Outdoor Gym the reader can appreciate that it can be generalized to any training environment following the guidelines set fourth in U.S. patent application Ser. No. 15/594,562 and other references.

BRIEF DESCRIPTION OF THE DRAWINGS

The subject matter disclosed herein is particularly pointed out and distinctly claimed in the claims at the conclusion of the specification. The foregoing and other features and advantages of the disclosed embodiments will be apparent from the following detailed description taken in conjunction with the accompanying drawings.

FIGS. 2A-2K—display examples of outdoor gym exercise devices. FIG. 2A depicts parallel bars; FIG. 2B depicts a horizontal bar; FIG. 2C depicts the exercise equipment known as "monkey bars"; FIG. 2D is a climbing rope; FIG. 2E depicts Abdomen Bench or Sit-up station; FIG. 2F is Leg Raise; 2G depicts Bench or Sit-up station; FIG. 2H is an apparatuses sometimes called "Training Rig" that carters various static devices for bodyweight training and a range of abilities and offers both toning and strength exercises; Similarly, FIG. 2I is a combined apparatus that includes Monkey bars—snake, wall bars, four pull-up bars of class. FIG. 2J Is a climbing wall. FIG. 2K depicts "Plyometric Boxes" which are mainly used for cardiovascular workout in a similar manner to steps or boxes.

FIGS. 3A-3G Show various resistance-based machines where the resistance is achieved using body weight and/or part of the device weight and an angle relative to the force of gravity. FIG. 3A is a Leg Press machine. FIG. 3B is another version of a Leg Press machine. FIG. 3C is a training machine known as Air-Walker for legs and cardio-vascular training. FIG. 3D is a 4-person station including Pendulum, Abs & dips. FIG. 3G is a station containing Legs side lift Abs & dips. FIGS. 3E and 3F are drawings which better explain the way the resistance can be calculated on these resistance-based machines.

FIG. 4A is a rowing machine. FIG. 4B is a combination of Lat Pull down and shoulder press. FIG. 4C is two columns of Lat pull down. FIG. 4D is a combination of Chest Press and seated row. FIG. 4E is a combination of Butterfly and reverse Butterfly machines. FIG. 4F is one column of Lat Pull Down machine similar to FIG. 4C, 4F is used to explain the principals on which these types of exercise machines are based on.

FIG. 5A is a Cross Trainer machine sometimes also known as a Ski machine. FIG. 5B is Recumbent Bike. FIG. 5C. is a Hand Bike. FIG. 5D is a Spinning Bike. FIG. 5E is a Treadmill coupled with an Oblique apparatus. FIG. 5F is an apparatus called "Tai-Chi Spinners" which is similar in mature to the Hand Bike FIG. 5C. FIG. 5G is another version of the Cross Trainer. FIG. 5H is Above Head Spinner machine.

FIG. 6A is a Ski or Multi-Trainer machine. FIG. 6B is a Recumbent bike and FIG. 6C is Combination Overhead Press & Lateral Pulldown; FIG. 6D is an adjustable resistance bench press machine. FIG. 6E is Adjustable Leg Extension and Curl machine. FIG. 6F is an Adjustable Stepper. FIG. 6G is a Pec Fly Machine and FIG. 6H is a Chest Press Machine.

FIGS. 7A-7C capture an example embodiment of an IoT system: FIG. 7A is the IoT System side view, in which the outer cover occludes. FIG. 7B is a semi-exploded version of the IoT system where the cover is removed. FIG. 7C is a fully exploded version of the IoT system capturing the inner components.

FIG. 8A captures the exercise device configured with the IoT system from a distance, so the whole exercise device is captured. FIG. 8B is a close up on the IoT system attachment to the exercise device. FIG. 8C is a close up on the mobile device mounting on the exercise device, and FIG. 8D is yet another close-up on the IoT system mounting.

FIG. 9A depicts first example of a known apparatus for attaching a mobile device to a surface. FIG. 9B captures another known example. FIG. 9C captures a tripod for mounting a mobile device. FIG. 9D depicts yet another example of a mounting device. And FIG. 9E is yet another known example of such a device.

FIGS. 10A-10G—capture the possible locations for attaching IoT systems and other additions to various types of exercise devices described in previous figures.

FIGS. 11A-11G—capture more possible locations for attaching IoT systems and other additions to various types of exercise devices described in previous figures.

FIGS. 16A-16C—describe an example embodiment of an exercise device with an example embodiment of IoT system configuration inside the exercise device. FIG. 16A is a top exploded view. FIG. 16B is closer exploded view; and FIG. 16C is a closeup on the IoT apparatus.

DETAILED DESCRIPTION

Figure 1:
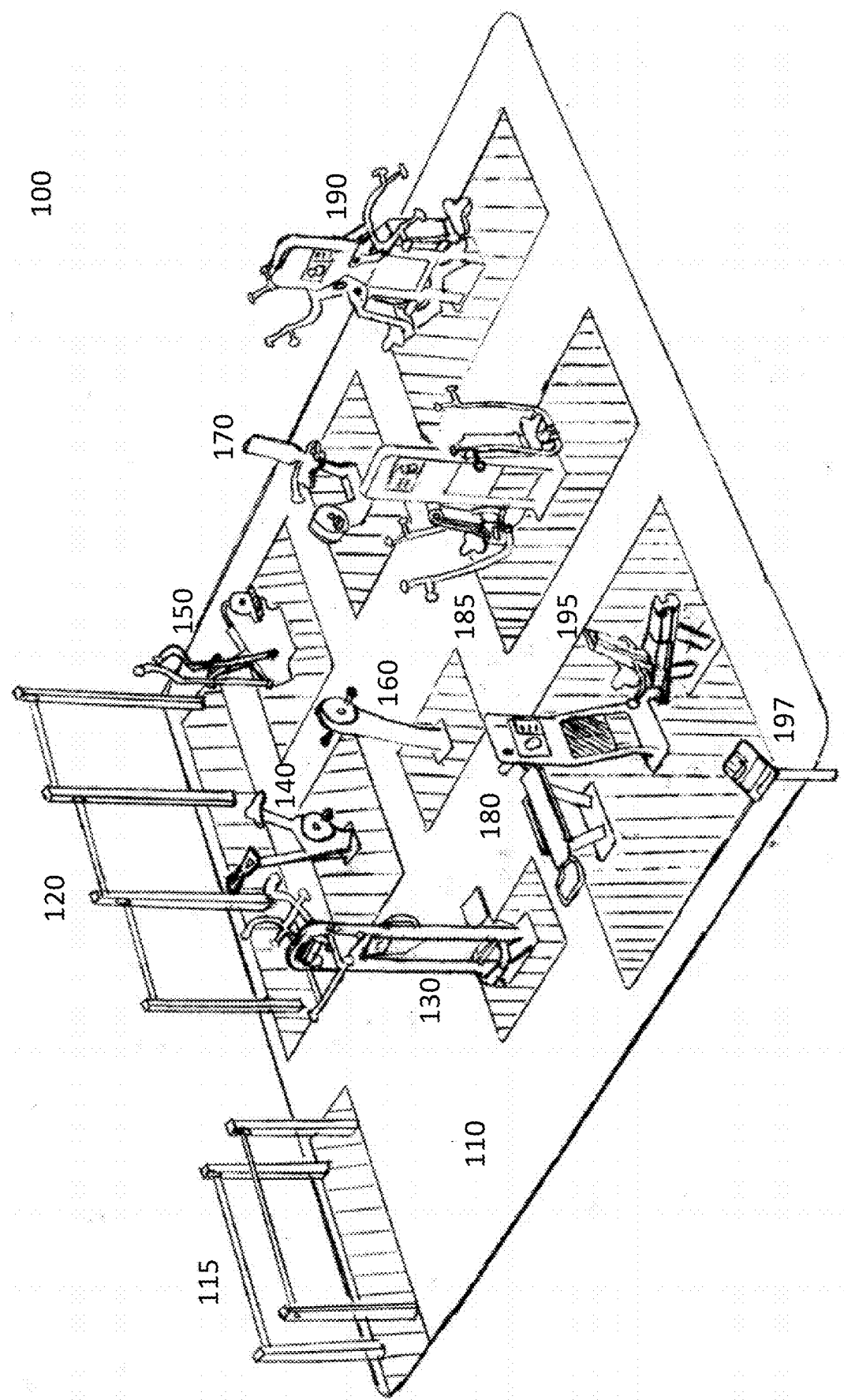
FIG. 1—displays an example contemporary outdoor gym. It can be considered as an example of the prior art.
Figure 4A:
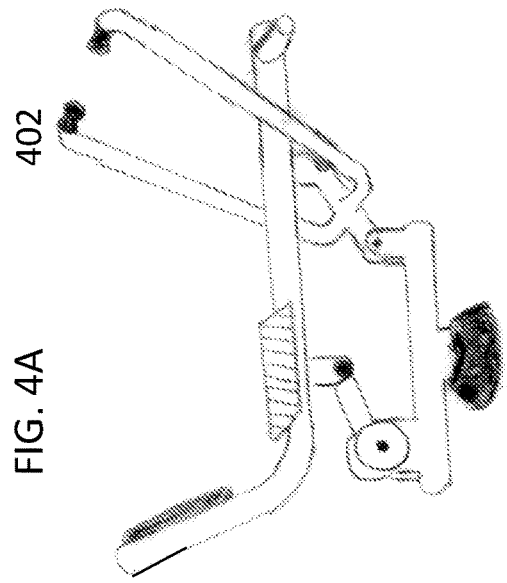
FIGS. 4A-4F—display more examples of Outdoor Gym exercise device, in this case devices in which the resistance or difficulty level is a function of the user's body weight in combination with a mechanical leaver arrangement.
Figure 4B:
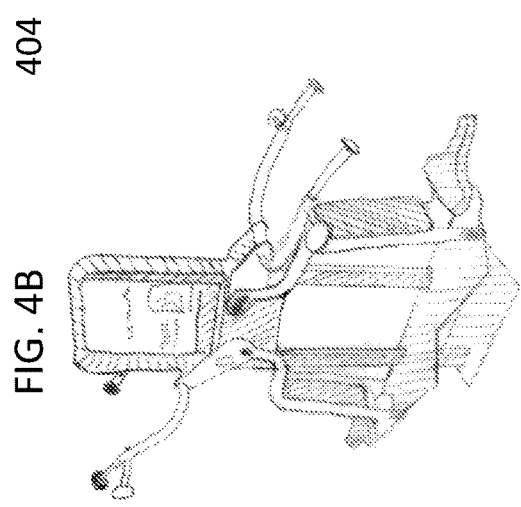
Figure 4C:
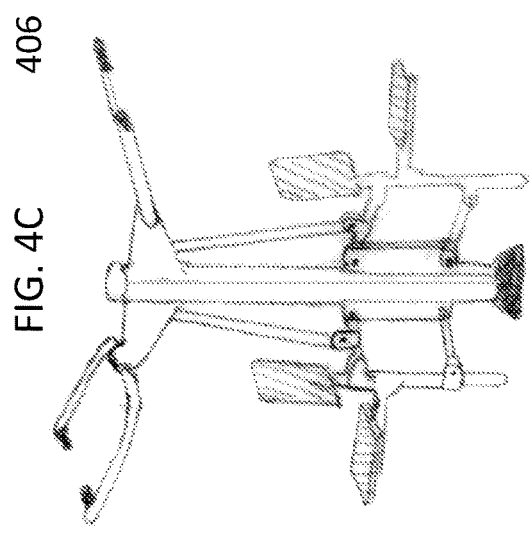
Figure 4D:
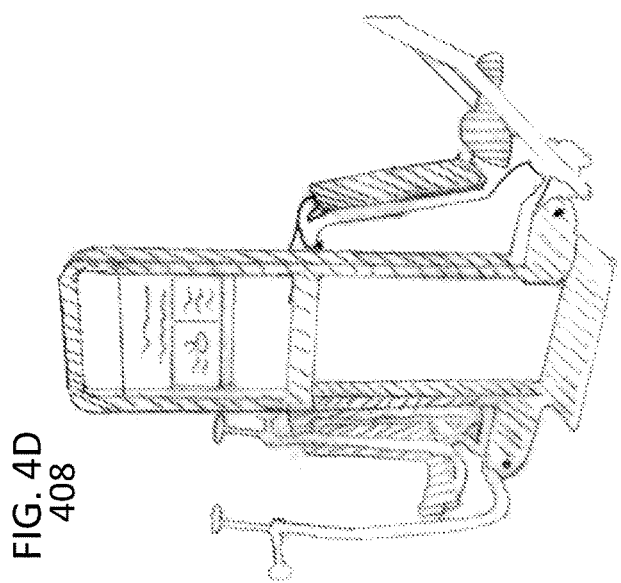
Figure 4E:
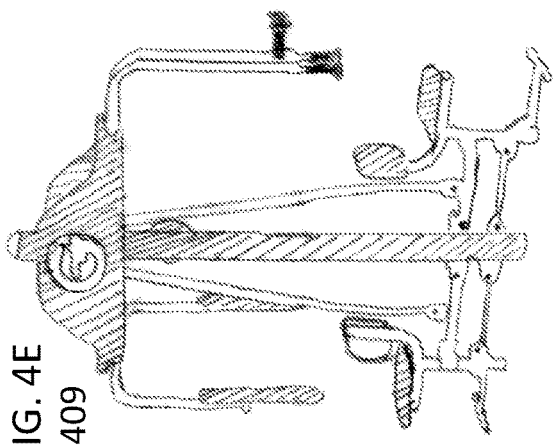
Figure 4F:
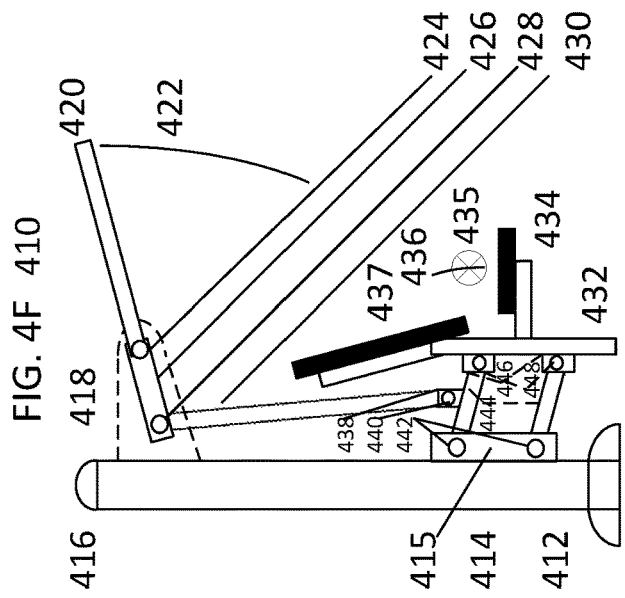
Figure 5H:
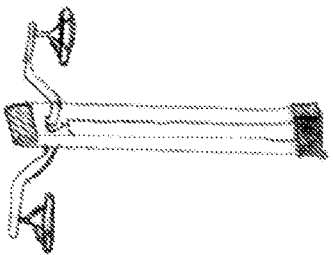
FIGS. 5A-5H—display more examples of exercise device, in this case devices for cardio-vascular activity and alike.
Figure 5D:
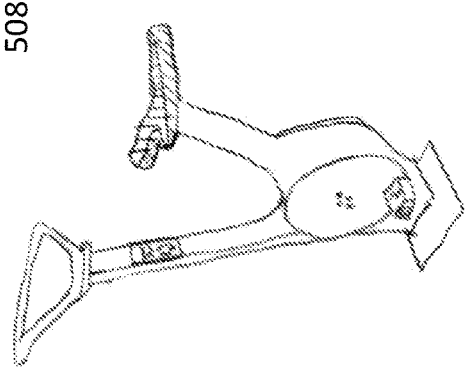
Figure 5G:
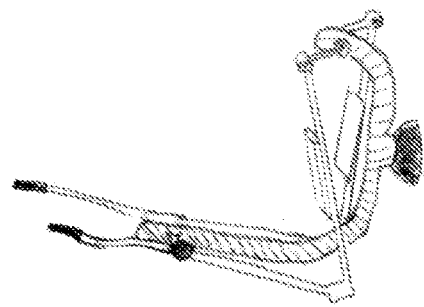
Figure 5C:
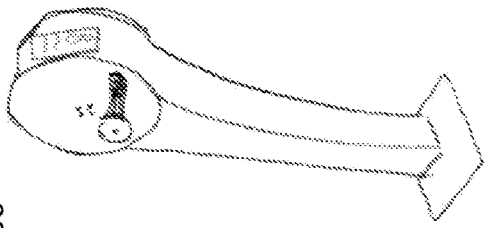
Figure 5F:
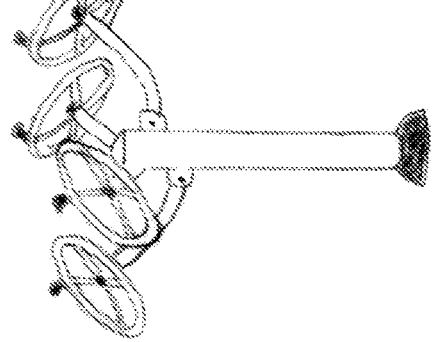
Figure 5B:
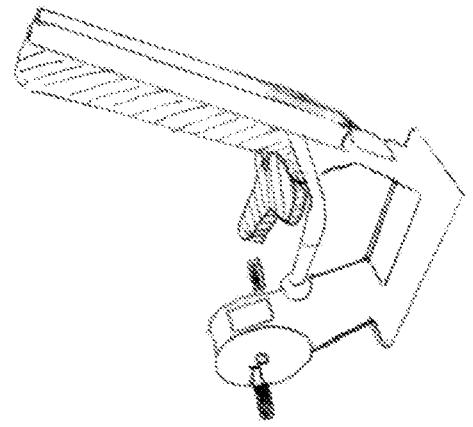
Figure 5E:
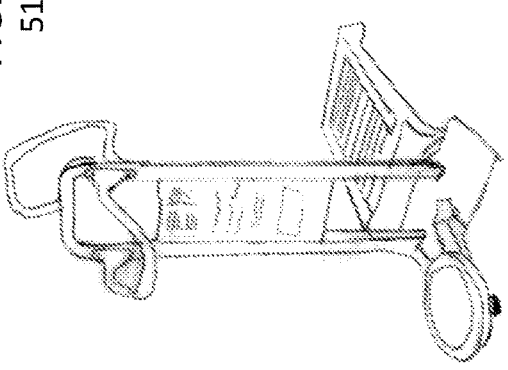
Figure 5A:
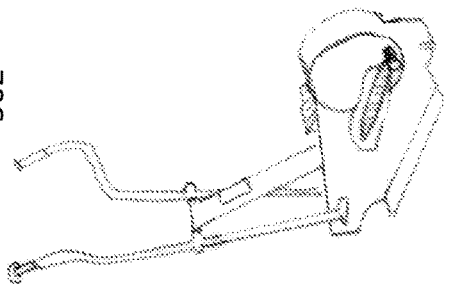
Figure 6A:
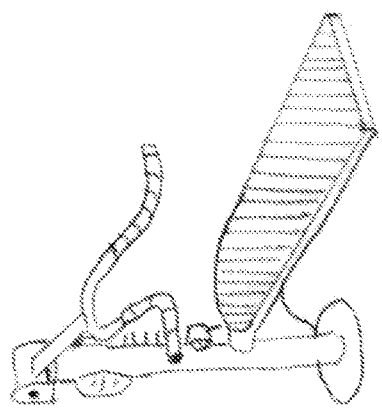
FIGS. 6A-6H—display more examples of exercise device, in this case devices in which the resistance or difficulty level can be changed by the user.
Figure 6B:
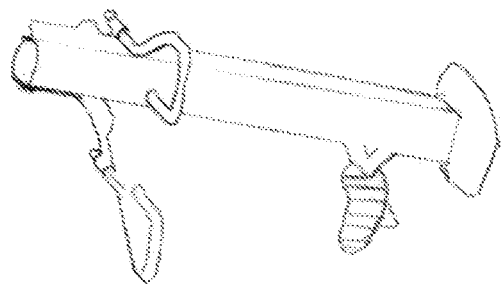
Figure 6C:
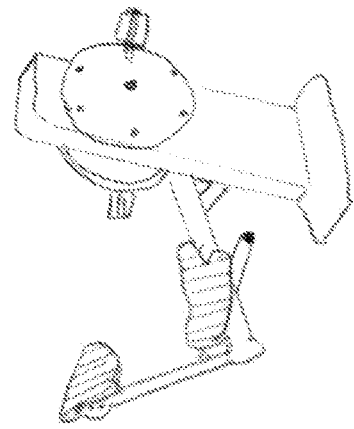
Figure 6D:
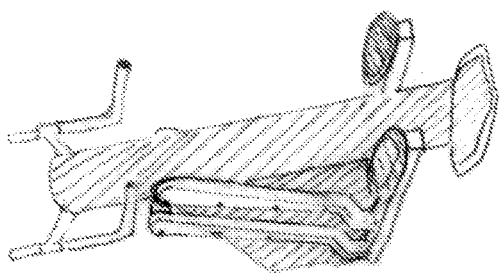
Figure 6E:
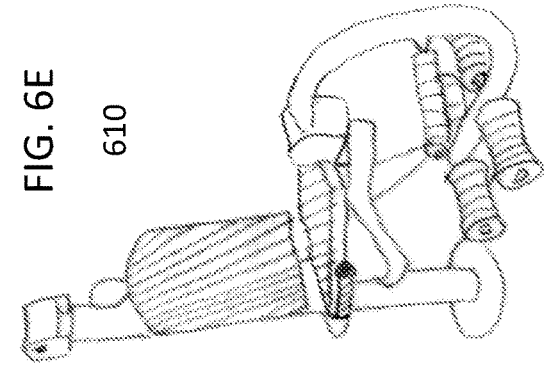
Figure 6F:
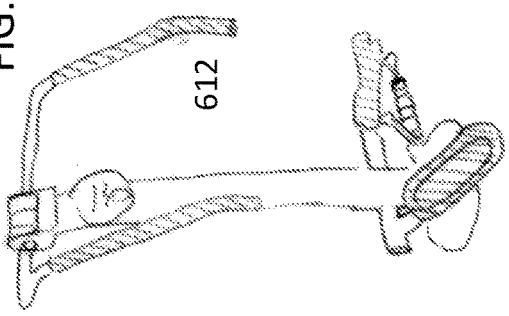
Figure 6G:
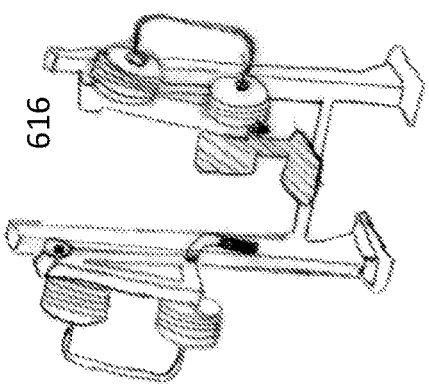
Figure 6H:
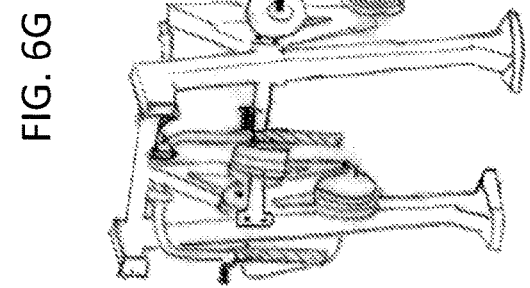

It is important to note that the embodiments disclosed are only examples of the many advantageous uses of the innovative teachings herein. In general, statements made in the specification of the present disclosure do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments include herein include a method for tracking and designing exercises and training sessions and providing feedback thereof, which serves as a knowledge base for a chosen field of sports or employee training or military training or field of rehabilitation or any other activity, enabling the user to create a personally tailored training program, while tracking and documenting their performance of the exercises and providing continuous live feedback, including performance information and entertainment content, in order to help the user get the most out of their preparation or training or program.

Outdoor Gym Prior Art

FIG. 1 shows an exemplary and non-limiting example of an outdoors gym 100. 110 is the gym floor. Usually it is made out of a soft material such as rubber tiles, rubber mulch, sand, grass and alike. 197 is a welcome sign that can elaborate gym instructions, contact details, safety information and alike. It welcome users to the gym, promotes the installation and can even advertise a sponsor or customer logo. The gym can have many types of exercise devices. Some can be simple static devices for bodyweight training such as Horizontal Bar 120, Parallel bars or dips 115, Bench or Sit-up station 180, Pull Up/Assisted Pull Up station 130, and alike. Some can be cardiovascular exercise devices such as: Elliptical Trainer 150, Spinning Bikes 140, Hand Bike 160, Recumbent Bike 170, and alike. Some can be resistance based Machines such as Chest Press and Seated Row station 185, The Lat Pull Down and Shoulder Press Station 190, and the leg press machine 195. In the case of the Outdoor Gym the resistance is often generated using the trainee body weight scaled by a leaver arrangement. Suspension training equipment such as TRX (not shown) is also often used in Outdoor Gyms sometimes an apparatus for easy tying of suspension training equipment is present. Using free weights can also be observed at an Outdoors Gym. As explained additional activities can be performed such as running, cycling, Yoga, Dancing Free gymnastics Pilates and alike.

Because of the disadvantages mentioned above of the lack of professional attention, guidance and guard outdoors gym equipment designers and manufacturers tend to stick to the following paradigms:

All moving elements are within the frame.
The equipment is free from all crush, entrapment and shear points.
The equipment is free of sharp edges.

This comes sometimes at the effect of the equipment functionality and effectiveness. The Exercise devices mentioned and additional ones, Operation of all the exercise devices mentioned in this disclosure and additional ones known in the art, and the exercises mentioned in this disclosure that can be performed on them, or other exercises can be found at (all websites incorporated by reference):

http://www.tgogc.com/Products/
http://www.outdoor-fitness.com/
http://gfoutdoorfitness.com/
http://www.koopur.com/
https://www.bodybuilding.com/
https://www.fitness.com/
https://www.webmd.com/fitness-exercise/default.htm FIG. 2. Shows various static devices for bodyweight training that can be used in outdoor gyms. Parallel bars or dips 115, Horizontal Bar 120, Bench or Sit-up station 180 and also 250, Leg Raise 255, Horizontal Ladder 230, Rope climbing 240 and alike—similarly Pole Climbing—not shown; Apparatuses sometimes called "Training Rig" 260 that carters various static devices for bodyweight training and a range of abilities and offers both toning and strength exercises; Similarly, 270 is a combined apparatus that includes Monkey bars—snake, wall bars, four pull-up bars of class. 280 Is a climbing wall many types of climbing walls and other setups for climbing are known in the art. 290 are "Plyometric Boxes" which are mainly used for cardiovascular workout in a similar manner to steps or boxes. Many combinations of these elements are known in the art.

FIG. 3A-G Shows various resistance based machines where the resistance is achieved using body weight and/or part of the device weight and an angle relative to the force of gravity. 305 is a Leg Press machine. 310 is another version of a Leg Press machine. 315 is a training machine known as Air-Walker for legs and cardio-vascular training. The resistance for each leg is a function of the leg weight and the relevant part of the machine and the angle relative to the gravity force. 320 is a 4-person station including Pendulum, Abs & dips. 325 is the Pendulum found on both sides of the station. It is sometimes also called "Waist Trainer". In the usual exercise performed on this station, the trainee stands on the leg rest 329 and holds the arm rests 326. The leg rest is held by a rod 328 which is connected to the station by a pivot 327. The trainee moves his legs sideways and because of the rod 328 they move in an arc. The resistance in it is a function to the weight of the legs and the weight of the leg rest 329 and rod 328, and the angle with gravity. 330 is a station containing Legs side lift Abs & dips. 335 is the leg side lift. In the usual exercise performed on this station, the trainee stands on the ground and holds the arm rests 332. The leg rest 336 is connected by a rod 334 which is connected to the station by a pivot 333. The trainee moves his leg sideways against the leg rest 336. The resistance in it is a function to the weight of the legs and the weight of the leg rest 336 and rod 333, and the angle with gravity. This exercise works on the legs side muscles and buttock.

340 and 360 are drawings which better explain the way the resistance can be calculated on some of these resistance-based machines. 340 is showing the leg press machine of 305. 342 is a trainee using the machine. 344 is the leg rest which the trainee 342 pushes against. 346 is the horizontal base of the machine 305 and 347 is the supports of the machine 305, that supports the rail 348. 348 is the rail on which the cart 350 moves the rail has the angle θ which is numbered 359 relative to the horizontal base 346 of the machine 305. 352 is the chair on which the trainee 342 is sitting on. 354 is the center of gravity of the user 342, the chair 352 and the cart on which the chair is mounted 350. 356 represents the force vector of gravity force acting on the combination of trainee 342, chair 352 and cart 350 from the center of gravity. The sum of the masses of the trainee 342 the chair 352 and the cart 350 is denoted M. As known from elementary physics the force vector 356 equals Mg where g represents the gravity acceleration at the machine 305 location, and M represents the relevant mass. Mg is measured in force units. 355 is the component of the gravity vector 356 which acts with the direction perpendicular to the cart 350. This is known in physics as the "Normal Force" and it is balanced by the chair 352 and the cart 350. 358 is the component of the gravity vector 356 which acts in a direction parallel to the cart and resisting its motion. This is the vector that applies the resistance the user 342 is feeling. As known from elementary Physics the angle θ 359 between the rail 348 and the horizontal base 346 is the same angle between the gravity vector 356 and its normal component 355. The angle with the component 358 is 90 degrees minus this angle θ 359. Therefore, the size of the force vector 358 in force units as known from elementary Physics is: Mg sin θ measured in force units.

360 represents another version of a leg press machine. This time 310. 362 is the central pole holding the machine. 364 is the leg rest which the trainee (not shown) pushes against. 365 is a holder rigidly connected to the pole 362 which holds 366 which is the pivot connecting the rod 367 to the pole 362. 370 is the chair on which the trainee (not shown) is sitting on. 371 is the rod or chassis that connects the chair 370 with the moving rod 367. 373 is the back-rest plate. The drawing 360 shows the machine in two different positions in time and space 368 and 369. 372 is the center of gravity of the trainee (not shown) chair 370 and rod 367. 373 is the imaginary arc drown by the center of gravity 372 in space when the chair 370 rod 367 and trainee (not shown) change position in space, like changing positions between 368 and 369. The sum of the masses of the trainee (not shown) the chair 370 and the rod 367 is denoted M. As known from elementary physics the force vector 374 equals Mg where g represents the gravity acceleration at the machine 310 location Mg is measured in force units. 376 is the component of the gravity vector 374 which acts with the direction perpendicular to the chair 370. This is known in physics as the "Normal Force" and it is balanced by the chair 370. 375 is the component of the gravity vector 374 which acts in a direction parallel to the chair 370 and resisting it's motion. This is the vector that applies the resistance the user is feeling. As known in physics, the vector 375 direction is the tangent to the arc 373. The normal component 376 is perpendicular to this component. The angle θ 378 is the angle between the horizontal plane on which the machine 310 stand and the vector 375 direction which is tangent to the arc 373. From elementary Physics we know that this is also the angle between the gravity vector 374 and the Normal vector 376. Therefore, the size of the force vector 375 in force units as known from elementary Physics is: Mg sin θ measured in force units.

The calculations of the resistance given in the last two paragraphs can be very easily generalized by the skilled in the art, and applied to all the machines appearing in FIG. 3A-G and all similar machines known in the art.

FIG. 4A-F Shows various resistance based machines using the trainee body weight scaled by a leaver arrangement. 402 is a rowing machine. 404 is a combination of Lat Pull down and shoulder press. 406 is two columns of Lat pull down. 408 is a combination of Chest Press and seated row. 409 is a combination of Butterfly and reverse Butterfly machines. 410 is one column of Lat Pull Down machine similar to 406 or the left part of 404. 410 is used to explain the principal on which this type of exercise machines is based on.

412 is the fixation of the central pole 414 to the ground. The Central pole ends with a spherical top 416. 415 is a holder rigidly connected to the pole 414, holding the pivots 442 which connects the rods 444. 418 is a holder rigidly connected to the pole 414, holding the pivot 424 which is connected to the pull-down handle 420. 422 is the arc which is the path in space of the end of the pull-down handle 420. 426 is a rod connected to the pull-down handle 420. It is usually rigidly connected to it. 426 uses as a leaver to pull the rod 430 connected to it by a pivot 428. The rod 430 is connected by a pivot 440 to a holder 438 which is rigidly connected to the rod 444. In turn the leaver arrangement of 420, 424, 426, 428 and 430, 438, 440, 444 transfers the motion of the pull-down handle 420 through the rods 426 and 430 to the rod 444 and from it to the chair chassis 432 and the chair 434. When the pull-down handle 420 goes down the swing arrangement formed by 420, 424, 426 pulls the rod 430 up which in turn pulls the rod 444 and thus the chair chassis 432 and the chair 434 up. 446 are the holders rigidly connected to the chair chassis 432. Which hold the pivots 448 which connect them to the rods 444. The chair chassis 432 supports the chair 434 and back support piece 436. The weight of the chair chassis 432, rods 444, holders 446, pivots 448 chair 434 and back support piece 437 are the machine weight which is part of the resistance calculation. Together with the trainee (not shown) weight it comprises the total weight which is the basis of this machine type resistance. 436 is the arc which is the path in space of the center of gravity 435 of the trainee (not shown) and the machine components that contribute to the total weight.

The actual resistance felt by the trainee is a scaled version of this weight. As known from mechanics, due to the leaver arrangement the resistance force felt by the trainee at the pull-down handles is the weight multiplied by a scaling factor which is the ratio of the way travelled by the center of gravity 435 and the way travelled by the pull-down handle 420. The ratio is set by the configuration of the leaver arrangement hereby described. It is approximately the ratio between the "arms" lengths one is the arm which has the length from the pivot 440 to the center of gravity 435 and the other is from 420 to the pivot 424. This example can be easily generalized by the skilled in the art to all the devices in FIG. 4A-F, and to all similar devices known in the art. US Patents U.S. Pat. No. 9,079,069B1 by Sam Mandelson, and U.S. Pat. No. 8,523,744B2 by Hongo et all which are incorporated by reference further describe such apparatuses.

FIG. 5A-H shows various cardiovascular machines. 502 is a Cross Trainer machine sometimes also known as a Ski machine. 504 is Recumbent Bike. 506 is a Hand Bike. 508 is a Spinning Bike. 510 is a Treadmill coupled with an Oblique apparatus. 512 is an apparatus called "Tai-Chi Spinners" which is similar in mature to the Hand Bike 506. 514 is another version of the Cross Trainer 502. Note that it does not have a flywheel as 502 does. 516 is Above Head Spinner machine. Some of the machines in FIG. 3A-G and other figures like for example 315 can also be classified as cardiovascular machines.

Some cardiovascular machines can produce electrical energy based on the trainee motion. This is done by transferring the mechanical movement by the trainee to a generator, which in turn is electrically connected to a battery and/or electrical transformers and/or outlets. Such outlets can be USB charging outlets for charging mobiles. An example can be seen in "The Great Outdoor Gym Company" Website: http://www.tgogc.com/

FIG. 6A-H. Shows various types of variable resistance Outdoor Gym machines. 602 is a Ski or Multi-Trainer machine. 604 is a Recumbent bike and 606 is Combination Overhead Press & Lateral Pulldown. All these examples are by "The great outdoor gym company". At the heart of this type of resistance equipment lies a magnetized gearbox which allows the end user to select a range of resistance levels. A simple adjustment dial on the side of the equipment allows the user to quickly and safely control the resistance range. The mechanism works by a flywheel passing through a field of magnets which causes resistance to the flywheel, to vary the resistance the magnets are moved toward or away from the flywheel. Magnetized resistance has many benefits including frictionless, silent and durable lubrication free movement.

608 is an adjustable resistance bench press machine by "Greenfields Outdoor Fitness LTD". 610 is Adjustable Leg Extension and Curl machine by the same manufacturer. 612 is an Adjustable Stepper also by the same manufacturer. The adjustable resistance in all these devices is based on fluid pressure in a cylinder in which a piston is moving. By moving a knob (in this case adjustment dial on the piston itself) changes the size of a hole or an opening or a valve in the piston itself or in the Cylinder, or in a pipe connecting both sides of the Cylinder. The size of the hole or opening or valve controls the rate of flow of fluid (In most cases air) and thus controls the resistance applied on the piston. Detailed examples of this operation principle can be seen in U.S. Pat. No. 5,762,587A by Dalebout et al. U.S. Pat. No. 7,569,003B1 by Huffman et al. both incorporated here by reference including their references. Other such devices can be viewed at: http://gfoutdoorfitness.com/. The cylinder and piston can be replaced by a plurality of tension members such as springs or rubber bands to achieve a resistance or even a variable resistance.

614 is a Pec Fly Machine and 616 is a Chest Press Machine both by Koopur a Chinese manufacturer. These and others can be viewed at: http://www.koopur.com/. The principle of variable resistance here is achieved using weight plates. To retain the outdoor gym safety the weight plates cannot be removed from the training apparatus. The variable resistance is varied by changing the location of the plates between two steady state locations. One is near the rotation axis of the leaver which is moved in the exercise. Weight plates found at this location have negligible contribution to the resistance felt by the trainee. The other steady state location is at the other end of the leaver which is moved in the exercise. At this end the contribution to resistance is maximal. The force at this point can be calculated in a manner similar to the methods applied in FIG. 3A-G to be the gravity force vector opposite the direction of movement of this leaver end (or in the direction of movement when the leaver goes down and the trainee slows it down). The weight contributing to this gravity force vector is composed of the weight plates near the leaver end, and the moving part of the exercise device. The force that the trainee feels as resistance at the machine handle is a scaled version of this gravity force vector. As in the methods used in FIG. 4A-F the leaver system scales the resistance by a ratio that equals the ratio of the ways between the moving part center of gravity and the point of handling of the handles.

Computerization of the Gym

This application uses among others the methods and systems disclosed in the documents incorporated by reference. Currently the example embodiments of U.S. application Ser. No. 15/594,562 by Arie(Arik) Shavit are set forth. Specifically, the system and methods of FIGS. 1-3 are used and/or built upon in some of the example embodiments of this disclosure.

Figure 7C:
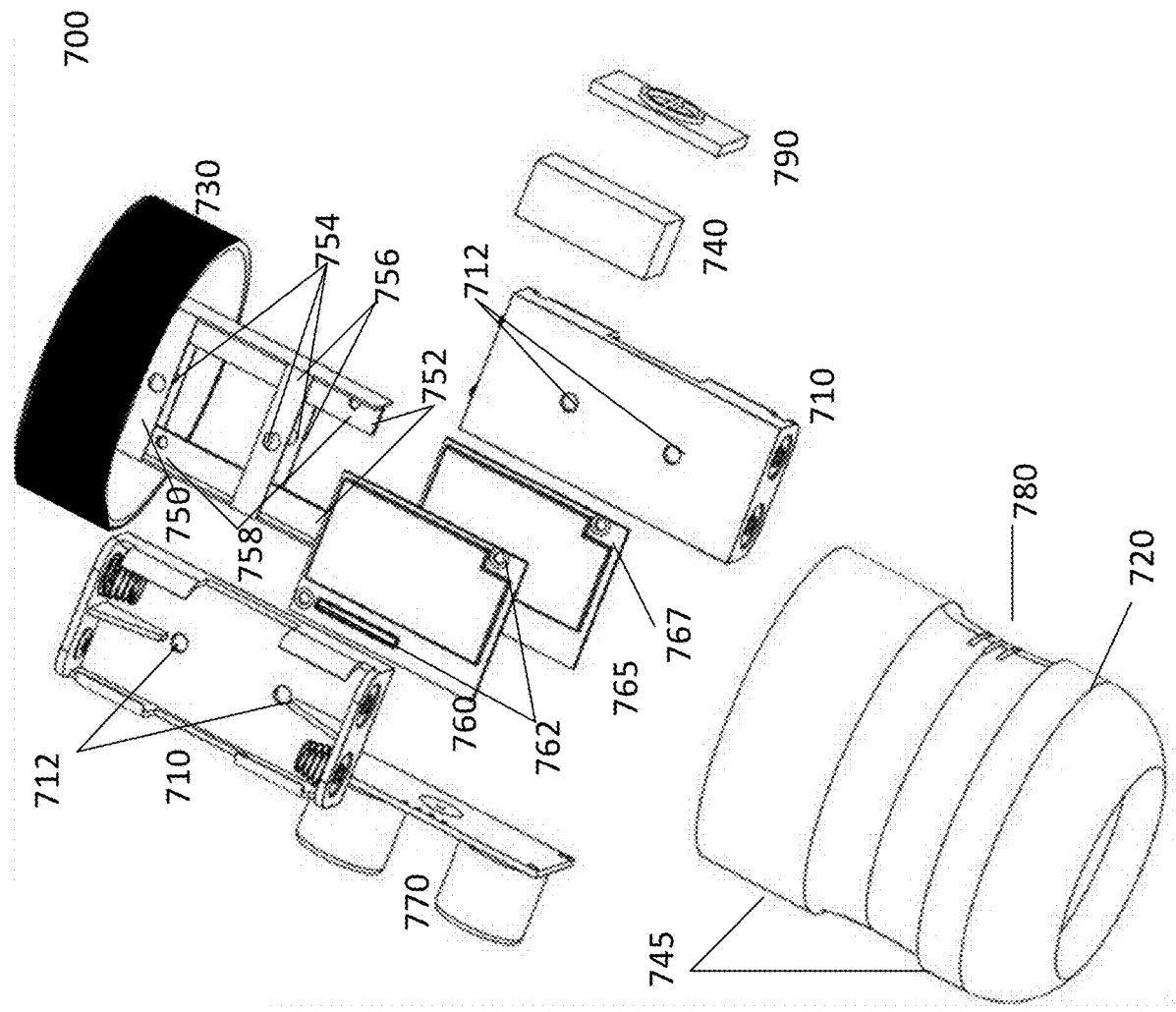
Figure 8A:
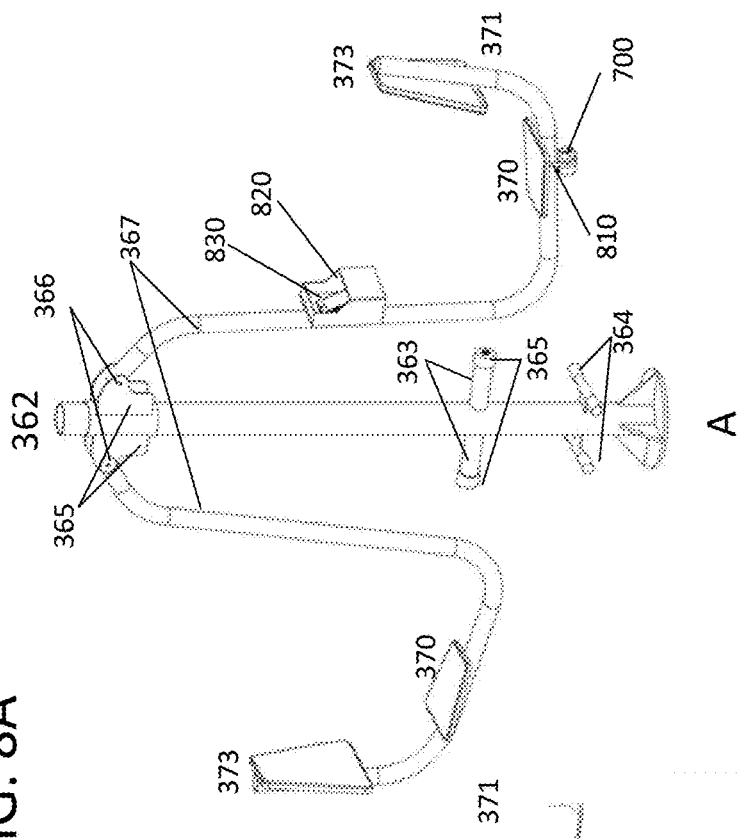
FIGS. 8A-8D—capture an example embodiment of an exercise device configured to be attached to an IoT system and means to mount a mobile device.
Figure 8B:
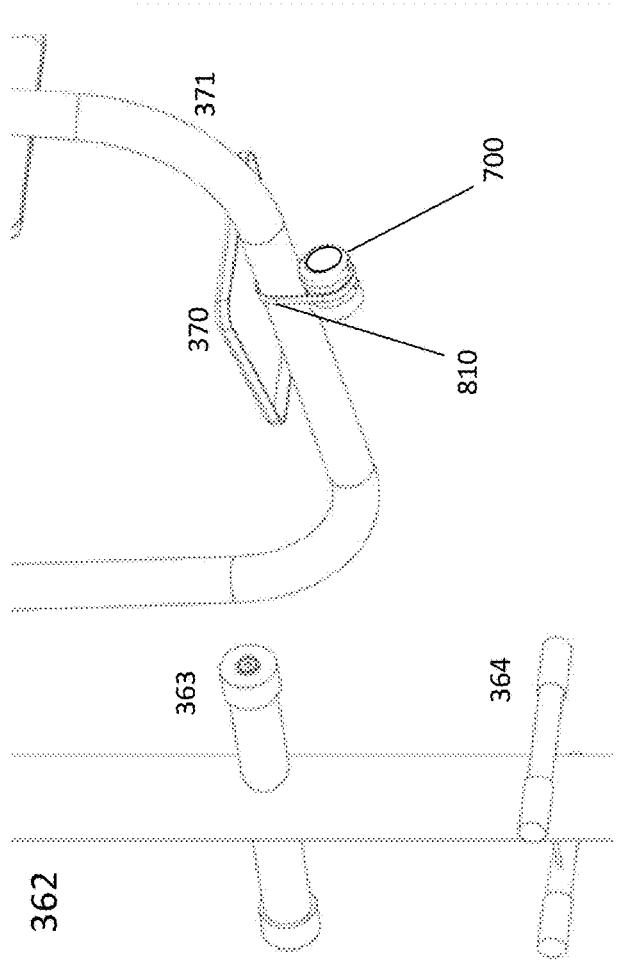
Figure 8C:
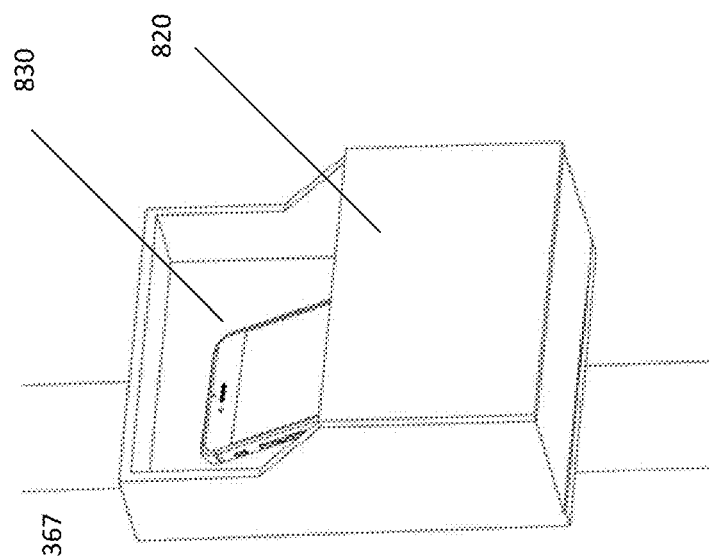
Figure 8D:
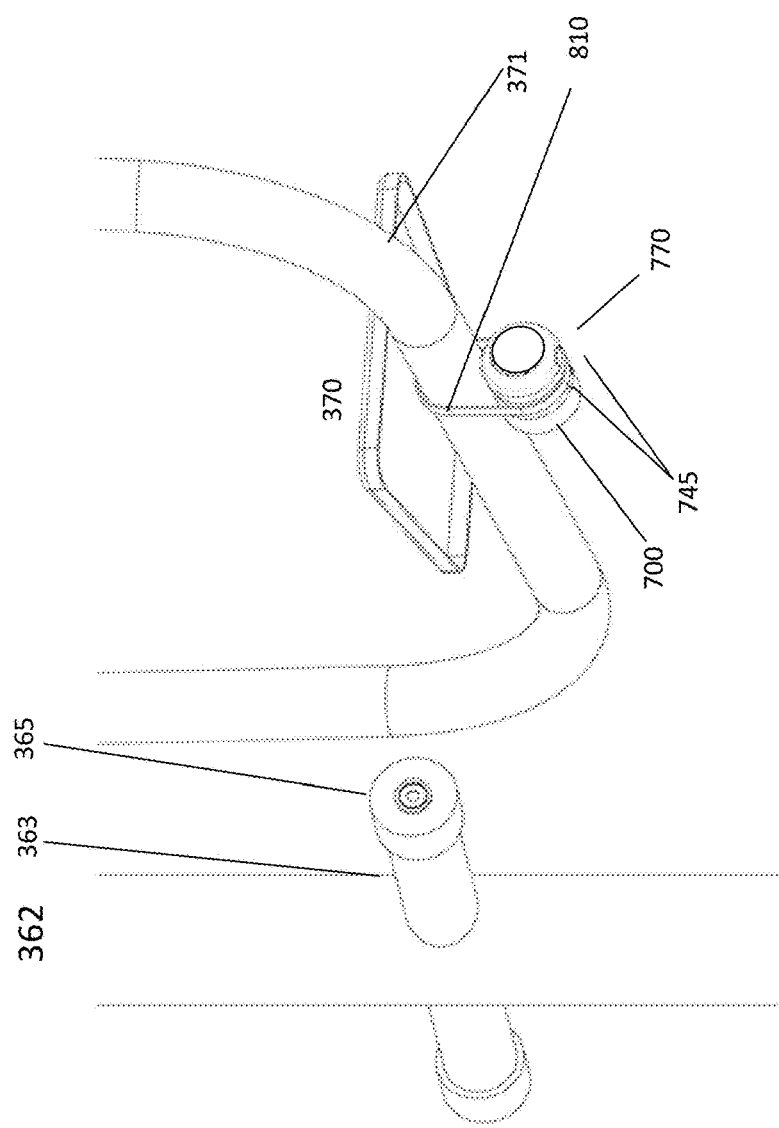
Figure 9C:
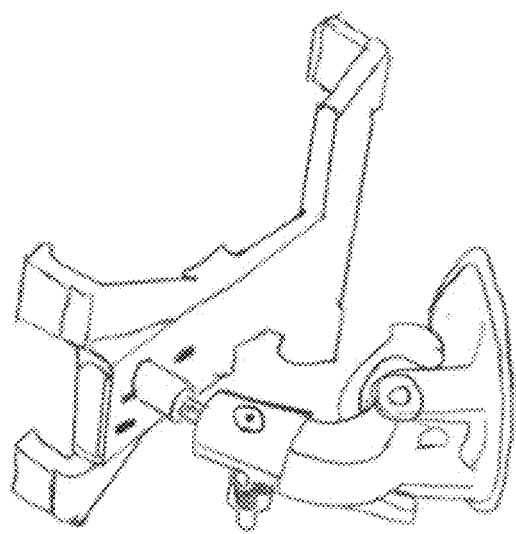
FIGS. 9A-9E—capture devices for mounting mobile devices and attaching them to exercise devices.
Figure 9B:
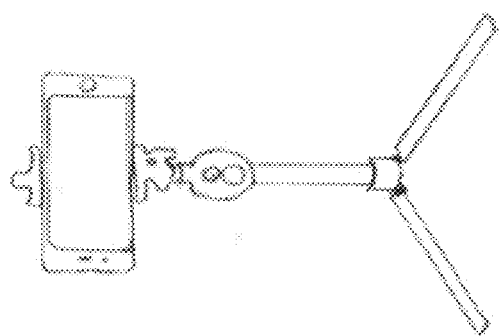
Figure 9E:
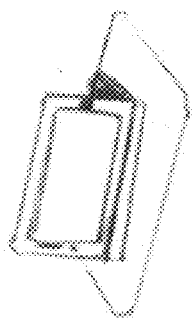
Figure 9A:
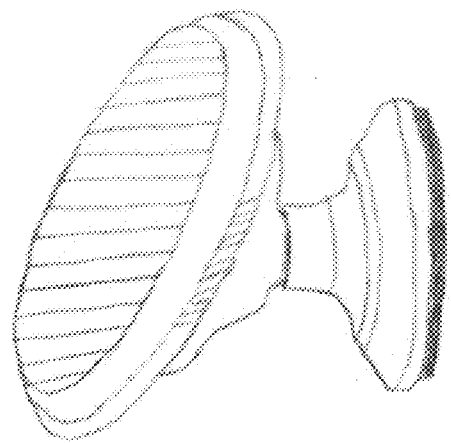
Figure 9D:
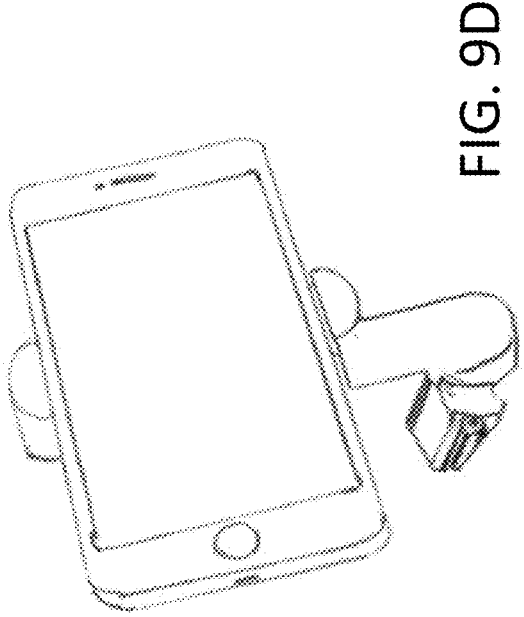

FIG. 7 A, B, C show an example embodiment of an IoT (Internet of Things) system. In FIG. 7A the system is covered by the cover 720. In FIG. 7B the cover 720 is removed to reveal the example embodiment underneath it. FIG. 7C is an exploded view of the IoT system showing all of its main components.

790 are electronic sound speakers, for example BeStar mini speakers Part No: BLS1525-11-08H05 LF (Data-sheet in the reference applications). In this example embodiment the speakers are fastened to the Linear generator 740 but can also be fastened to the cover 720 right under the speaker groves 780 in the cover 720, on the other side of the cover 720 from the groves.

For better clarity and generality fastening means such as screws nuts and bolts are not shown in the drawings. Any of the fastening means and methods given in this disclosure, in the references or known in the art can be used. For example, the speakers can be glued to the inner surface of the cover 720 under the groves 780. The cover 720 can be fastened to the chassis 730 by screwing it where the round part of the chassis 730 can be configured with thread (as shown in FIG. 7) matching a thread on the inner side of the cover 720. The chassis contain a platform 750 for harnessing the inner parts and electronics to it. 740 is a linear generator or other type of system for converting the IoT system movement energy to electrical energy and charging the power source. In this example embodiment the power source are batteries (not shown) fitted in 710 which is a battery case. The batteries in this example embodiment are AAA rechargeable batteries.

A small microphone (not shown) such as Sonion 9240/1 microphone (Datasheet in the reference applications) that can be used for voice activation and commands. In a similar manner to the fastening means, the electric connections or wiring of the electronic components is not shown in order to facilitates better clarity of the drawings. As described above in reference to FIG. 2A-K in application Ser. No. 15/594,562 by Arie Shavit above, all components can be electronically and electrically connected to the system or other components using any method known in the art including wired and wireless connections. In an embodiment the microphone (not shown) and speakers 790 can be connected by wires to the mezzanine board 765 or to the main board 760 using the 12S Audio transfer protocol. An optional Screen (not shown) can be connected to one of the boards 765 or 760 for examples using MIPI DSI protocol wires and connectors.

The chassis 750 in the example is built with rails 752 for the main board 760 and mezzanine board 765 and can include holes 758 for harnessing these boards. Above and below the rails in a height that allows for the boards there are bars 756 for fastening the two battery cases 710. There can be holes 754 in these bars fitting the battery cases holes 712 for fastening the battery cases 710. At the edges of the rails 752 there can be provisions for fastening the screen (not shown) or the screen can be fastened to the case 720. Another scheme for the screen can be that the chassis physically pushes it and holds it in place by its dimensions further assisted by the shape of the case 720 without additional fastening means. The chassis 750 can also include similar mean or methods to fasten the ranging sensor 770 and Linear generator 740 or they can be glued to it for example. Small rings that are preferably made out of shock absorbing materials can be using to assist in fastening and positioning the system components. They can be put above the holes 758 in the rails 752 so that they provide support and help position the boards 765, 760. The fastening means for the boards can pass through the ring shape. The rings can provide shock absorbing for the electronics found on the boards 765, 760. By configuring their height, they can also insure that the boards 760, 765 will not touch each other or other parts in the system. They also create some spacing for better airflow and cooling of the boards 765, 760.

770 is a ranging sensor. It can be any type of sensor that can be used for measuring distance to features in the exercise device or environment. For example, it can be a type of Radar or Lidar sensor, an optical sensor such as a camera, a Laser sensor or for example an active acoustical sensor like the SR04 mentioned in the references. The SR04 is the one used in this example. 745 are two round shaped opening in the cover 720 which are not shown. They are positioned on the cover 720 right above the Transmitter and Receiver of the acoustical sensor SR04 770. This is in order to allow free path for the acoustical outgoing and incoming waves.

The boards 765 and 760 include the required electronics: 760 is the main board. In the example it includes a logic subsystem 215, data holding subsystem 214, Data storage Device 280 (The numbers 214, 215, 230, 260, 280 refer to FIG. 2A-K of in application Ser. No. 15/594,562 by Arie Shavit). For example, the main board 760 can be Intel Edison Platform (Product brief attached to application Ser. No. 15/594,562). In this case the main board will also include WiFi modem and Antenna (Wireless Connection controller 260) Sound Controller (230) and more like for example the Edison GPIOs can be used to control the HC-SR04. In this configuration the mezzanine board 765 may include circuits to supply the desired voltage to the boards from the batteries like Voltage Converters, circuits for power management such as switches and suppliers regulators; charge pump circuits, circuits to control the linear generator 740 and the battery charging from it (all circuits can be managed from the main computing unit). The mezzanine board can further include USB HUB or switch connected to the main board USB port if such exists. It may include MIPI DSI and CSI Integrated circuits that connect to the main board via the USB HUB or different connections such as 12C and/or SPI and/or any other available connections of the components. The Integrated circuits on 760 and 765 can serve as the Display and Camera controllers (220). In an example a video processor such as the BCM2835 by Broadcom Corporation (Interface DS attached) can be used in the mezzanine board 765 to interface the display and an optional camera (not shown). The mezzanine board 765 may further include accelerometers (In 3 directions or less) and/or Gyros (In 3 directions or less) and/or GPS other sensors.

In another example configuration the main board 760 can be one of the Raspberry Pi series systems. Preferably in this example the Raspberry Pi Zero because of its small size and low cost. In this case the Raspberry Pie includes a video processor but does not include WiFi and Bluetooth connections. The mezzanine board 765 configuration in this case can include circuits to supply the desired voltage to the boards from the batteries like Voltage Converters, circuits for power management such as switches and suppliers regulators; charge pump circuits, circuits to control the linear generator 740 and the battery charging from it (all circuits can be managed from the main computing unit). The mezzanine board can further include USB HUB or switch connected to the Raspberry Pi. It may further include HDMI to MIPI DSI Integrated circuit such as the ADV7480 (Data Sheet attached) for interfacing the optional display (not shown). It may further include WiFi and/or Bluetooth modems and antennas. The mezzanine board 765 may further include accelerometers and/or Gyro and/or other sensors.

The example embodiment IoT system can use the ranging sensor 770 to detect the range to the floor, ceiling, dominant feature in the exercise machine a reflector and alike. Ranging sensors like 770 can be mounted on both sides or any side or sides of the system in parallel. In this case the ranging sensors can detect the range to more than one feature and thus increase accuracy or increase robustness of operation if one or more feature ranging fails.

The system may also have Accelerometers and Gyros. These can be used to assist in counting repetitions and other features as described in this disclosure and the references. They can be also utilized to specific functions advantageous to this example embodiment: Accelerometers and or Gyros can be used to better utilize the system energy: The system may be kept mostly in power down or in low power states where some of its components are turned off. A plurality of Accelerometers and/or Gyros may be left on in these cases to sense for movement. In case the movement or acceleration is above a certain threshold the system maybe powered up or made to leave the low power states and turn on the required components.

Other methods known in the art to achieve such "awakening" process can be utilized. For example, the range sensor can be made active once every period of time to check if there were a change in range over a certain threshold. Another example the optional camera can be made active from time to time to detect movement. When movement stops go to low power state again. In the time of the movements after the resistance has been calculated only parts of the system can be on for example some of the accelerometers and/or Gyros can be active to count repetitions and monitor movement range and maybe some of the I/O systems in order to give this information to the user. The optional camera and/or range sensor can be off at this time if they are not used to count repetitions, monitor movement range or other required functions. After the movement ceases for some time the system can infer that the exercise is done and turn on some I/O devices such as the optional screen or the speaker to present exercise summery and also for example turn on the WIFI/Bluetooth modem and antenna to transmit the exercise data and summary to the cloud or user WCD or mobile for example. Other power schemes using similar and other method are also possible.

FIG. 8A-D shows 800—an example embodiment of an outdoors exercise machine which is computerized using the IoT system 700. The example embodiment is shown on the Leg Press Machine 310, 360 from FIG. 3A-G. This example embodiment can be easily applied to all outdoor gym resistance machines of the types shown in FIGS. 3, 4, 5, 6 and can also be applied to indoor gym resistance machines and alike.

As in FIG. 3A-G —362 is the central pole holding the machine. 364 is the leg rest which the trainee (not shown) pushes against. 365 is a holder rigidly connected to the pole 362 which holds 366 which is the pivot connecting the rod 367 to the pole 362. 370 is the chair on which the trainee (not shown) is sitting on. 371 is the rod or chassis that connects the chair 370 with the moving rod 367. 373 is the back-rest plate. 363 is a mechanical stop not shown in FIG. 3A-G. It is ended by a cone of soft material 365 mounted on it. Its role is to mechanically stop the moving rod 367 from colliding with the central pole 362 and also to set lower limit to the motion of the rod 367. In 310 this function is implemented at the holder 365.

In this implementation example the right leg press machine is computerized. The IoT System 700 is rigidly attached to the rod 371 under the chair 370. 745 are the holes for the receiver and transmitter of the range sensor 770. The range sensor 770 in this example is pointing down and measuring the distance of the IoT system 700 from the ground (not shown). In this example a strip 810 is used to attach the IoT System 700 to 371. The Strip can be made out of rigid material such as metal like iron, steel, aluminum and alike. It can also be made out of elastic material such as rubber and alike. Other materials are also possible. The strip 810 can be fastened to the system 700 and the rod 371 using any kind of fastening mean known in the art. If the strip 810 is made out of elastic material no additional fastening may be required as the strip will fasten itself around 371 and 700. If the strip 870 is made out of a rigid material such as metal, fastening mean like dowels, Hose clamp, sliding fastener and alike can be used. The strip itself can be cable tie or zip tie. More than one strip can be used. Gluing nailing or screwing can also be used to connect 700 with 371 with or without the strip 810. UK Patent Application GB-2483117-A Incorporated here by reference, elaborates many examples for methods for mechanically attaching or coupling devices to a training apparatus. These methods and others given in the references can be used.

One of the possible methods for attaching IoT system 700 to the exercise device 800 is using a sticker. For example, using a tape or a double-sided tape to stick the IoT system 700 to the exercise device 800. In an example embodiment the entire IoT system can be implemented as a sticker: For example, a small strip of material may include miniaturized components of the IoT system 700 such as a logic subsystem 215, data holding subsystem 214, Data storage Device 280, accelerometers and/or gyros, battery and/or power supply connection, wireless communication device such as Bluetooth-Low-Power and alike. (numbers refereeing to application Ser. No. 15/594,562). Any-other of the components of IoT system 700 mentioned in this disclosure or the references can be miniaturized and added to the sticker implementation example. The strip of material my include some layers of strip or cover, covering the components and joining them together. The strip may have one edge or more covered with adhesive material in order to facilitate a sticker and allow attaching or sticking it to the training device 800. The training device can be any training device mentioned in this disclosure or the references, preferably with moving parts without limitation. The sticker implementation can stick on a moving part and monitor it's movements, it can stick on a non-moving part, or in the environment and monitor a moving part or a body movements for example using a TOF type sensor like ultrasonic distance sensor, or any other method given in this disclosure or the references. The sticker example embodiment can facilitate and implement all the requirements and implementations of the IoT system 700 in this disclosure and the references. The sticker example embodiment can be considered a WCD worn on a person or a device and therefore can implement the example embodiments of U.S. application Ser. No. 15/594,562. The sticker example embodiment can also serve as a marker for a camera-like solution for motion tracking and alike.

820 is a device for holding a mobile device and 830 is an example mobile device in this case a mobile phone. In FIG. 8A-D the mobile holder 820 is an open box shaped apparatus rigidly attached to the rod 367. It can also be attached to other places such as the non-moving pole 362. In the example of FIG. 8A-D it is made out of transparent plastic material. Other apparatuses known in the art can be used to hold a mobile device such as those shown in FIG. 9A-E. Preferably the mobile device holder should be configured to hold the mobile device so that it can interact with the user. Preferably the user can see the mobile screen and receive feedback on the training. Other interaction methods are possible: preferably the user and mobile device can interact in at least: seeing the mobile device screen; hearing the device speakers and/or vibrations; Interacting of the mobile with a wearable computing device which is on or near the trainee and alike. The Holder 820 of any type can be connected to the exercise device 800 in any of the methods mentioned in the previous paragraph, in this disclosure, the references or known in the art. The connection method should insure that the mobile device will not fall during the exercise. Preferably the holder should be compatible with holding as many types of mobile devices as possible. FIG. 9A-E shows some of the mobile attachment methods known in the art.

The exercise device 800 may include other interface means instead of 820 and 830 or in addition to them. Any of the I/O or Interface devices of FIG. 2A-K in application Ser. No. 15/594,562 by Arie(Arik) Shavit or in any other part of it can be used. For example, a touch screen can be mounted on the exercise device 800. For example, Speakers and Microphone found on the IoT system 700 can be used. Gesture recognition on the output of a camera or depth sensor can be used where this sensor can be mounted on the exercise device or elsewhere. Wearable computing device on the user or near him can be used instead or in addition for interacting with the user. For example, the IoT system 700 can connect wirelessly or wired to this WCD and interact with the user and/or mobile device and/or cloud through it.

Using the methods of application Ser. No. 15/594,562 the IoT system can determine at least one of the IoT system's location relative to a feature; the IoT system's orientation; the IoT system's acceleration; the IoT system's speed; other measurements mentioned in application Ser. No. 15/594, 562. For example, the range sensor 770 measures the distance of the IoT system from the ground at a certain frequency—for example 20 times a second (20 [Hz]). Or the onboard accelerometers can measure the IoT system 700 acceleration and alike. Using the methods in application Ser. No. 15/594,562 and references the following can be determined: count repetitions, measure the exercise pace, measure the motion range, identify the exercise, correct it, calculate the energy used, calculate the way travelled, or any other training measure which can be determined using to these methods according to application Ser. No. 15/594,562 or the references.

In application Ser. No. 15/594,562 there are methods to determine these training measures using a Mobile Device or WCD found on a moving part of the training apparatus or on the moving user. Of course, these methods can also be used here. The Mobile device 830 can be used: In case it is held by the holder 820 on a moving part such as 367, it's onboard accelerometers and/or Gyros can be used to find the training measures according to the methods of application Ser. No. 15/594,562. Other systems that can be found on it can be used like transmitters and receivers of Wi-Fi, Bluetooth, Infra-red can be used for finding location and other measurements, Microphone and/or Speakers, Camera, and alike. Also, a WCD worn on the user can be used. In the example of FIG. 8A-D the user is moving with the exercise device, or at least parts of him like hands, legs etc. A WCD worn on a moving part can be used according to application Ser. No. 15/594,562 and the other references.

It is advantageous to use the IoT system 700 over the user's mobile or WCD. One advantage is that it does not oblige the user to bring a mobile or a WCD, or take the mobile out of his pocket if he did bring one. Not every mobile or WCD has all the required sensors or the sensor it has may not have adequate qualities. Also, the system 800 may require calibration of the mounted IoT system 700 top give good enough results. This may be difficult to do with different users having different devices.

One more way the IoT system 700 or the mobile device 830 monitor exercise performance is through listening to sounds and vibrations. Mechanical vibrations and sounds as a result of the movement of the exercise device can be captured by a microphone in the IoT system 700 or a mobile or WCD microphone. Using the methods described in application Ser. No. 15/594,562 related to FIG. 3A-G, 350 and in other places at application #15594562 and in the references the required training measures can be extracted. Specifically, the period of repetition of a certain vibration or sound, related to a mechanical condition can be used to determine performance of repetitions and pace. Such a mechanical condition can be a knock of two parts, certain friction between them related to their relative location and alike. Identifying the sounds (For example by correlation between them or them and a reference) and measuring the time between them can be used to determine performance of repetitions and pace.

Strain gauges and pressure sensors can also be used and be connected to the IoT system 700 wirelessly or by wired connection. For example, in 800 a strain gauge can be applied using the methods discussed in Ser. No. 15/594,562 on the rod 367. The gravity force vector 376 is compensated by the normal force which the rod 367 applies. Therefore, a reading of a strain gauge on the rod 367 will have some proportion to the gravity force vector 376. Using the methods of application Ser. No. 15/594,562 the training measures can be determined. A Strain gauge, force, pressure sensor and alike can be applied on every moving part which is subject to force or pressure in the system 800. This method is applicable to all training devices and groups in the previous FIGS. 2, 3, 4 5 and 6.

As described in FIGS. 1 and 2 application #15594562 the overall system may include a plurality of Cameras or more generally sensors that can create a type of image in the 2D or 3D space. As also described in application Ser. No. 15/594,562 such sensors can track a marker or a feature or a beacon on the IoT system 700 or on the exercise device. This tracking can supply the IoT system or the feature's location and/or velocity and/or trajectory and alike. And thus, according to application Ser. No. 15/594,562 and the other references the training measures can be determined.

FIG. 10A-G shows possible connection points for IoT system 700 and/or strain gauges/force/pressure sensors on the training machines discussed in this disclosure. One or more machine or apparatus taken from each group, the generalization to the entire group should be obvious to the skilled in the art.

120 in FIG. 10A-G is again the horizontal bar from the previous figures. It is possible to apply strain gauges on the horizontal bar itself in the methods discussed in to application Ser. No. 15/594,562. In this disclosure 1010 denotes the locations in which sensors like strain gauges and/or pressure sensors and/or force sensors can be attached. In general, it should be understood that if 1010 or any other number 1000-1200 in FIGS. 10 and 11 points to a certain part on an exercise device any location on this part can be a suitable location. According to application Ser. No. 15/594,562 and it's references the "best" location in turns of the best measurement on this part can be determined. For example, the best location for the horizontal bar 120 according to application Ser. No. 15/594,562 and it's references maybe the middle of the bar according to the "bending beam" example in the book "An Introduction to Measurement using Strain Gages" by Karl Hoffman incorporated to the application by reference. A not ideal location on a part pointed to by 1010, can be chosen by one skilled in the art because of constraints like aesthetics, ease of access and ease of wiring, protection from dirt, weather and mechanical damage and alike. The strain gauges will measure small variations in the horizontal bar dimensions. Using the methods application #15594562 the measurements can determine all the sought training measures such as counting repetitions, motion range, etc. The strain gauges can be replaced by pressure sensor/force sensors and alike. The advantage of using strain gauges or pressure/force sensors is that apart from training measures such as repetitions and motion range their measurement can also yield the force applied which can be translated to resistance. In this horizontal bar example, the dimensions changes measures by the strain gauges 1010 are a function of the force applied on the bar which is applied by the trainee (is most likely a function of the trainee weight). This force can be determined from the measurement to a good degree of accuracy and this is the measured resistance. The force or pressure sensors or strain gauges 1010 can be applied or attached to the pins/screws/connectors which rigidly connect the horizontal bar to the poles holding in the methods given in application Ser. No. 15/594, 562 and known in the art. The advantage of such a connection is that these sensors will not be visible astatically and can be easier to replace—by replacing the screw/connector. U.S. Pat. Nos. 4,630,490A, 3,388,590A, and 4,314,481A incorporated herein by reference disclose such screws or connectors coupled with sensors to measure the forces on them. The strain gauges/sensors 1010 can be glued to the surface of the bar or inside it since usually the bar is hollow. In case these sensors 1010 are on the surface a cover can be used to cover them for aesthetical reasons and for protecting them from dirt weather and alike. 1005 denotes parts on the exercise device which are not ideal for the sensors discussed in this paragraph like strain gauges to be attached to, but where such sensors can still be attached to and lead to satisfactory results. i.e. 1005 are possible locations for such attachments which are not the recommended ones. If the recommended ones cannot be used, the not recommended ones 1005 can be used. The sensors discussed in this paragraph can be connected using wires or wirelessly to an IoT system like 700. The IoT system which may include the computing device, communication devices etc. may be located at a different place in the exercise device, on it, or near it. Any of the attachment methods shown or discussed in this disclosure or the references can be used.

As explained before WCD or mobile found on the user can serve the purpose of determining some of the training measures. For example, using the methods of application Ser. No. 15/594,562 and the references a mobile or a WCD containing sensors like accelerometers and or Gyros and alike can track the movements performed on the exercise device 120 and determine the training measures. As also explained other sensors and devices on the mobile or WCD can be used such as a camera, WiFi transmitter and receiver and alike.

All the methods and systems disclosed herein for the Horizontal Bar 120 can be applied to the parallel bars 115 and to all other devices in this group some of them shown in FIG. 2A-K.

305 is the leg press machine from FIG. 3A-G. Force Measuring Sensors can be positioned at 1005 and measure the forces exerted by the user on the leg rest. The term "Force Measuring Sensors" in this disclosure will apply to Strain Gauges, Piezoelectric based sensors and alike used for measuring: Strain, Change in Dimensions, stress, pressure, force and alike. Such sensors can be placed at 1010 on the moving parts of the Leg press machine. Motion or Location Measuring Sensors can be placed on the moving part of an exercise device which in the leg press machine example is indicated by 1020. The term "Motion or Location Measuring Sensors" refers to any sensors that can indicate the location and/or acceleration and/or trajectory and/or direction and/or speed and alike. The obvious ones can be gyros and accelerometers. However, there are less obvious ones such as cameras, location by triangulation and alike. The sensors and the methods for measuring location and motion are fully disclosed in the references. 1020 will indicate in this disclosure parts or places on which Motion or Location Measuring Sensors can be placed. Using the method so disclosed herein the sought training measures discussed herein can be determined.

315 is the "Air-Walker" from FIG. 3A-G. 1020 indicates locations where Motion or Location Measuring Sensors can be placed. It is indicated that the preferable locations from all locations indicated by 1020 for all devices are those which experience maximal movement range. Other preferable qualities of these locations are that they will not impact the raining device operation and/or aesthetics and that they will be possible to access for maintenance. In the case of 315 for example, such preferable location is under the leg rests, though all 1020 positions are possible. The leg rests are experiencing the maximal motion and motion range and also putting the IoT system bellow them will make it aesthetically invisible yet accessible to maintenance. It is preferable to have one sensor set for each leg rest. The IoT system can be on one of them for example, on both, or in another location but communicating with the sensors sets. The moving parts of the machine 315 are also the preferable locations 1010 for the Force Measuring Sensors solution.

1030 In this disclosure denotes locations which Rotation Measurement Sensors can be applied. The term "Rotation Measurement Sensors" refers to apparatuses that measure rotation such as Encoders, Ray Gyros, Gyros and alike. The locations 1030 are usually around pivots or bearings where rotation takes place. In the case of 315 tracking the direction and angular distance of the rotations in 1030 can give the range of movement, track reputations, by dividing by time it can give pace and thus with the measure of resistance given from another source can give all the required training measures.

402 Is the rowing machine from FIG. 4A-F. 406 is the two columns of Lat pull down from FIG. 4A-F. 408 is a combination of Chest Press and seated row from FIG. 4. FIG. 10A-G shows 1020—the locations where Motion or Location Measuring Sensors can be positioned, 1010—the locations where Force Measuring Sensors can be positioned, and 1030—the locations where Rotation Measurement Sensors can be positioned. Based on the methods hereby disclosed the sought training measures can be determined in each of these devices and the other devices in the groups depicted in FIGS. 3A-G and 4A-F.

FIG. 11A-G shown further example embodiments for computerization of exercise devices. 504 is the Recumbent Bikes from FIG. 5A-H. Rotation Measurement Sensors can be places around the axis of rotation or bearing of the flywheel 1030. Another or complementary solution is to attach Motion or Location Measuring Sensors to the moving parts of the bike 1020. Since the pedals experience maximum motion range they maybe preferred for this type of solution. Another solution not shown is related to these bikes power output. Since these bike can comprise a generator for producing electricity the resistance the user experiences and other training measures can be determined by the electrical characteristics of the electrical output. Characteristics such as voltage, current and power. This is further explained in application Ser. No. 15/594,562. The resistance the applied on the user can also be set according to application Ser. No. 15/594,562.

512 is the "Tai-Chi Spinners" which is similar in mature to the Hand Bike 506. 514 is another version of the Cross Trainer 502, both from FIG. 5A-H. Similarly, to previous examples 512 and 514 can be computerized by as depicted—1020 locations where Motion or Location Measuring Sensors can be positioned, and 1030—the locations where Rotation Measurement Sensors. In 514 also Force Measuring Sensors can be positioned on the moving parts in this case 1020 can also indicate possible locations for Force Measuring Sensors.

606 is Combination Overhead Press & Lateral Pulldown with variable resistance. The computerization with Rotation Measurement Sensors located at 1030 and/or Motion or Location Measuring Sensors located at 1020 and Force Measuring Sensors located at 1010 is similar to what so far disclosed. 1035 is an adjustment dial for adjusting resistance as explained above. A Rotation Measurement Sensor that is attached to 1035 or near it and configured to track 1035's rotation movement can track the resistance set on the device. This sensor can be wirelessly or wire connected to the IoT system 700, Mobile device or WCD 830. 1032 is the flywheel passing through a field of magnets which causes resistance to the flywheel described above in relation to 606 and 504. Installing a Rotation Measurement Sensor tracking the rotation of 1032 can also achieve the goal of determining the sought training measures. The flywheels acceleration and motion is a function of the machine's handles or pedals motion and so by sampling the acceleration of the flywheel or it's location at a sufficient rate the movement range, pace, repletion count and other sought training measures can be determined by methods known to the skilled in the art. Another sensor that can be used near 1032 is a magnetic field sensor. Since the resistance is set by the amount of the magnetic field applied on the flywheel 1032, measuring this magnetic field can give the resistance.

608 and 610 from FIG. 6A-H are adjustable resistance bench press machine by "Greenfields Outdoor Fitness LTD" and adjustable Leg Extension and Curl machine by the same manufacturer. The computerization with Rotation Measurement Sensors located at 1030 and/or Motion or Location Measuring Sensors located at 1020 and force Measuring Sensors located at 1010 is similar to what so far disclosed. 1035 is an adjustment dial for adjusting resistance as explained above. As disclosed a Rotation Measurement Sensor that is attached to 1035 or near it and configured to track 1035's rotation movement can track the resistance set on the device.

616 is a Chest Press Machine from FIG. 6A-H. The computerization with Rotation Measurement Sensors located at 1030 and/or Motion or Location Measuring Sensors located at 1020 and Force Measuring Sensors located at 1010 is similar to what so far disclosed. The set resistance on the machine can be self-entered by the user to an application or software running on the IoT system 700, the mobile device or WCD. The resistance can be inputted using any of the input devices of the IoT system 700, the mobile device or WCD. The set resistance can also be measured on the device. Few methods can be used. First a camera located on the mobile or WCD or situated at the Gym environment can identify the number of plates at the location far from the axis 1050. This can be aided by putting a marker or a prominent color or feature on each weight. The camera can count these features and determine the resistance. Another method is to put some waves (electromagnetic or others) repeater or reflector or transmitter on each weight plate. The repeater or transmitter should be configured to have a limited range. The range can be such that a receiver located at the far from the axis location 1050 can only pick it up if the weight is near it, i.e. at the far from axis location 1050 impacting the resistance. A threshold receiver that can filter weaker than threshold signals can solve any issue with farther weights repeaters or transmitters. Another method proposed is to put proximity sensors on locations 1040 on the rod that guides the weight plates. These sensors role will be to sense when a weight plate is passing above them. For example by transmitting electromagnetic or other waves up and wait for a reflection from a weight when it passes. Two such sensors with a simple logic state machine can determine when a plate is moving and staying in the far from the axis location 1050 or moving and staying in the other side. Thus, it is possible to count the weights on each side.

Suspension training apparatuses such as TRX can also be used in outdoor gym environments. Computerization of Suspension training devices such as TRX is explained in application Ser. No. 15/594,562.

Determining or Calculating the Resistance

In outdoor fitness machines it is sometimes not obvious how to determine the resistance. In the chapter "Computerization of the gym" solutions were introduced, for example measuring the force using "Force Measurement Sensors". Additional solutions will now be proposed.

As explained in relation to FIGS. 3A-G and 4A-F in some outdoor gym machines uses the users weight or some of their moving parts weight or both to set the resistance. The resistance can be a function of these, for example multiplying by a trigonometric function of a certain angle or by a scaling factor determined by a leaver system configuration. The chapter "Determining the users weight" will discuss the ways the system determines the user and relevant machine parts weight. If the weight is known there are several ways to determine the resistance. Here are some example embodiments:

1. Use the calculated or measured force exerted by the user as the resistance level. For example, the forces measured by Strain Gauges. Another example are the calculated forces to be used as resistance level: by multiplying the combined weight with a trigonometric function of the angle as in FIG. 3A-G or in some scaling ratio as in FIG. 4. The force can be measured in Newtons [N] in Kilograms of force [Kg] etc.
2. Use a function of the measured force the simplest one is to multiply it by a constant. In some cases, a more elaborated function may be used if for example it is desired to give the resistance logarithmic qualities. A Look Up table can be used to multiply the force by different constants according to its value. In some cases, after a short time, a beginner trainee experiences fast progress in the force levels he can exert between training sessions. A Look Up Table can scale down the Force in the lower values of Force to make them closer, so that it will give the trainee a more linear feeling of progress.
3. In some cases, the measured or calculated force during the exercise is not constant. For example, in FIG. 3A-G the angle in the machine 310 or 360 is changing during the exercise performance. Therefore, the calculated force is not constant. In these cases, it can be decided that the resistance can be:
    a. The maximal/minimal/average force during the exercise performance, or any factor or function on these.
    b. An integral of the force with the path or with time, or with some of the path or time or a factor/function of these.
    c. A property which affects the force or energy excretion by the user. For example, in machine 360 example such properties can be:
        i. The user weight or mass.
        ii. The combined weight of the user and the relevant parts of the machine.
        iii. The maximal angle that the user can reach.
        Each one of these can be stated as the resistance. In the example of 410 There is also the property of the scaling factor related to the leaver system. This factor can be stated as the resistance.
    d. The energy exerted—can be the average per repetition, the average for a set, the average for all the set performed and alike. Can also be the maximum or minimum or any factor/function of these.

Determining the Users Weight

Several solutions can be used for determining the user's weight and the relevant machines parts weight. The simplest way is that the user or a coach or administrator and alike will input his weight to the IoT System 700, Mobile device, WCD, computer or by any other input means of the overall system described in application Ser. No. 15/594,562. The machines relevant weight is the weight of the parts effecting the resistance as explained in relation to FIGS. 3A-G and 4A-F. This weight can also be inputted be the user or a coach or administrator and alike. This weight can be determined by weighing the relevant parts, manufacturers data, weighing them on the machine for example by using Force Measurement Sensors, calculating this weight for example by measuring their size and volumes and multiplying by the material density and alike.

As part of the overall system a "smart" or connected weighing device can be used. This weight can weigh the user and input the weight automatically to the overall system data base. For example, such "smart weighing device" can transmit the weighing result wirelessly to the user's mobile device. Such a "smart weighing device" can identify the user automatically in methods like face recognition, or by communicating with the user's mobile or WCD or by other methods disclosed herein or in the references. Such a "smart weighing device" can be integrated in the gym floor and not require the user to do any action: when the user walks or step on it in can measure the users weight automatically and also identify him automatically and input the weight to the system. Force Measurement Sensors found on any of the gym machines can perform a similar operation: The force they measure is a function of the combined weight of the user's weight and the machine relevant parts weight. The system can calculate from the force measured the combined weight by using the reverse function. Then the system can substract the machine relevant parts weight and determine the user's weight. Since the system or exercise machine can Identify the user by the methods disclosed in this disclosure and the references, the overall system can thus obtain the users weight.

As described in application Ser. No. 15/594,562 the overall system may include cameras or similar sensors placed around the gym. These cameras can use methods known in the art to estimate the users weight from the cameras or sensors input, like for example US patents U.S. Pat. No. 8,351,656B2, U.S. Pat. No. 7,128,024B2, application: US20100111370A1 all incorporated here by reference.

Changing the Resistance

It is desirable to be able to change resistance in the outdoor gym machines in a manner which complies with the paradigms:
  All moving elements are within the frame.
  The equipment is free from all crush, entrapment and shear points.
  The equipment is free of sharp edges.

As disclosed many outdoor gym machines rely on body weight for generating the resistance. Therefore, the first obvious solution is to increase the user's body weight using for example attachment of wearable weights like for example wrist weights, backpack with weight and alike.

Figure 12:
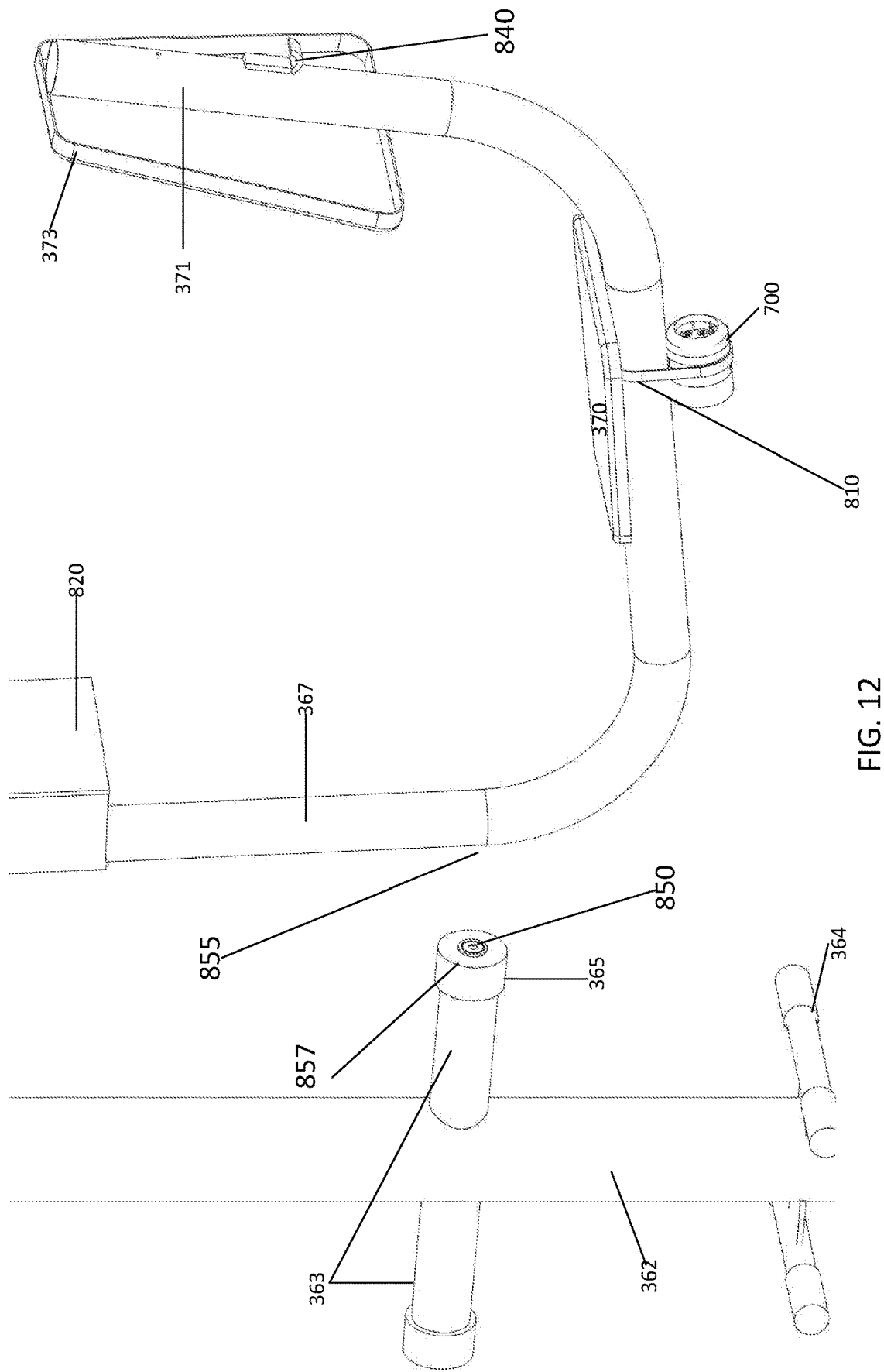
FIG. 12—depicts an example embodiment of an exercise device configured with an IoT system, a hook for mounting variable resistance, charging ports for the IoT system and/or a force measuring device.

FIG. 12 gives another possible example embodiment for changing the resistance. The computerized gym machine 800 from FIG. 8A-D is presented. 840 is a hook for hanging additional weight on the machine. It is preferable that the hook build will be free of sharp edges. Instead any edges can be rounded for example like in the hook 840. It is possible to hang on the hook weights or other weight objects—any object intended to add weight to the machine 800—like sacks filled with sand or any other material, water containers and alike. Sacks filled with sand or with soft or powdery materials may be preferred from a safety standpoint, since they are less likely to cause injury if they fall on someone or someone bumps into them. The hook itself can be replaced by any type of mechanical catch known in the art. For example, 840 can be a carabiner which is attached to the exercise device 800. The weight or weight object may contain a ring to attach to the carabiner. The catch can be a ring connected to the machine 800 where the weight object has the corresponding mechanical catch that connects to it. For example, the weight object can have a corresponding ring or a hook or a carabiner and alike. Another example for the catch in a type of clamps like "Crocodiles" which can catch a sand bag or alike. The location of the hook or mechanical catch 840 can be everywhere on the moving parts for example 371 or 367 of the machine 800. Some locations are preferable since they have the advantages of less obstruction to the user and to the movement of the machine, higher effect on the center of gravity (usually farther object effect more on the center of gravity), better aesthetical look, possibility for a stronger and more reliable catch of the weight object and alike. For example, the location of 840 in FIG. 12 has all these advantages: It is behind the chair—so will not obstruct the user or the machine movement, it is relatively far from the center of gravity, because of the angle it is a good catch point and it is aesthetically appealing both when the weight object is on it or off it.

Figure 13:
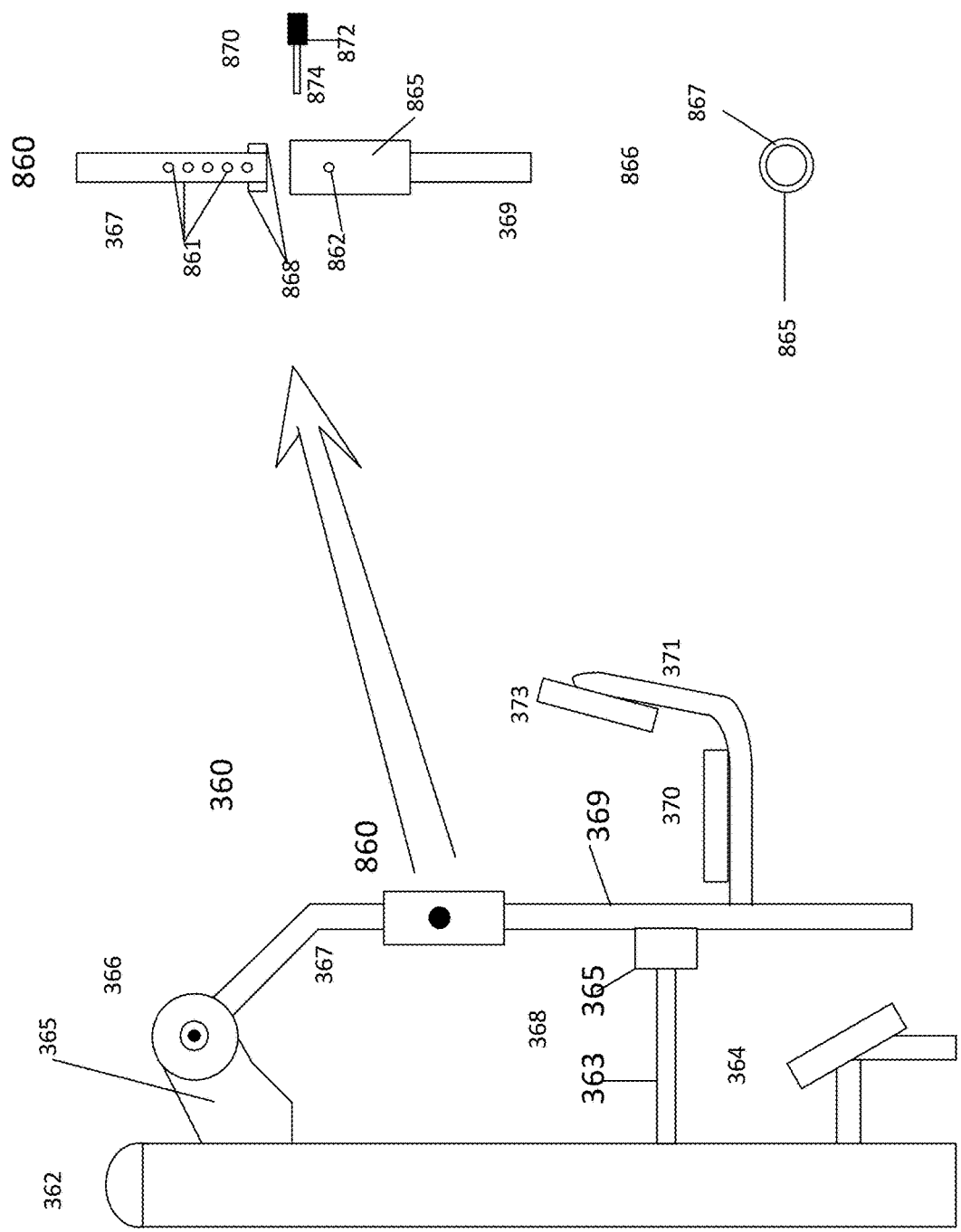
FIG. 13—describes an example embodiment of an exercise device with a system for changing the resistance.

FIG. 13 shows another example embodiment for changing resistance of gym machines. The example embodiment allows the changing of the resistance trough changing the length of an exercise machine part, where the part functions as one of the mechanical arms or leavers and therefore changing it's length will change the resistance exercised by the user. In this example the leg press machine 360 from FIG. 3A-G is shown. The rod 367 is now configured with the device 860 that allows the changing of the length of the rod 367. The rod 367 is now split to two, where the "upper" part has kept the number 367 and the "bottom" part has received a new number 369. 865 is hollow cylinder or cone rigidly attached to the lower part of the rod 369. The bottom of the rod 367 is configured with a plurality of holes 861 with some spacing between them. The holes 861 allows the passing of a pin 874 inside them. The view in the left side of FIG. 13 is exploded. It is mean to show all the main parts of the example embodiment. In the assembled state of the example embodiment of FIG. 13, the rod 367 with the holes is configured to move inside the cylinder/cone 865. A limiter mechanism can be constructed to prevent from the rod 367 to completely come out of 865. An example limiter mechanism is shown in FIG. 13. The rod 367 is fitted with bulges 868. These bulges 868 are extruded to an extent that still allow the rod 367 to move freely inside 865. 866 is a top view of 865. At the top of 865 there is a rigid ring 867 rigidly attached to 865 and configured to prevent the bulges 868 from travelling outside 865. The ring 867 inner radius is smaller then the bulges 868 outer radius and therefore it mechanically limits the rod 367 with the bulges 868 from travelling outside 862. Any other limiting mechanism known in the art can be employed.

862 is a hole in 865 which allows the passage of the pin 874 trough 865. Preferably the hole 862 exists in two opposite sides of 865 and allows the pin 874 to pass trough both holes 862 in 865 and at the same time trough one of the plurality of holes 861. This way the rod 367 can be mechanically fixed in a configurable location which is defined by the location of the holes 861 and 862. 872 is the pin handles which is wider then the hole 862, it thus sets the limit to the movement of the pin 874 inside the holes. To further limit the movement of the pin the inner side of the handle 872 that touches 865 can be configured for example to be magnetic in case 865 is made of metal. Then when 872 touches 865 the magnetic force keeps the pin in place. A pin interacting with holes is a common setup in exercise devices and thus all methods known in the art for achieving this attachment and preventing safety hazards are applicable. 363 and 365 comprise the mechanical stop described for previous figures. Having the mechanical stop in this location allows for a gap between the bottom of the rod 369 and the ground. This way the changing in position of 369 can be configured so 369 will not touch the ground and the movement of the exercise device will be unobstructed even when 860 is in different configurations.

In cases like in FIG. 13 where the lower half of the rod 369 and the parts mounted on him like 373, 370, 371 can be quite heavy. They can make it difficult for a user trying to configure 860, since this process may involve the need to lift 369 in order to match the pin 874 and hole 862 to a hole 861. To counter this difficulty a mechanism to balance the gravity on 369 and mounted parts can be used. For example, a spring (not shown) can be attached to 862 on one side and 867 on the other side. The spring neutral length can be much shorter than the possible move of 861 inside 862. Thus, when gravity pulls 369 down after the spring passed its neutral length, the spring will apply pulling force on 367 and 862/369. This force will resist gravity. The spring can be configured to cancel out most or all of the gravity force at certain positions. Other methods known in the art for cancelling effects of forces in such configurations can be used. The example embodiment in FIG. 13. Can similarly be used for other gym machines such as 315, 320, 330 in FIG. 3A-G, 402, 404, 406, 408, 410 in FIG. 4A-F, where for example the rod 420 or other rods can change their length.

Figure 14:
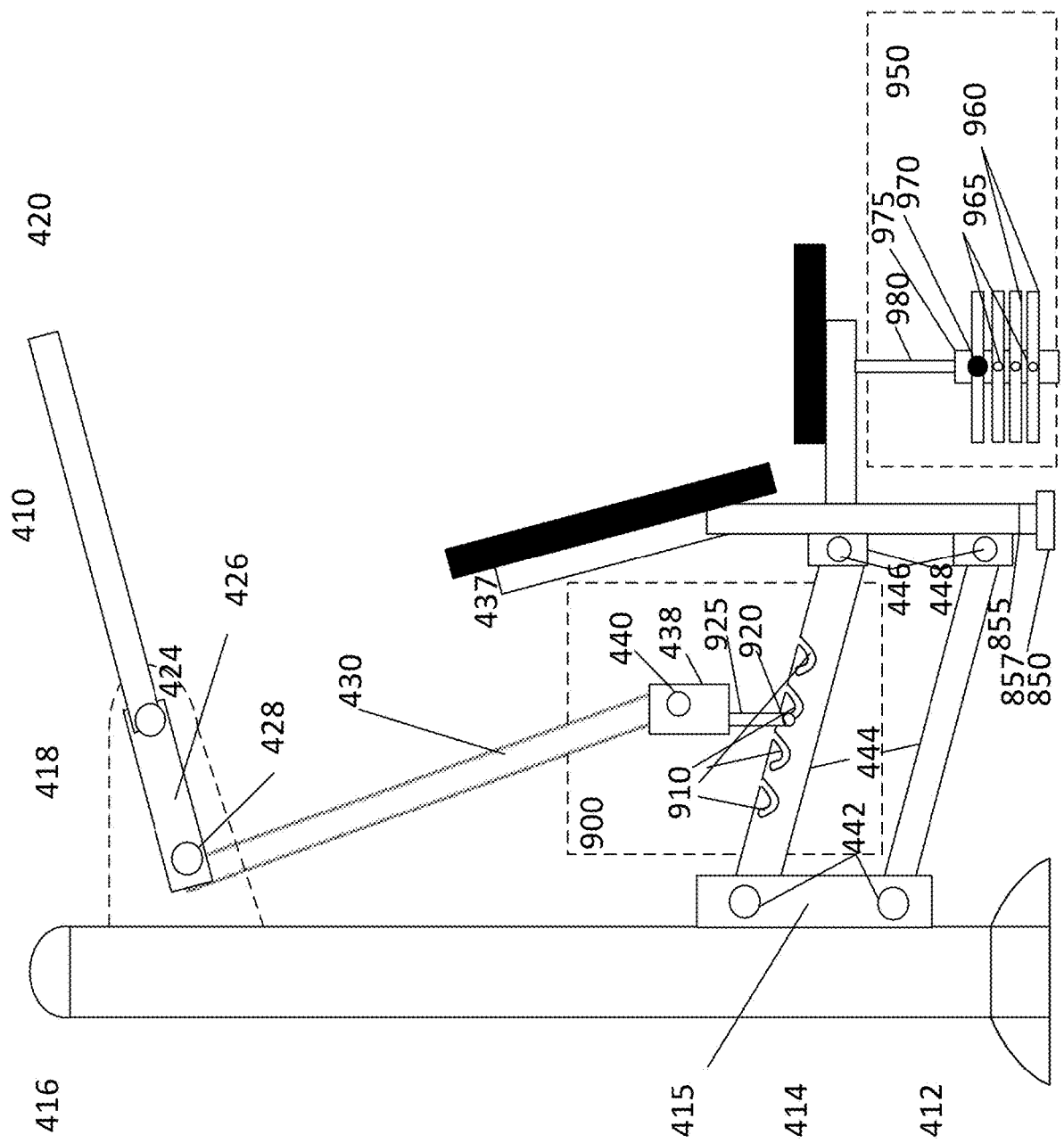
FIG. 14—describes an example embodiment of an exercise device with example embodiments for changing the resistance or difficulty level.

FIG. 14 Shows another example embodiment for changing resistance. In this case the Lat pull down machine from FIG. 4A-F. The embodiment 900 shows another method for changing the length of a rod/leaver/mechanical arm. In this case a selector T shaped mechanism built from the vertical rod 920 holding a horizontal shaft 925 was added to the holder 438. 910 is a plurality of channels built into the rod 444 which is the rod/leaver/mechanical arm who's length is now configurable. The shaft 920 can be fitted to either one of the plurality of channels 910. Each of the plurality of channels is built into the rod 444 in a way that would insure secure mechanical placement after the selector 920 was correctly placed into a channel 910. By secure mechanical placement the meaning is that the selector would not disconnect or move beyond a small allowed movement after being placed correctly by a user. Is the example of FIG. 14 this is achieved by the downward and then upward shape of the channel which prevents unintended disconnection of the selector shaft 920. Other methods know in the art can be used to achieve this goal. Connection to each one of the plurality of channels 910 configures the rod/leaver/mechanical arm 444, and thus changes the resistance exercised by the user. This example embodiment is suitable to other gym machines for example 404, 406, 408, 409 in FIG. 4A-F.

950 in FIG. 14 is yet another example embodiment for changing resistance. 960 are a plurality of weight plates trough each one passes a hole 965 that allows a selector pin to go trough it. In the center of each weight plate 960 viewing from the top there is a hole (not shown) trough which a rod 975 can travel in the vertical direction. The rod 975 has a plurality of holes built into it, corresponding to the holes 965 (not shown). When the pin 970 goes trough a hole 965 it can go trough the corresponding hole in the rod 965. And when pushed all the way goes trough holes in both sides of 975 and mechanically connects the selected weight 960 with the carrier rod 975. 980 is a rod or a mechanical connection between the carrier rod 975 and a moving part of the exercise machine—in this case the beam holding the chair. 980 rigidly connects the carrier rod 975 with the moving part of the exercise machine. When a weight 960 is selected by the selector pin 970 and the carrier rod 975 moves up, all the weights including the selected weight and those above it (if any) move up and are "carried" by the carrier rod 975. This way the weight of the selected weights adds to the resistance exercised by the user. This is in-fact a commonly used weight stack mechanism in exercise machines utilized in this example embodiment to add variable resistance to an outdoor gym machine. This embodiment can be implemented on many other gym machines. For example, 404, 406, 408, 409 and alike. Additional leavers, pulleys and wires can be used to mechanically connect 950 with any moving part of a gym machine. 950 can thus also be implemented for example on any of the machines in FIGS. 3A-G and 4A-F.

Figure 15:
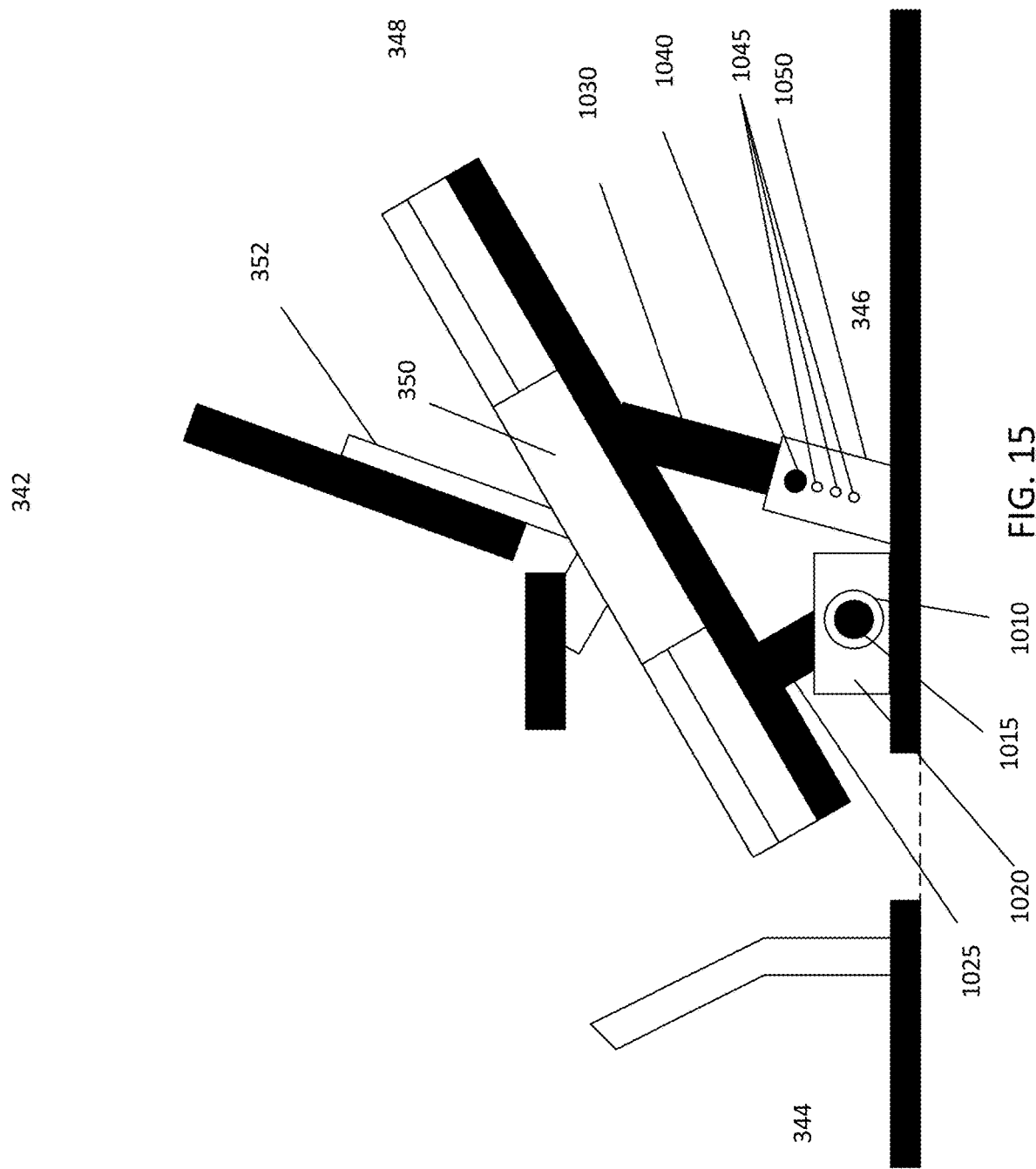
FIG. 15—describes an example embodiment of another exercise device with another example embodiments for changing the resistance or difficulty level.

FIG. 15 depicts another example embodiment for changing resistance exercised by a user on a gym machine similar to the example embodiment of FIG. 13. In this example the leg press machine of FIG. 3A-G. As described the resistance is a function of the angle Theta 359. In this case a mechanism for changing this angle 359 is introduced. 1035 and 1030 are the rods which hold the bulk of the leg press machine. They form a triangle with 348. 1020 is a base rigidly connected to the horizontal base of the machine 346. It holds a pivot 1015 that may rotate inside a bearing 1010. The pivot is rigidly connected to the rod 1025. And thus allows it to change its angle relative to the base 346. 1025 is rigidly connected to 348. 1030 is connected to a selector pin mechanism similar to 870 that comprises a plurality of holes in the rod 1030 (not shown). A selector pin 1040, an "acceptor" cylinder like 865 denoted here 1050 with corresponding hole or plurality of holes 1045. The acceptor 1050 can also be connected to the base 346 trough a pivot mechanism (not shown) that will allow 1050's angle to change relative to the base 346. It can be also rigidly connected to the base. The selector pin—when selecting a different hole 1045 configures a different height and/or angle of the rod 1030 and thus changes the angle 359. This way the exercises resistance can be configured differently.

Fitting the IOT System Inside

FIG. 16A-C captures an example embodiment of fitting the IoT System 700 inside an hollow parts of the exercise machine. In this example embodiment the beam 371 holding the chair 370 and backrest 373 is hollow and it's inner diameter is enough for the IoT system to fit inside. The beam 371 is sealed by a plug or cap that is usually made out of softer material such as plastic or rubber. Removing this plug allows the installation and maintenance of the IoT system 700. The IoT system 700 is inserted into the pipe shaped beam 371. A hole 1060 (or a plurality of holes) can be made in the beam 371 and a fastening mean such as a screw (or a plurality of) can run through to a bore hole or mechanical connection on the IoT system, thus fastening the IoT system 700 to the beam 371. The plug can then be fitted and make the IoT system protected inside the pipe shaped beam 371. In this example embodiment the hole 1060 is done in a place which is structurally safe—the upper area of the beam 371 carries much less weight then other places on the structure of the exercise machine and therefore a hole there will not be unsafe to the structure. The placement of IOT system 700 in exercise machines can take such considerations in mind. Other fastening methods can be employed such as gluing the IoT system to the inside of the beam 371, clamping it based on mechanical pressure to the inner walls of the pipe shaped beam 371, screwing it to a base which is rigidly connected inside the beam 371 and alike. The IoT system can also be a part of the plug 1070 or rigidly connected to plug 1070 or fitted inside it. This way when IoT system 700 requires maintenance for example the plug 1070 containing it can simply be replaced.

The IoT system 700 may include a wave transmitting and receiving apparatus, for example for measuring distance in a TOF method. The beam 371 or the plug 1070 may include special holes (not shown) to allow the unobstructed passing of these waves. The holes can be covered with materials that allow the passing trough of such waves. For example if the waves used are radio waves certain materials such as carbon fibers, or certain plastic materials may allow for certain frequencies good passing of such wave trough them. Glass for example can be the solution for light waves. Nets can be the solution for acoustic waves. The beam 371 itself or the plug 1070 can be made of such material and thus eliminating the need for holes and/or covers. In the example of FIG. 16A-C the distance measuring apparatus may not be mechanically pointed or configured to measure the shortest distance from the floor or other reference point (like non-moving machine part). A calibration and or correction maybe introduced in such a case.

In 1650 of FIG. 16A-C the plug 1070 is mounted with a solar panel 1072. Such a solar or photoelectric panel 1072 can produce electrical power and charge the batteries in the IoT system 700 through an electrical power connection 1074—where 1074 can be an electrical wire. Additional electrical components like voltage and current transformers, charge pumps, charging controllers and alike (not shown) can be used to facilitate or assist the charging of the batteries of IoT system 700 using the solar panel 1072. Additional charging methods can be used: 1076 is an antenna for wireless charging that may be fitted in the plug 1070, the pipe shaped beam 371 or be exposed (for example trough a hole in the plug 1070) in order to receive wireless charging from a source external to the exercise machine. The antenna is electrically connected to the IoT system 700. Further elaboration on this below.

Power Supply

FIG. 12 also shows example embodiments not related to changing the resistance. 850 is a charging port located on a non-movable part of 800 in this case 365. 855 is the compliant port found on a moving part of 800 in this case the rod 367. The meaning by compliment is that 855 is the complementary port that connects to 850 to enable the charging action. In case of wired charging 850 can be the male and 855 female port or vice versa. In the case of wired charging 850 and 855 can just be any shape that insures contact for example in idle state of the machine 800. They can just be two pieces of metal or conductive material that close the charging circuit when in contact. A charging port 850 can be located everywhere moving parts of the machine comes in contact or vicinity of nonmoving parts. Using wireless charging ports can have some advantages. In this case the ports 850 and 855 do not have to touch each other but just be located close enough for charging to take place. In the wired charging scenario of FIG. 12 there can be a need to make the charging ports mechanically strong and durable since they are expected to hit each other a lot and with some force since 850 is located on the mechanical stop. Using wireless charging ports 850 can be located behind the stop 365, and 855 behind a stop or inside the tube 367. Thus the stop 365 can absorb most of the mechanical stress. The charging port 850 can be connected to a power source like a battery that can be found on or near the non-moving parts of 800. A wire from this source can run trough the non-moving parts which most of them can be hollow tubes. For example, wire can run from 850 trough 363 to the central pole 362 to its base. In the base there can be an outlet to connect 362 to the power grid. Alternatively, the wires can go from 362 base to the ground and run underground to the next available power grid connection. To prevent the risk of electrocution an electrical voltage converter reduces the voltage on the wires to a low voltage such as 5 Volts, before the wires come in proximity to the machine 800. 855 can be connected with a charging connection wired or wirelessly to the IoT system 700 and/or to any part of it found on the moving parts of 800. This way the IoT system 700 or sensors or any part of it can be charged for example when the machine 800 is in idle state.

Another example for this charging method can be locating the charging port in a machine like 410 on the bottom of 432 and the complementary port on the ground where 432 touches or in proximity of it. In general, one charging port can be on a moving part of the machine and the other can be on a non-moving part of the machine or ground, platform or any non-moving part of the environment or even another machine or object.

In recent times wireless charging methods that do not require very close proximity are immerging. For example, a solution offered by "WI-CHARGE" at http://www.wi-charge.com/technology/ which is based on transmitting energy via laser or electromagnetic waves some of this company patents: U.S. Pat. No. 9,312,701B1, U.S. Pat. No. 9,866,075B2, US20170349383A1, US20180034557A1, US20180019565A1 all incorporated here by reference. The company website discloses the key features of this technology: "

Power over distance—several watts at several meters.
Automatic—transmitters find enabled devices and power them without intervention.
Wide coverage—a single transmitter can cover 250 square feet.
Nearly 100% link efficiency.
Supports many simultaneous devices.
Scalable—multiple transmitters can be combined to increase coverage and power.
Smart power delivery according to parameters from the receiving-device.
EMI-free—does not interfere with WiFi, wireless phones, etc.
Safe—complies with US FDA and international standards and regulations.

In an example embodiment the IOT system 700 comprises or connected to an antenna or receptor for accepting this kind of wireless charging like the wireless charging antenna 1076 in FIG. 16A-C. A plurality of such transmitters can power and/or charge a plurality of IoT systems 700 mounted on a plurality of exercise devices. If an IoT system contains a battery the wireless charging can be periodic—i.e. charge for a certain amount of time every period of time. The plurality of chargers can service the IoT systems 700 in different exercise devices in a round-robin manner for example. In another example embodiment the IoT system can periodically check on its own charging level. Or a charging level sensor can interrupt the computing device in the IoT system 700 when the level is below some threshold. The IoT system 700 can then request for charging from the plurality of chargers. The plurality of chargers can initiate charge checking for all their adjacent IoT systems 700. A method for initiating charging with the IoT systems 700 according to their request and/or the chargers decision can be implemented. Such a method can insure that the IoT systems 700 will always be charged. A simple method can shall be disclosed for example: If it is known that full charging of each IoT system take 2 hours and there are for example 5 IoT systems; and it is known that a system losses 5% charging over a period of 1 hour; Then the charger will start charging the first system that will reach 45% charging level and continue to charge the next systems that are below 45% according to the lowest charging level first. In the worst case is all systems reach a charging level of 45% around the same time and continue to discharge the system will start charging the last system after 8 hours (4 other system, each one 2 hours of charging). At this time the last system have reached 45%−8*5%=5% charging, and so still functional and will reach 100% charging in two hour. The first system that was charged will reach 100%−8*5%=60% charging at the time the last system in this example will be fully charged. The cycle will start again when the first system will reach 45% charging again. The generic calculation for the charging threshold should be:

Threshold %=($N$−1)*charging time[hour]+GB[%]

Where N is the number of systems per one charger, and GB is a guard band—the minimum charging allowed for the IoT system in the numerical example it was 5%. The system should be design so that the Hour_drop is much lower then the charging time so that in a full round of charging i.e.

($N$−1)*charging time[hour]<(100[%]−Threshold[%])/Hour_drop[%/hour]

Where Hour_drop is the charging drop in % per one hour. Other methods know in the art for prioritizing time critical service can be used.

In theory the IoT system can do without a battery and when an external system to the IoT system 700 detects usage or expected usage of the exercise device with the IoT system 700 the plurality of chargers can start transmitting power to the IoT system 700 which can run on this power. The system 700 can comprise only a small chargeable battery for usage detection and power request negotiation and receive the larger amount of power needed for the IoT system to operate, wirelessly. Yet another implementation example can be that the plurality of chargers always transmit a low power just for usage detection and/or keep alive and/or power supply negotiation of the IoT system 700, and when operation is required the plurality of chargers transmit the larger amount of power needed for the IoT system to operate, wirelessly.

In yet another example embodiment the IoT system 700 can be found on a nonmoving part of the exercise device. It measures the required training measures using for example ultrasonic sensor or other wave-based sensor, using a TOF method measuring the distance to a moving part of the exercise device. This way the IoT system can be easily constantly connected to the power grid or connected with wire or mechanical contact or wirelessly to an external power supplying device. If a wire connection is used the wire can go trough inside the non-moving parts of the exercise device. For example in FIG. 8A-D it can go from ground trough the main pole 362 to the stops 363 where the IoT system 700 be mounted for example measuring distance from the stop 363 to the rod 367. The wire can pass inside the tubes that make 362 and 363. Another example method can be to make the exercise machine parts like 362, 363 of conductive material and pass a low voltage trough them where the IoT system 700 in contact with such a conductive part as 363 can take the required power.

Using the example embodiment in the previous paragraph will also allow Connection to grid of IoT system 700 mounted on moving parts. The last example of the power flowing on conductive parts of the exercise machine is applicable since there is a mechanical contact at the hinges and pivots between the moving and non-moving parts. A wire traveling inside or outside the exercise machine parts for example from 362 to 367 in FIG. 8A-D can bypass the axis 366 for example from above when going from inside 362 to inside 367. The wire can have some extra length to account for the required changing length when 367 is moving. Many methods are known in the art and can be used for electrically wiring machines with moving parts.

Elaboration on Force Measuring Method

Another example embodiments in FIG. 12, not related to changing the resistance is hereby disclosed. 857 placed behind the stop 365 but with mechanical coupling to it is a "Force Measuring Sensor". This sensor 857 can measure the force exerted on the stop 365 by the moving parts of the machine 800. This force can yield the physical resistance or weight or factors that are related to it. When a user is sitting on the chair 370 in idle state and 367 is pressing on 365 the force on 365 is caused by and a function of the weight of the user combined with the machines moving part weights. It can be a simple function like multiplying by a trigonometric function of the angle relative to the floor exactly like FIG. 3A-G, 360. Measurements can be taken also when the user is doing repetitions and 367 is bumping into 365. The resistance can be extracted from the force measurement taking into account the acceleration and direction measured by sensors on the IoT system 700. For example, the system can vectorially add the measured acceleration to the component of the Gravity acceleration (This may already be done by the acceleration measuring sensor in the measurement itself—without the need for additional calculations). Dividing the Force measured by this acceleration will yield the desired mass. The calculated Mass can then be used as the resistance or converted to weight or force to represent the resistance. Placing a "Force Measuring Sensor" can therefore yield the resistance even if it is changed by methods disclosed in this section.

Like in the charging case in a machine like 410 such a "Force Measuring Sensor can be placed on the ground where 432 touches the ground. The "Force Measuring Sensor" can be placed in general, where a moving part of the machine touches and coveys force to a non-moving part of the machine or ground, platform or any non-moving part of the environment or even another machine or object.

Tracking

As described in application Ser. No. 15/594,562 and other references the overall system can track the users training on the fly and in retrospect. The overall system may include cameras, capture devices or similar sensors placed around the gym. These capture devices and sensors can be used to track the training, offer corrections, and interact with the users. Virtual coach or coaches can be implemented. As described in U.S. application Ser. No. 15/594,562 when referring to a "Camera" or "Capture Device" the meaning is broader and can include many other types of sensors that can perform a similar task in the context, for Example TOF sensors based on waves like Ultrasonic sensors, Radar, Lidar and alike.

A stand-alone solution based on a camera or some similar sensors can have commercial and other advantages over sensors mechanically connected to the exercise devices. If for example a pole or a stand on which a plurality of cameras or a plurality of such poles or stands can implement all or some of the system requirements then several key advantages may be achieved:

1. The need to attach sensor to exercise devices my produce several issues:
   a. In different parks there are different exercise machines from different vendors. Each one may need a different mounting method and in a different location on the exercise device, so may require different calibration. These issues make it harder to produce a standard low-cost solution.
   b. There may be a need to receive permission from each one of the exercise machines vendors for sensors attachment. For example, in order to maintain insurance on the exercise machines and prevent liability to hazards caused by them.
2. It is usually easier to connect a new camera pole/stand to power and communication/network. For example a plurality of cameras mounted on a street light pole can be relatively easily connected to power. It can easily fit an existing outdoor fitness facility which has no power connections to the existing exercise devices.
3. The added Cameras can also function as security cameras; and/or existing security cameras can be used for this new usage disclosed in this disclosure.
4. The capture devices and plurality of sensors can also track exercises that do not involve exercise devices, sometimes called "Free Exercises". They can also track exercise done on exercise devices like those in FIG. 2A-K, devices with no moving parts. Most of the advantages explained above hold true also for an indoor gym or a generic training facility. This disclosure cover indoor gym or a generic training facility too.

To function as a standalone solution the proposed system is required to resolve not only the exercise attribute measurements problem, but also the identification of the user doing the exercise, and the also interface with the user problem.

Identification of the user: One way of solving this issue is using face recognition methods. The camera can be pre-set to expect a face on a certain location on the received image in case of a certain camera positioning. Methods known in the art for human tracking can also be used in order to identify the position of the face. The camera can identify a user as using an exercise device if is face and/or certain body parts are found expected and/or found in certain positions relative to the exercise device and or in certain location on the image certain camera positioning. For example, methods from the references for creating a skeleton or body model of a user can be used to determine the location of the user's face. Then the face recognition methods known in the art can be utilized to identify the user that is using a certain exercise device. For example, if the exercise device position is known: either by the fact that it is stationary relative to the camera and the camera angle and relative position was set or inputted during the calibration phase, or either by the fact the it's position was identified by the system, for example by identifying prominent features or a structure in methods given in the references or known in the art. So, if the position of the exercise device is known the system may expect certain postures of the user relative to the exercise device and thus may expect certain location of the user's face. It can run a simple procedure like basic correlation to face, body parts, skeleton model and alike to determine the actual posture and the expected location of the face. Simple examples for locating the user expected face location can be: If the exercise device contains a chair and a head rest, and in all known exercises the user is sitting with his back on the rest and the camera and exercise device are stationary, then there will be a certain area on the received frame, that can be limited by for example a rectangular or circular frame where the trainee face is expected. If for example the trainee height and/or proportions to the frame and/or exercise device and or other useful features in the frame, the system can calculate an approximation to where the user's face is expected and narrow the frame of expectancy. A Simple example for that is if the height is known the system can use common known human proportion—or perhaps the specific user proportions are known and calculate the height from the buttocks of the user sitting on the chair to the head. The system can then designate a frame around the point which is at the calculated distance in the image where the angle of the distance measurement is set by the angle of the back-rest. In a yet simpler case if the camera and exercise device are stationary to one another the expected frame can be drawn or set on the image by a technician in the calibration process: a user or for example a puppet can be at an exercise position on the exercise device when the technician sets the expected area around where he measures the user's face.

Many Face-Recognition methods are actually Machine-Learning algorithms as those described in application Ser. No. 15/594,562. In many cases they are based on comparing a set of attributes taken from the image or frames to attributes saved in memory. The use of histograms and or probability functions as described in application Ser. No. 15/594,562 is common is many of these algorithms. Therefore, it would be advantageous to narrow down the number of possibilities, and or the histograms and alike. This in order to speed up the process and elevate its reliability. Methods for narrowing down the data-base of possibilities are hereby disclosed: The total possible faces to recognize can first be limited to the people who are listed to the training environment (For example Gym), or to a certain service or application related to the training environment. In an embodiment the database of users can be for example, limited to the residences of the neighborhood or the city for example in the vicinity of the training facility or gym. A further reduction of the possibilities can be achieved by communicating wirelessly with the user's mobiles and determining which users are in the vicinity of the Gym, or Inside it, or even reduction to people which are found near a certain exercise device, or in a certain camera's frame. For example, the system can include Bluetooth and or Cellular modem. The system can find all the devices in vicinity or range using for example a Bluetooth transceiver. It can then pair to them or even connect to them and/or using short negotiation discover the mobile devices identity and thus possible mobile users' identity which are in the area of the Gym. Since Bluetooth communication has limited range, it maybe enough to know which users are connected to a certain Bluetooth transceiver at a certain time and therefore deduce that these users are in the vicinity.

Using information on users as described in the previous paragraph, the system can filter a group of users from a wider data base and thus limit the required reference data for face recognition from a wider data base. Thus it can create a smaller group of candidates. Bluetooth transceivers can for example be installed in different parts of the Gym or for example on two separate camera systems and thus locate each user quite accurately near an exercise device. This can further reduce the candidate list for a certain exercise device. Using the methods in application Ser. No. 15/594,562 for location finding a mobile device or WCD can pin-point it's exact location and can then transmit it upon request or upon its own initiative to the camera system, Or the system can find a mobile device or a WCD's exact location. For such a transmission it can use Bluetooth, Infra-red, sound (hypersonic for example) or any other mean mentioned in the references or known in the art. It can also transmit the data to a remote server for example using Wi-Fi or cellular transmission. The remote server can then update the Camera system connected to it wirelessly or via wired connection—for example trough internet connection. This can reduce the candidate data-base to the minimum or even completely eliminate the use of face recognition for identifying the users, since they may already be identified by other means.

For example, using the location of the user's or WCDs the system can tell a camera which users are expected in the current frame. This will narrow down the number of possibilities substantially. The face recognition algorithm itself can be based on simple correlation to reference data or attributes or even to saved images. The best correlation (or sum of attributes correlation results) with the small number of possibilities will give the recognized face.

The methods such as disclosed in U.S. Pat. No. 9,011,293 and its continuations or application #15594562 or other references can be used for motion tracking and identifying the exercises done by the user. However, a simple more economic method is hereby presented in FIG. 17, method 1700 flow chart:

1100 is the calibration phase. It can be done prior to the system regular and continuous operation. However, some calibration steps can be done at intervals or following events during the system's normal operation. Some of the calibrations that can be done are described in U.S. Pat. No. 9,011,293, U.S. application Ser. No. 15/594,562, US20150319424A1 the other references and known in the art. The calibration phase may include methods like: configuring the camera view angle, focus, scale etc. Taking reference images with and without a user, if the camera is moving —determining moving ranges and limits, determining parameters like gain, white balance, noise filtering threshold of filters used; Determining parameters for different light conditions, which can be a big issue for outdoor gyms. Look up tables for sets of parameters to be applied based on measured light conditions (measured for example by a photoelectric sensor or by examining the light on certain predetermined features in the images from the cameras), or for example on the time in the day and/or month and or/year. Calibration parameters can be calculated by any of the methods in the chapter "Methods for calculating and finding quantities and configurations used in this disclosure" in U.S. application Ser. No. 15/594,562 based on the attributes already mentioned like for example time of day, light or radiation intensity, previous settings, light or radiation temperature, and alike. Other possible calibrations: Stabilization of the frames; Bundle adjustment; Determining common features that can be matched between separate cameras; Registration; Some more specific calibrations can be setting the possible areas on the frames for face recognition—as described before. Some of the calibration can be done manually or by specific calibration methods for achieving for example: best viewing angles and avoiding occultation and/or concealment and/or shadowing of parts of the device and/or user and/or marker. If the method 1700 uses a marker, it can be important to view the entire path of the marker when an exercise is done. In general, it can be an advantage that the camera sensor sees the entire paths of the moving parts of the exercise device and user when an exercise is done.

Step 1110 of method 1700 is determining the possible users in the gym area, exercise or exercise device area, and/or camera frame area and alike. This has already been explained in previous paragraphs and in the references. As explained above the goal in this step is to reduce the number of possible users in a reference data base, before the next stages of identifying and tracking users. As explained in this disclosure and the references many identification methods relay on comparing certain attributes of the object to be identified with candidates attributes from a database. It is therefore advantageous to minimize the number of possible candidates to compare to as much as possible. Some implementation examples for this can be: communicating with mobile devices or WCDs and identifying which of the users are found in the vicinity, communicating with location based applications and data-bases and finding matches between beings from those applications or data bases and the data base of possible users of the training environment; such applications of DBs can be for example a car parking application which has a database of parking cars location and can match them to the car owners or passengers. Such and application can transfer data of people parking in a certain radius or confined area around the gym. The data may be transferred from the application to backend servers or remote computing devices communicating with the system. Other such applications examples can be any location-based application or an application which can report user's location. For example, social apps such as Facebook®, Matching apps such as Tinder®, business recommendation applications, and alike. Other sources of user's location data can be communicating with cameras like municipality security cameras that may have facial recognition services, cellular network area indication and alike.

Step 1120 is the actual identification of the user performing an exercise. This step has also been described previously and in the references. A simple implementation example, is by identifying the user once—at the beginning of the training session or at the first exercise and then having the system guiding the user to his next exercises thus being in continuous interface with the user, knowing his location, and keeping its identification. The first identification in this example can be by the user initiation of the training interface, or by prompting him to identify himself. Of course, less simple methods like face or attribute recognition and alike are applicable as well as described previously. Close range communication between the system 700 and the user mobile device or WCD is also an option for identification this can be achieved by for example RFID, NFC and alike.

Step 1130 of method 1700 is "Exercise Identification" this method has also been described previously and in the references. Simple examples can be: The exercise device the user is using has only one possible exercise; The user is following an exercise regimen or plan which is known to the system and/or tracked by it and therefore the possible exercises on the exercise device or free exercise is narrowed to one or more, and if there is more than one possibility it can be identified by the stage in the exercise session or training regimen if it is tracked by the system, or for example by comparing to references as described in depth in U.S. Pat. No. 9,011,293.

Step 1140 of method 1700 is "Marker Tracking". This method was also explained in depth in the references. Example for markers can be prominent moving features of the exercise device or user, for example an exercise device handle that may for example have a specific unique shape and or color/s relative to other features in the image; a WCD worn on the user that may for example have a specific unique shape and or color/s relative to other features in the image; Any other exercise device moving part that can be easily identified; A pattern painted or attached to a moving part of the exercise device or user; A transmitter of waves or radiation that can be detected by the camera sensor or a sensor connected to it like, infra-red light, ultraviolet light, ultrasonic sound, Radar or Lidar waves and alike. It can also be a reflector of such waves where the transmitter is found somewhere else (on the camera sensor for example). The marker can also be the IoT system 700 or a WCD or mobile—if the system can track its location and place it in the capture device frame as described in this disclosure and/or the references. The sticker implementation example mentioned above can also implement or include a marker. In an embodiment the marker can be mounted on a sticker to be attached on any of the training device parts (preferably moving parts). The sticker may also include on it the implementation of the IoT system 700 as mentioned above and therefore may find location and track movement in parallel or in cooperation with the Camera like solution. If the sticker example embodiments can find it's own location not relaying on the external Camera sensor, it may not need to mark it's location to the camera by using a pattern or image related techniques. It can transmit its location to the system and it can locate this location on the image. This is also a possibility to serve as a marker as mentioned above.

The marker can be tracked according to its type: It may be simple to track a marker which transmit or reflects some form of waves or has a unique color relative to other objects in the frame. In this case simple identification of the unique color or waves coming out of the marker maybe enough to determine its location in the frames of the capture device. The marker itself if for example is the IoT system 700 or a WCD can find its own location and transmit it to the system, or the system can track it in any of the methods in U.S. application Ser. No. 15/594,562 or other references. If the marker is a pattern or prominent feature or a part of the exercise device or user, simple correlation methods can be used—for example the system may store a plurality of reference frames or images of the marker. It can then search it in the received frame using for example iterations of correlation with the references for areas in the images. The areas for correlation can be narrowed down based on the detected location in the previous frame and/or expected location. These and other methods are well known in the art for tracking markers.

In an outdoor gym scenario, there may be an advantage to using such marker tracking techniques. Because of the gym being outdoors it may be exposed to large changes in lighting and environmental conditions (Consider for example the difference between night and day, or snowy versus a sunny day), which may render other image recognition techniques too expensive to implement or even useless.

Step 1150 of method 1700 is "Motion Tracking/3D". In this step motion tracking is performed with or without 3D synthesis. The motion tracking can produce machine representation model or skeleton model of the user and/or exercise device and/or both. The methods for achieving that are well described in the references and known in the art. This step 1150 is not mandatory and can be disposed of altogether. On the other hand, the step 1140 of marker tracking can be disposed and this step 1150 can be used instead. The two steps 1140 and 1150 can be combined. For example, tracking a marker or markers, can greatly improve and/or simplify motion tracking and producing machine representation/Skeleton model of the user and/or exercise device.

Step 1160 of method 1700 is "Exercise Attributes". In this step the important training measures are extracted from the results of previous steps. The extraction of training measures based on step 1150 is well described in the references, and therefore the example of extraction from step 1140 would be further explained in this paragraph. Based on knowing the location of the marker in the frame the location in the real world can be attained. This can be a simple conversion formula or lookup table that can be calculated during calibrations, or any other method known in the art. The formula can be based on simple trigonometric functions taking into account the angle between the camera and exercise device. Location in the real world can also be based on triangulations between two sensors or cameras or a camera and a sensor. Other methods are given in the references, or known in the art. From knowing the location of the marker in each frame or in some of the frames many kinematic and other attributes can be extracted provided that the time difference between the frames is known. These attributes include the path taken by the marker and all parts of exercise device and/or user mechanically connected or adjacent to it. The speed and acceleration of these parts, the range of movement, the rate of movement and alike. As disclosed in this disclosure and the references based on these sizes many more attributes can be calculated such as—the resistance exerted—based for example on leaver angles calculated based on the location of the marker, if resistance is known or calculated then the energy burned in calories or other units can be known, the number of repetitions, if the performance is done in the right pace, and more. Such methods are also explained in other parts of this disclosure and in the references.

Some exercise attributes can be extracted without requiring machine representation of the trainee or of the exercise device. For example, identify repetitions of an exercise and count them. To achieve this the system may only need to identify direction change in the exercise performance. Extracting movement direction of an object from a series of frames requires methods well known to the skilled in the art or given in the references and so is identifying and counting repetitions based on movement direction changes.

Step 1170 of method 1700 is "Interact with the user". In this step the system interacts with the user based on the training measures and their tracking. It uses the I/O subsystem 220 of FIG. 2A-K in application Ser. No. 15/594,562, which can be implemented as a touch screen on the exercise device, or implemented on the users mobile or WCD, It can present the user a plurality of training measures like for example repetitions, pace, resistance, time and alike on a screen or by voice, it can give the user feedback on his performance ("To fast, slow down"), count repetitions, motivation statements and alike. Many forms of interaction and feedback are described in this disclosure and the references.

In step 1180 of method 1700 the system checks if the exercise is concluded. If yes, the method goes to step 1190. If no the method continues to another iteration of monitoring the exercise and goes to step 1140. In step 1190 of method 1700 the system checks if the session is done. If no and there is another exercise in the session the system goes to step 1195 where in case the system tracks the user training regimen, the system guides the user to the next exercise and/or pulls the next exercise data from its storage or memory subsystem. Next step 1195 send the method to another iteration of the method starting in step 1110—it is possible that the method is related with a specific exercise or exercise device and not with a user. So, when a user finishes the exercise another user may start using this exercise device or the system may wait for such. In case the method is related with a certain user and he is already identified, the step 1110 can be skipped. In step 1190 if the method is related with a user and the session is complete, the method concludes in step 1200. If the method is related with a certain exercise or exercise device it may always go to step 1110 from step 1195 until the exercise device or system is turned off, or until decided by a higher hierarchy method. Deciding whether the exercise and/or session is done can be based on tracking the exercise performance, number of reparations, sets etc. and comparing them to a training program stored in memory. It can also be done according to a user—trainee or coach input. Other methods are given in the references or known in the art.

Software and Applications

As described in application Ser. No. 15/594,562 and other references the overall system can interface the user via WCD, Mobile Device, Computer and alike. The system can assist the trainee with all aspects of the training: designing the training and the training program, designing training sessions, monitoring the performance, documenting the training, proposing improvements on the fly and in retrospect, giving and aiding motivation, adjusting the training program and more.

Figure 18:
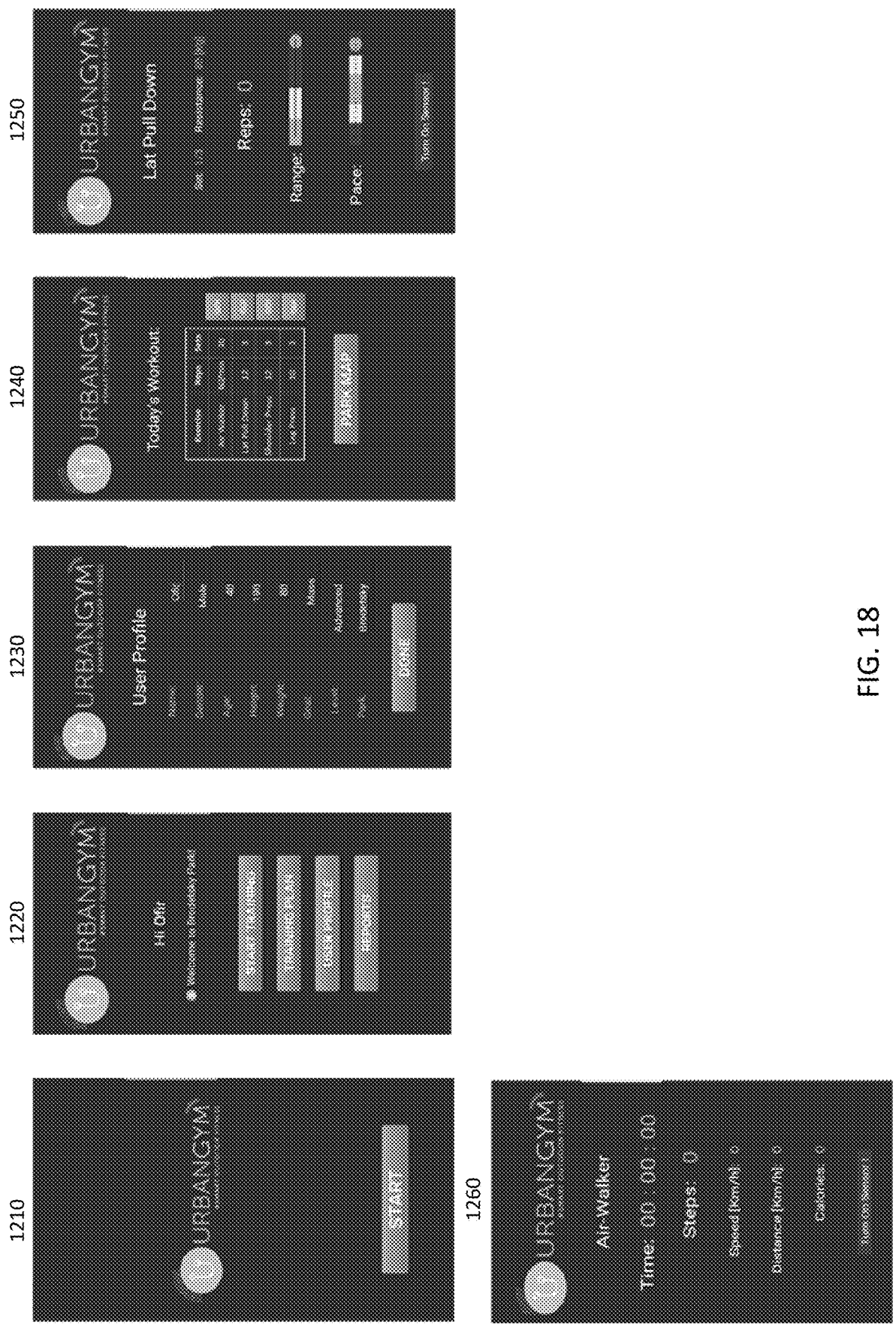
FIG. 18—captures an example embodiment of training mobile application.

FIG. 18 is an implementation example of a mobile or WCD application. FIG. 18 shows several screen shots of this application. Screen-shot 1210 is an opening screen that can present the name of the application and/or company behind it, and/or gym or park name, and or municipality name and alike. It can have impressive graphics and or graphics aimed at giving the user motivation for exercise and/or advertise a desired entity such as the municipality and/or advertise or promote a certain idea (like physical activity, environmental activity and alike). In the example of 1210, the screen displays the "UrbanGym" company logo with slogan and a "START" button prompting the user to start the application.

Screen 1220 is the main screen of the application. It can also comprise advertisement and background graphics such as the "UrbanGym" company logo with slogan on the top of 1220. Below the logo the application greats the user by it's name. The name can be taken from the User-profile or from other user accounts on the mobile device such as facebook, Instagram, Google account and alike. Below the greeting there is a welcome notice. In this case it welcomes the user to a certain park containing an outdoor gym. The system can automatically identify the outdoor gym or indoor gym the user is at—by using GPS or other location finding methods known in the art or given in the references—for example cellular base stations triangulation. Comparing the user location to known locations of training facilities can determine the facility the user is found at, or propose the user several options/recommendations for training facilities and direct him to the one he chooses or the one recommended for him. The buttons below direct to other application screens. The buttons are "START TRAINING", "TRAINIG PLAN", "USER PROFILE", "REPORTS".

The user profile screen is described in 1230. This screen lets the user input all the required user attributes like Name, Gender, Age, Height, Weight, Training Goal, Training Level, Preferred locations and any other user or training attribute that can be inputted by the user. Additional examples for data that can be inputted by the user is found in U.S. application Ser. No. 15/594,562 and other references. As described in U.S. application Ser. No. 15/594,562 and other references some of the user data can be obtained in other methods like estimating BMI, Fat percentage and alike from user images obtained by a WCD or mobile camera or the plurality of capture devices stationed in the training facility as part of the system; Connectivity to IoT devices like smart scales, smart food containers and many other methods known in the art or given in this disclosure or the references.

The training plan screen is not shown. In the Training plan screen the application can present the user with his training plan, session plan, exercises and alike. It may contain buttons allowing the user to modify a training plan or session plan, for example replace exercises, change the number of repetitions and/or sets required, change resistance levels, change time required for a performance of an exercise, change the order of the exercises, change effort-scale, times and dates of exercise sessions, locations of exercise sessions and alike. For every change the user wishes to do it can be presented with options and/or recommendations. He can be presented with recommendations of what changes to make or consider. At the beginning or at times recommended by the system for training plan change or sessions change, or when prompted by the user, the system can design a training plan for the user in any of the methods described in U.S. application Ser. No. 15/594,562 or other references or known in the art. It can also let him selected from a number of predefined programs filtered from a data-base of programs according to methods also described in U.S. application Ser. No. 15/594,562 or other references. The user can approve or change the plan given to him and it can be saved in the data-base.

It can be advantageous for the system to be able to limit the possibilities for training activities or exercises. The system may know in which training environment the user is currently training or use to train. This can be done by limiting the collection of training facilities either by the user himself or by the system tracking the users training locations. A simple example can be to limit the possible training environments and activities to those found in a certain radius to where the user lives or work. Or for example to the neighborhood or municipality the user lives and/or works or alike. A simpler example can be if the location of the user is known to be at a certain training environment for example outdoor gym, the system can limit the exercises and activities to those available at this specific training environment. This limiting of the possible exercises can lead to a simplification and cost reduction of some of the methods disclosed in U.S. application Ser. No. 15/594,562. If a limited collection of training facilities and/or activities is known and/or selected by the user, the system can then reduce the data-base to contain only the Exercise Data Structures (EDS) for exercises that can be performed in this training facilities and/or activities. In the example of a single outdoor gym the data-base can reduced considerably to include no more than a few dozens or probably much less EDS. Building a training program based on the reduced data base in the methods of U.S. application Ser. No. 15/594,562 can thus be relatively quick and simple.

The "REPORTS" screens are also not shown. In these screens the application can show reports on exercises, session and training program performance such as: Exercises scores, which muscle and muscle groups were active during training sessions and or specific exercises. Graphs tracking the change in difficulty levels/resistance with time/training sessions. Graphs tracking times and distance traveled in activities and exercises and many more. More possible reports are described in the references or known in the art. Examples of reports can be seen in existing applications such as Runkeeper®, Gymme®, TechnoGym® Applications, Lifefitness® applications and alike.

The "START TRAINING" button brings the user to the screen 1240 which is the training session main screen. The screen shows a table capturing the training session: the table gives the exercise in the session by order of required performance and the repetitions and sets required in each or for example the speed or steps per minute and total time required in cardiovascular exercises such as the "Air Walker" exercise. In this example there is a button "GO!" next to each exercise for the user to indicate when he starts the exercise. In other examples the system may automatically identify which exercise the user is currently doing and when does he start each exercise or each set. It may also actively guide him to exercise devices and tell him when to start and/or do sets. At the bottom there is a button titled "PARK MAP". This button is aimed to assist the user in finding the exercise devices and/or activities in the park (Or in general training environment). Since outdoor gyms usually don't have instructors in them, guidance and help functions are important to incorporate in the application. The park map screens which are not shown can include a map of the park and outdoor gym (Or in general training environment). Each one of the exercise devices can be marked. Each can have different color or designation so that the user can distinguish them. This color or designation can be apparent in the table or exercise list of screens 1240 so the user can associate between the required exercise and the corresponding exercise machine on the map. The map can support the ability to change it scale and zoom in or out. The map can also support presenting the real-time user location on it and presenting directions and indications to the next exercise or to a destination chosen by the user on it. The map can also present numbers next to the exercise devices on it according to the order of performance in the plan. It can indicate by colors or strikethrough or alike which exercises were performed and which are pending and alike. In case the user is not at a park—for example leaving his home for a training session the map in this screen or in another screen which for example is directed to from the opening screen 1210 can guide the user to the outdoor gym or another activity or another outdoor or indoor training facility or gym according to the training program which may take into account several training facilities and/or activities such as running, cycling, swimming, Yoga, Pilates, Golf and alike.

The application can promote physical activity or remind the user to train: At certain time intervals, or after the user did not exercise for a certain amount of time the application can send him a reminder via for example a popup message, an e-mail, a reminder on calendar and alike it can also add vibration or a sound or alike to the message. Another option for prompting for exercise can be when the user's location is near an outdoor gym, indoor gym or another training facility (near means a certain distance or travel time threshold). In this case the application can notify the user about the training facility and it's distance or travel time, recommend the user to perform training activity or at least check out the facility, it can remind the user the time elapsed from his last training session (especially if it is long) and it can issue motivation statement and/or advertisements or special deals related to the training facility and businesses in it's surrounding (for example a business that sells energy drinks in vicinity). The user can be prompted to delete the notification, ignore it or schedule it to some other time. It can guide the user to create an event on his calendar for a later time to visit the training facility. If the user wishes to visit the training facility and/or train in it and/or go to the one of the nearby businesses or facilities advertised, the system can guide his there using the map and location tracking such as use of GPS. Upon arrival it can give specific instructions on how to enter the facility, how to start the training, guide the user in just showing the facility and advertising its benefits, design a training session for the user, start a training session guide the user and monitor his training and alike.

When starting an exercise in the session screen 1240, by for example pressing "GO!" button next to the specific exercise, or for example by the system identifying that the performance has started the application goes to the exercise screen. 1250 is the exercise screen of the "Lat Pull Down" exercise. It shows the exercise name and other exercise data such as the set number performed, the resistance which is set, the number of repetitions, The movement range and the pace of performance. The data is updated on the fly using the tracking methods explained in this disclosure and the references. The data can also be interfaced to the user using voice and sound and other I/O means as described in this disclosure and the references. As explained the application can also give motivational statements and guidance (like for example "slower", "faster", "extend movement range", "one more to go") during the exercise performance, for example in voice or present messages on screen. The user can also press buttons or use voice commands to interact with the system, for example "reduce resistance by", "increase resistance by one step/one Kg", "finish exercise", "change exercise" and alike.

1250 can be divided to different colors on the Pace and Movement Range Seek-Bars to indicate the goodness of the performance: For example Yellow means "OK but can be better", Green means "Good" and red means bad. For example, the Pace should not be too slow or too fast, so being in the middle is a good pace. Movement range should be a long as possible in this exercise so measuring from left, the right side is good movement range. In the exercise screen there can be buttons for explaining the performance of the exercise. Such buttons can point to screens with instructions and/or drawings on how to perform the exercise, short videos showing exercise example performance of the exercise or training routine.

Screen 1260 is the exercise screen of the "Air-Walker" exercise. It presents the time elapsed from the beginning of the exercise, the number of steps performed, the speed the user is walking, the distance covered so far and the calories burned. It looks like a contemporary computerized treadmill. Here too the data is updated on the fly using the methods disclosed. As in contemporary treadmills the user can choose to listen to music or audio while exercising—there can be buttons enabling that which are not shown or even watch videos, or play games—or gamification of the exercise, again this can be controlled trough buttons and screens not currently shown.

Use of QR Codes or other patterns to scan: QR Codes or similar patterns can be used in various stages of the application: For example if a new user comes to the training environment and does not even have the application, signs in the training environment entrance and/or the near or on the exercise device can explain which application is required and/or have a QR code that points to the application download. If the application is installed the user can scan a QR code or similar pattern to identify the outdoor gym or training environment/facility he is in. This can also be used to identify exercise devices. After identification of exercise device or exercise facility for example the application can ask the user if he or she requires guidance on the training facility or on the specific exercise, and if yes supply guidance. If the user scans a QR code of an exercise or alike the system can view this as a que to start the exercise or prompt the user and ask whether to start.

Additional Ideas

The outdoor gym environment or in general the training environment can include billboard or a large screen. Such a screen can display:
 a. Safety Instructions for the training environment.
 b. Weather data and forecast.
 c. Recommendations for exercises.
 d. Guidance movies for the outdoor gym or training environment in general.
 e. Can be a touch screen for interfacing with the user or can have a keyboard or other interface means.
 f. Can run outdoor gym/training environment related applications.
 g. Can run municipality or organization applications.
 h. Can show municipality/organization messages and ads.
 i. Can show commercial movies and ads.
 j. Can advertise charity and community events.
 k. Can show reports and feedback on the training.
 l. QR Code or alike, with usages as described above or known in the art.

The training environment related software and or Mobile/WCD application can in addition link to city or municipality apps and all the services or applications described in the previous paragraph. This way the outdoor gym can assist the municipality to connect with the citizens. The application can also advertise the municipality services and applications.

The sensors on board the machines and the sensors around the training environment such as cameras can assist the coaches and supervisors track things like the popularity of each training or exercise machine, the usage of each one of them, the overall physical shape or other shape of the citizens/users, statistics of their attendant to the training activities and more. As described in application Ser. No. 15/594,562 Spaghetti charts of the gym can be drown from the usage data and thus the design of the gym/training environment can evolve, location of machines can be changed, les popular machines can be removed and more popular machines can be duplicated.

An important issue is the power source and power management of the IoT systems and related sensors mounted on exercise machines and found around the in the gym. It is possible that the IoT systems 700 and related sensors, especially those found on the moving parts will run on batteries. In this case strict power management should be applied. The IoT system should turn off as many of its parts when not in use. When it is in use it should turn on only the required component and use clock and sampling frequencies as low as possible. It should also limit its communications to the minimum possible.

On the fly power suppliers like movement induced generators (some of them described in application Ser. No. 15/594,562) can be used. Also exercise machines that produce electrical power described in this disclosure and the references can charge their own IoT systems 700 batteries and other devices IoT systems 700 batteries. Since the outdoor gym is found outdoors green energy solutions such as solar panels or wind generators can be used this can be generalized to other training environments.

The IoT systems 700 and sensors found on moving part can be charged in the points of contact with the mon-moving parts or the floor. For example, in FIG. 4A-F the machine 409 touches the floor in idle state. In FIG. 12 the moving part 367 touches the non-moving parts in idle state trough the stop 365. The nonmoving parts or floor can be connected to a power source which is connected to a charging port found on the point where the moving parts touch the floor or the non-moving parts. The point that touches this area on the moving part can have a complaint charging port. These ports can be wired charging ports or wireless charging ports. Thus, when the machines in the example are at idle state, charging ports are in proximity and charge can flow between them. The charging port on the moving parts can have a charging connection (wired or wireless power transfer connection) to the IoT system and/or sensors found on the moving parts and it can charge them every time the charging ports are in proximity to one another.

It is likely that the system will include a remote server for doing computation tasks and saving data. Communication with this server can be as described in application Ser. No. 15/594,562. A preferable example embodiment can be that the exercise machines IoT systems 700 will communicate with the nearby mobile phones using Bluetooth which have the advantage of low energy requirements. Other communication methods are possible like Wi-Fi, NFC, LTE and alike, however these methods usually require more energy. The mobiles and WCD will do some of the computation and saving data, and especially tasks related to user interface. The heavy-duty tasks can be performed by the servers in the cloud which will communicate with the mobile devices. The mobile devices can also serve a relay between the remote servers and the machines IoT systems 700. For example it can receive data via cellular modem and relay it to the IoT systems 700 via Blutooth, WiFi, NFC connection, cellular connection and alike.

Monitoring of System Maintenance and Usage

The system can implement self-monitoring methods for determining maintenance needs, user's need and alike. The following paragraphs will discuss such example implementations.

The simplest implementation examples may be monitoring usage of exercise devices and easily measured quantities like battery charge level and IoT system 700 components functionality. The IoT system can measure how many exercises are performed on the exercise device over a period of time. This can also be measures by the camera sensor implementation of FIG. 17. A certain threshold of the number of exercises done on the machines and/or users using the machines in a period of time. If numbers are lower than the thresholds it can indicate a maintenance problem. The system can then automatically communicate a message to the municipality server and/or personnel, and/or the gym maintenance and/or management and/or personnel the park/training environment maintenance or management server and/or personnel and alike. This way the system can automatically notify a possible maintenance issue. Using simple self-health checks can be another automatic method for detecting and reporting maintenance problems. The system can monitor it's battery charge level and notify in the methods described above if the charging level is too low. The IoT system can initiate self-tests of it's component every set period of time, in response to remote request or as a response to an event like: sensing a strong impact, decrease in usage by users, a storm, sensing unusual high or low temperatures, the system being in a position which is not the exercise starting position or the neutral position for a long period of time (can be detected for example by the ultrasonic sensors). As a response to this event the system can initiate self-test checks like: Battery charge levels, communication checks with the system components—for example the processor of the system send messages to the sensors and other components and then read back from them to see that registers were written for example, or received response messages from them. The processor initiates its own self-test procedures; the processor initiates self-test procedures on sensors and components connected to it and reads the results; finally, the processor can initiate functional tests to sensors and connected components for example: request the ultrasonic sensor to measure distance and compare the received result to a known value. Request accelerometers and/or gyros to measure acceleration and compare to known values for example at rest—for example to the expected measured components of the earth gravity; Request communication modules such as for example Bluetooth modem to communicate and or identify nearby components on other exercise devices, or users mobiles or WCDs or known components in the area; in the camera case the processor can request the camera or capture device to take an image and compare it to reference image, it can measure things like focus, lighting conditions, level of noise and alike in order to understand the camera or capture device health status; other similar tests known in the art can be performed to the systems. If a self-test procedure fails, or a value received in a test is different than expected in an amount that can be considered failure (in both cases failure can be considered repeated failures above a threshold of a number of times), the system can send a notification in the methods described in this disclosure.

In another example embodiment user can report the need for maintenance. The user interface which interacts with a plurality of users can give the users the possibility to report maintenance issues. For example, in the application for mobile or WCD described in relation to FIG. 18 a plurality of screens can display a button titled "Report an issue" or "Maintenance request" and alike. For example, it can be in the bottom of the screen 1220 or 1240 or the Park Map screen. Once pressing this button, a Graphic User Interface or Voice Interface for example prompts the user to report the maintenance required. The Interface can give options to the user to select from. First Screen can present the possible facilities in which to report a required maintenance. The list can be narrowed according to the user geographical location, or the user known training facilities according to his training plan or according to tracking of the facilities he uses. After selecting the facility by the user or by the system (according to current location for example), the system can present a list of objects for which a maintenance may be required. This list can include the training devices in the training facilities and additional object in the area like for example water fountains, street lights, the park floor, fences, chairs in stools, toilet and shower facilities, lockers and alike. This list can also be narrowed down automatically by the system, before or while presenting it to the user: if the user exact location in the training facility is known the system can narrow the list to object found at a certain distance or radius from him. In an outdoor gym for example, if at this time the user is standing next to a certain exercise device, then once he presses the button for "Maintenance request" a list of possible maintenance issue in this exercise device appears for selection. At the bottom of the list there can be another button titled "Other maintenance issue" or something else which allow the user go to a broader menu of possible objects that may require maintenance. The system can present the possible objects on a map which contain a certain perimeter or range in reference to the user location or known training facilities. The user may select an object appearing on the map by for example selecting it with a mouse or clocking on a touch screen. The map may include navigation options like zoom, move pane, rotate and alike. The next screen after selecting the object automatically or by the user can be list of possible maintenance issue. For example, "Requires lubrication", "IoT system down", "Part X is broken", "Requires Painting", "Safety issue", "General malfunction" and alike. In each of the screens there can be an option for free text or to send a free voice message. Here too there can be a more "graphical" method: the system may present an image, drawing or a diagram or alike of the object. The user then can select or point to an area or a part on the image/drawing/diagram. Here too navigation and zoom options are possible. Finally the user can capture an image of the maintenance issue and input it to the system for further analysis either by a person or an image recognition system or both. The user can also record a voice message or a written message describing the maintenance issue to be processed either by a person or voice/text recognition system or both.

In yet another embodiment the user can be prompted or asked about possible maintenance issue: If for example the system recognizes a drop in the usage of a certain device, it can wait till a user is near it and then ask him, for example using a notification on a mobile or WCD, or a pop-up window, ask whether this exercise device requires maintenance. Another example for an event is one of the events mentioned earlier in this section like sensing an unusual impact for example. The system for example my use a microphone on the user's mobile or WCD or installed on the IoT system 700. It can listen to sounds when the user is using the exercise device. If an unusual sound like an impact, squeaking (that may imply the need for lubrication), or alike may cause the system to ask the user about a possible maintenance issue, for example at the end of the set or exercise. In any of the examples for maintenance need detection in this section the system can "consult" or ask a plurality of user whether a maintenance problem exists before reporting it. System may not relay on a single user but ask a few users and perform some process of majority vote or alike before reporting.

In yet another embodiment the system can monitor the mechanical integrity of an exercise device. This can be achieved in several ways. Parts of the training device can be attached with a thin film or wire that can break or tear in case the training device part is broken or dismantled. The tear or break can be detected, for example the film or wire can be conductive and once it is broken an electric circuit opens. This state can be conveyed to for example the IoT system 700 or another system using wires or wirelessly. This system can then notify the issue and or prompt a plurality of users.

In the U.S. Pat. No. 9,542,823B1 titled "Tag-based product monitoring and evaluation" by Russell et al. and incorporated here by reference, methods for monitoring and evaluating products status are disclosed. The methods in U.S. Pat. No. 9,542,823B1 and it's references can be applied to Outdoors Training devices and Training devices in general with slight modifications. The tags can monitor all what is mentioned in this disclosure, using similar methods to U.S. Pat. No. 9,542,823B1 with the exercise devices serving as the subjects which the tags are mounted on. A plurality of such tags can be part of the IoT system 700 and/or connected to it wirelessly or by wires, and/or the plurality of tags can directly communicate with a computing device of the overall system 200 of U.S. application Ser. No. 15/594,562 like a server or maintenance server to update about malfunction, maintenance request, or any other condition or event mentioned in this section and in this disclosure.

Figure 17:
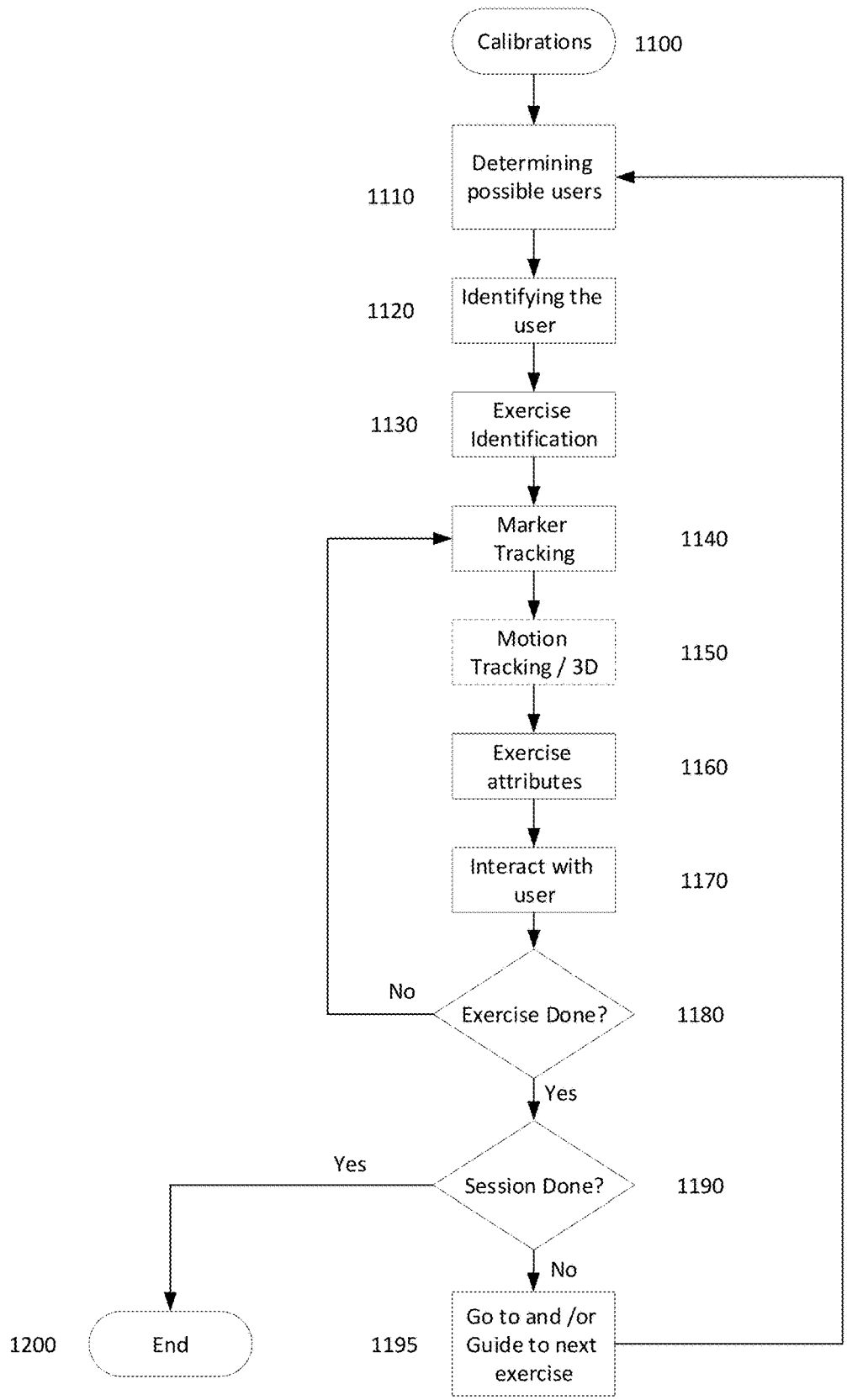
FIG. 17—is a flow chart diagram specifying a method for monitoring and/or tracking user performance on an exercise device.

Another method is to use the plurality of camera sensors related to FIG. 17, or other cameras in the area—for example security cameras. To detect a mechanical failure the camera and/or sensors can compare reference images to frames taken every period of time for example, or as a response to an event. To make the comparison easier the system can time the frame grabbing to when it knows or assumes that the training device is at a certain known state. For example, the system can grab frame for this embodiment when it knows that the exercise device is at rest or at start position—no user is using it, indication that the exercise device is at start position based on other sensors or based on motion tracking and/or marker tracking for example. The grabbed frame can be compared to the reference image in simple methods of finding the difference between the images or using methods like those disclosed in relation to FIG. 17, or in the references. If the difference is above some threshold or there is an indication for something wrong for example using the methods of U.S. Pat. No. 9,011,293 to find wrong exercise performance where the object is the exercise device compared to itself when known to be OK, in this case "wrong exercise performance" means malfunction or maintenance requirements.

A simple one-dimensional example for the methods in the last two paragraphs is using distance measurement or calculation to detect a possible defect. If in a known state of for example rest or exercise beginning, a certain part of the exercise device should be in a certain distance from the floor, or another part or any other object and the measured distance at this state is different above a certain threshold and event can be triggered to do additional checks, prompt or notify.

A camera or similar sensor can also detect the need to renew painting or take care of surface defects in a similar manner. A comparison of "ideal" reference image can detect change in color like for example fading or surface defects. Methods for overcoming difference in light and environment conditions (like for example weather —moisture on device, snow, rain etc.) that were disclosed above or in the references or known in the art can be used.

Another method for detecting for example need for lubrication is tracking the pace of exercise performance by a plurality of users. A reduction in pace of performance for a plurality of users may indicate a need for lubrication. The system can do additional checks, prompt or notify.

Yet another implementation example is using sensors like sound, sensors (microphones) and/or vibration sensors and alike to detect mechanical failures or other failures. Reference frames of characteristic sound or characteristic vibrations for non-malfunction operation and/or malfunction operation can be saved in the data-holding subsystem and/or in the data-base. The system can compare the sensor input of sound, vibrations and alike to the saved reference frames, based on the comparison results like differences in certain attributes (like frequency, intensity, direction, beats and alike) or a function of the differences (any function or method from "Methods for calculating and finding quantities and configurations used in this disclosure" of U.S. application Ser. No. 15/594,562 can be used) or similarities can trigger additional checks, prompt or notify about a maintenance request. Such methods are described in the following references: China application CN102095560A, US20170285626A1, U.S. Pat. No. 6,173,074B1, U.S. Pat. No. 6,173,074B1, CN101709997A, U.S. Pat. Nos. 5,251, 151A, 5,511,422A, US2014/0114612 incorporated here by reference.

Machine Learning methods such as those discussed in U.S. application Ser. No. 15/594,562 and other references can be used in an example embodiment for detecting a suspected malfunction or a need for maintenance and cause the system to do additional checks, prompt or notify. The attributes that can be used as input to the machine learning method can be: attributes of sound like frequency, intensity, direction, beats and alike; like speed of performance or operation (slowness), usage of the exercise device, differences in images from camera sensors, difference in sounds or vibrations; measurements of sensors from the IoT system 700 and the surrounding; results of self-test; other attributes from this section this disclosure or the references. The required result is whether there is a suspected maintenance requirement or malfunction. A subtler required result can be what is the suspected malfunction and/or in what part or component of the system is malfunctioning or requires maintenance. The criteria for success can be the correctness of the prediction, as can be verified for example by a maintenance personnel or a user.

Some notification methods about malfunctions were disclosed above. The data about malfunctions and required maintenance can reach a central computing system via wired or wireless communication such as ethernet, Internet, Wi-Fi, Radio Transitions, Cellular network and alike. The computing-system can present a Dashboard to whoever may require the data—for example municipality, Gym network management, trainees and users, coaches and alike. The access to the dashboard may be limited for some of the potential users. The dashboard may include several forms of data like for example: A map with the facilities on it. For each facility the number of incidents can be indicated on the map near it, or for example by a color code—like green for zero incident, yellow for 1 incident, orange for 2-4 incidents and read for 5 or more. The types of incidents and more data like the exercise device can be displayed on the map, or for example on a popup displayed when the facility is selected or "hovered" on. Such a map may enable zoom and navigation options even to the level of seeing individual objects in a facility and indication or description of the status of each one (color code/text/popup). A separate map detailed of the facility or a table/text/popup can be presented when it is selected or "hovered" on. The dashboard may present tables of data cross-sections. Like for example a table of facilities and for each one the number of incidents, the type of incidents the most severe incident. Other data may include description of incidents, how many people reported incidents, how each incident was detected, location of the facility, location of the incidents in the facility, and other data about the facility and users like usage and alike. The data can be arranged in tables and drawings that can be manipulated and sorted.

Dashboards and/or reports can include more or other data received from the systems in the training facilities or around them. This data may not necessarily be related to maintenance. For example, data about usage and user statistics collected from the plurality of systems 200 present in training facilities. Data like, usage numbers of each training device and/or training facilities. Usage as a function of time in the day and/or month and/or year, Socio-economic and other cross-sections like usage of men, women, according to income, according to area of living or neighborhood, quality and level of trainees, length of training sessions and many more data which is in the capability of the systems to collects. All example embodiment of "Big-Data", and alike form U.S. application Ser. No. 15/594,562 and the other references can be applied.

Marketing, Gamification and Miscellaneous.

Trough systems installed in the municipality sports and training facilities the overall system can manage all of them and be the sports and quality of life application of the municipality and/or of all the residents. The system can computerize and track all sports activities. For example, monitor running and walking, indoor gyms, cycling (Like Tel-Offan in Tel-Aviv city), various sports classes such as Pilates, dancing, martial arts and the like, and even sports like motor sports and sailing.

The system can encourage people to engage in activities and maintain a healthy lifestyle, combining the ability to track actual performance and obtain real data through the IoT and Camera solutions and capabilities. As described above it can also include reminders to go out to exercise, reminders about fitness and wellness facilities and alike. It can combine methods of: tips on nutrition, diet monitoring and daily caloric expenditure, similar to the known in the art for example like Samsung Health, Apple health. Anyone familiar with the field knows that there are many ideas already implemented in the field that can be combined see details below. The system can also interface and incorporate Social Networks, Social tools, and social initiatives to increase and indorse physical and training activity: from the simplest things to sharing activities a user has done with his social network and application friends, Creating groups of physical activities interests, and interface them with the system for data. Comparing a user performance to other users from a group or with similar characteristic (Similar age and/or area and or experience level and/or gender and/or social or social economic status, and alike); Organizing groups competitions; Rewarding for individual or group for achievements. A sporting achievement can be, for example, a certain distance on a bicycle ride in one trip, and/or several trips and/or a sum of distances of a group and/or sum over a period of time. Such a method is described in the references for example: US20100125028A1, US20130330694A, S20060025282A1, US20080027673A1 US20130090213A1, U.S. Pat. No. 8,177,260B2, all incorporated by reference. The reward may include, for example, the possibility of purchasing products, discounts on purchasing products, money or money equivalent, gifts of the application such as nutrition and training programs in the application opening of paid features of the application and the like. Another, but similar, option is to work for a common goal as described in the references. The combination of sports achievements of a group above a certain threshold leads to the action of achieving a goal such as giving to charity, contributing to the community and so forth. Some of the ideas in this paragraph and others also appear in U.S. application Ser. No. 15/594,562. There are also game and exercise ideas in order to encourage people to practice and raise their motivation.

Methods from U.S. Pat. No. 8,073,460B1 titled "System and method for providing advertisement based on mobile device travel patterns" incorporated here by reference can be additionally used in the application.

In U.S. Pat. No. 8,624,725B1 titled "Enhanced guidance for electronic devices having multiple tracking modes" by MacGregor incorporated here by reference, methods for positioning and guiding a user using a mobile or WCD or another electronic device are disclosed. These methods can be used in the current disclosure in all example embodiments that require guiding users to exercise devices—for example in the Park-Map screen of the application or as part of a virtual trainer guiding the user from exercise to exercise; Other embodiments include guiding the user to activities, to training facilities, to businesses indorsed by the application, to potential partners for training, to potential matches (people) and alike.

Other Implementation Examples

Management of all the city's (or in general organization) sports resources: Organization—monitoring their maintenance and quality, allowing citizens/organizations to order them (for example setting appointment in a time and date through the application with a certain sporting facility or resource), Turning on lights, Air-conditioning, heating and alike in sporting and training facilities remotely or at a set time—interface trough the I/O subsystem for example trough a mobile or WCD, pass the request to a managing computing device and/or server and passing the request to systems installed in the field.

Management of personal training, sports training and activities of the municipality and private bodies. Allowing groups and circles to be created, reserving a place in facilities for such groups, ordering personal training by individuals or groups, and the like.

In the U.S. Pat. No. 8,224,773B2 titled: "Mining of user event data to identify users with common interests" by Joel R. Spiegel; which is incorporated herein by reference, a method for finding matches between people based on user preferences and affinities is presented. These methods can be combined in this disclosure with certain changes and adaptions. Data from the user inputs and the user profile can be used as events that reflects user affinities such as: user training goals, age, gender, the user preferred locations for training and activities, the user preferred exercises and/or exercise devices, the user preferred times for training sessions, preferred training activities to do and/or watch, user level and experience and alike. Data from the user tracking and training monitoring can also be used as such events: users' typical gestures which are similar, user's progress graphs or characteristics; external features like height, weight, face recognition attributes and alike. Based on these methods matches can be found or suggested between trains. This may improve participation and retention of users and may also provide another payable service. Matches can be for training together or crating groups of trainees in certain areas or fields; Match between coaches and possible clients; Romantic type of matches and alike.

The system can gain access to user data from other applications and businesses. Using these methods, it can try to find matches between people which are subscribed and those who are not. The system can then prompt the subscribed person to offer the unsubscribed match to join. It can recommend sales, vouchers, discounts and alike to offer the unsubscribed person based on the data mining done and the events. The system can approach the unsubscribed person trough commercials or other applications or businesses or via e-mail, SMS message and alike and show him possible matches and recommend him to join or subscribe. It can offer him sales, vouchers, discounts and alike based on the data mining done and the events. It can offer him and recommend him on other such sales, vouchers, discounts and alike to give the matched persons that are already subscribed if he joins. One example is to match a person with a possible coach and offer him discount with training session if he joins and trains with this coach. Or for example offer a romantic date partner and offer discount for a certain restaurant or hang-out place to go together after the training.

Methods for Monetization:

Business to Business:

Payment for installations of the IoT system in Sports facilities/Training facilities or even installation of the entire sports facility which will include the systems.

Payment for collected data on participants and/or equipment and/or resources.

Payment for device/facilities maintenance tracking.

Payment or commission for the possibility of booking and/or controlling training facilities and/or resources remotely.

Sponsorships of large organizations and companies which can also pay for commercials in sporting facilities where the systems are installed, or for commercials in the application and alike.

Business to Customer

A small monthly fee for example for the "virtual coach" services given by the system —instead for example of paying a membership to the gym or training facility.

Application "Freemium" model—some features are given for payment.

Payment for one-time services: for example payment for purchasing and/or monitoring of regular or special training programs (e.g. purchase of a famous trainer's training program and/or monitoring of the performance by him), payment for purchasing and monitoring of nutrition and diet programs, booking of municipal or private sports resources, and alike.

Purchases of other products from the application: e.g. food products from the application like energy food—like candy bars, energy drinks, health food, sporting goods and accessories such as: clothes, weights, exercise devices, shoes exercise WCDs and alike.

Advertisements—especially the possibility of health food, energy drinks, healthy lifestyle products, health lifestyle and sports organizations. It is possible to combine with discounts—for example, rebates following the athletic achievements of individuals or groups—that is, part of the "game" in the application. For example, a user is awarded 20% discount for protein candy bar and energy drink if he achieves the next goal in his training program which is for example run a certain distance at a certain time. He can then be guided to the store that offers him this promotion and introduced to it. The method can be further elaborated: based on users that the system filters which have never visited a certain store which is for example close to the training facility, the system can offer this cross-section of users (which can be further refined) certain promotions which can be as rewards to sporting achievements. This way stores can gain exposure.

Another method in this context is concerning sales to the public of drivers. Gas stations and convenient stores can erect small training facilities in their vicinity. The system can identify driving time above a certain time using motion characteristics of the sensors mounted on mobiles and/or WCDs (like GPS, accelerometers, Gyros, location finding). It can also communicate with navigation applications such as "Waze" and "iGo" to receive such data. The system can then indorse the driver to refresh himself by doing some activity and/or food and/or drinks at the convenient store. It can then find convenient stores/Gas stations/Recreational areas/stopping points and alike on his route and guide him to the nearest one, or the one of his choice. There the system can instruct him in a refreshment training program and or nutrition program, which can be predefined or designs according to the methods discussed here or in the references. The nutrition program may indorse products on the convenient store and may offer discounts and sales on selected products which may correspond to the nutrition program. Additionally or alternatively upon completion of the goal of the training program or any goal in it, the system may offer or may indorse products on the convenient store or any other business nearby, on the way or in general, in the methods described in this disclosure.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The block diagrams and flow-charts presented in this disclosure illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions described herein. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Aspects of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Aspects of the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or VO devices (including but not limited to keyboards, displays, pointing devices, etc.) can be coupled to the system either directly or through intervening 1/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for monitoring performance of a training routine, comprising:
   a computing device;
   an outdoor gym training environment in which a training activity takes place,
   the training environment includes at least one training device;
   an IoT system comprising at least one of:
      motion sensors, and/or position sensors;
      the said motion or position sensor or sensors configured to generate sensory information related to at least one movement of a user performing the exercise routine or movement of the training device;
      a training module configured to: track at least one movement of a user performing the exercise routine or a movement of the said training device;
   a user interface device configured to at least give feedback to the user;
   the system further configured with a charging port that is located on a non-movable part of the said training device, connecting to a complementary port on a moving part of the said training device;
      where the connection occurs when the said movable and non-movable parts are in close proximity and/or in contact;
      where this close proximity and/or contact occurs at least at one position of the moving part along its movement path;
      and where at least a part of the IoT system is charged or powered through the said complementary port.

2. A system for monitoring performance of a training routine, comprising:
   a computing device;
   a training environment in which a training activity takes place,
   the training environment includes at least one training device;
   an IoT system comprising at least one of:
      motion sensors, and/or position sensors;
      the said motion or position sensor or sensors configured to generate sensory information related to at least one movement of a user performing the exercise routine or movement of the training device;
      a training module configured to: track at least one movement of a user performing the exercise routine or a movement of the said training device;
   a user interface device configured to at least give feedback to the user;
   the system further comprising:
      a sound recording sensor, the sound recording sensor configured to record sounds of at least one exercise device;
      a database containing at least one reference sound frame of the said exercise device;
      the said system further configured to compare the said reference sound frame stored in the database, to a later recorded sound of the exercise device, to detect at least dissimilarities between these sounds;
      and based on the detected dissimilarities automatically identify failure or maintenance requirement.

3. The system of claim 1 or 2, further comprising:
   at least one camera and/or image sensor, the said camera and/or image sensor configured to take images of at least one training device;
   a database containing at least one reference image of the said training device;
   the said system further configured to compare the said reference image stored in the database, to a later taken image of the training device, to detect at least dissimilarities between these images;
   and based on the detected dissimilarities automatically identify failure or maintenance requirement.

4. The system of claim 2 further configured to provide feedback on the said failure or maintenance required; where the feedback is provided by at least one of: a sound generating device, a speech generating device, a display, a touch screen, a mobile device.

5. The system of claim 1, further comprising:
   an I/O subsystem for permitting a user to enter at least one attribute of the training or of the trainee,
   the database containing at least one training routine information;
   further configured to design a training program comprising at least one of:
   a plurality of training routines, a plurality of difficulty levels, a time division between the training routines;
   based on a method comprising sorting and filtering at least one training routine information in the database based on the sensory information and a plurality of inputs from the user.

6. The system of claim 5, further configured to use the sensory information and plurality of inputs from the user as inputs to machine learning methods, these said methods are used for at least sorting and/or filtering of at least one training routine information in the database.

7. The system of claim 6, where the training environment is not limited to outdoor gym environment, further configured to filter the Exercise Data Structures (EDS) based on at least one of: identifying the possible users, identifying the possible training environments, identifying the possible training routines.

8. The system of claim 5, further configured to evaluate a difficulty level required in at least one training routine, based on the sensory information, the plurality of inputs from the user, and the information in the database.

9. The system of claim 5, where some of the sensors are at least one of position sensors, motion sensors, accelerometers, optical sensors, electromagnetic or acoustic based sensors, microphones, strain gauges, pressure and mechanical sensors.

10. The system of claim 5, further configured to modify the training routines information in the database based on social media interaction.

11. The system of claim 5, further configured to modify at least one training routine information in the database based on information from a network of systems of big data and machine learning methods, by using at least one of: routine attributes, user attributes, training attributes, routine information, recorded or produced by the said network of systems.

12. The system of claim 5 further configured to track a rate of movements and to count a number of physical exercise routine repetitions.

13. The system of claim 5 further configured to determine a trainee weight and to calculate a resistance level in case of body weight-based training device.

14. The system of claim 2
  further comprising a plurality of cameras or image sensors;
  and where a database further containing at least one training routine information, and at least one user face recognition data;
  and the system is further configured to monitor and feedback the said training activity performance based on a method comprising:
  1. Calibrations of at least one of the plurality of cameras or image sensors, at least one of the motion and position sensors;
  2. filtering possible current users based on location and/or interaction with the possible current users Wearable Computing Devices "WCD";
  3. filtering face recognition data in a database to include only the possible current users from the previous stage, and then identifying at least one user performing a training activity, using face recognition method, and at least one of the said plurality of cameras or image sensors;
  4. identifying the training activity performed by the user using at least one of the said sensors or cameras and the said training routine information;
  5. performing marker tracking of the said user, using the said plurality of cameras or image sensors,
  4. deducing a training activity attributes;
  5. giving feedback to the user;
  6. guiding the user to a next training routine and when a current training routine is done;
  7. Repeating steps 2-6 as long as a training session is not done.

15. The system of claim 14 further configured to calculate a number of burnt calories during a performance of the training routine.

16. The system of claim 14 further configured to track a rate of movements and to count a number of physical exercise routine repetitions.

17. The system of claim 14 further configured to automatically change difficulty level in an exercise device.

18. The system of claim 14, further configured to produce a skeleton model of the user and/or plurality of training devices; wherein the skeletal model includes at least a list of joints, each joint is a connection of two adjacent body parts.

* * * * *